(12) United States Patent
Hunzinger et al.

(10) Patent No.: US 9,424,513 B2
(45) Date of Patent: *Aug. 23, 2016

(54) METHODS AND APPARATUS FOR NEURAL COMPONENT MEMORY TRANSFER OF A REFERENCED PATTERN BY INCLUDING NEURONS TO OUTPUT A PATTERN SUBSTANTIALLY THE SAME AS THE REFERENCED PATTERN

(75) Inventors: Jason Frank Hunzinger, Escondido, CA (US); Victor Hokkiu Chan, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 672 days.

This patent is subject to a terminal disclaimer.

(21) Appl. No.: 13/292,175

(22) Filed: Nov. 9, 2011

(65) Prior Publication Data

US 2013/0117211 A1    May 9, 2013

(51) Int. Cl.
*G06N 3/04* (2006.01)
*G06N 3/08* (2006.01)

(52) U.S. Cl.
CPC .................. *G06N 3/082* (2013.01); *G06N 3/04* (2013.01); *G06N 3/049* (2013.01); *G06N 3/08* (2013.01)

(58) Field of Classification Search
CPC .................................. G06N 3/08; G06N 3/04
USPC .......................................................... 706/25
See application file for complete search history.

(56) References Cited

U.S. PATENT DOCUMENTS

| | | |
|---|---|---|
| 5,740,325 A | 4/1998 | Wang |
| 6,018,696 A | 1/2000 | Matsuoka et al. |
| 6,041,322 A | 3/2000 | Meng et al. |
| 7,089,218 B1 | 8/2006 | Visel |
| 7,454,388 B2 | 11/2008 | Thaler |
| 7,561,743 B2 | 7/2009 | Mattausch et al. |
| 7,725,412 B2 | 5/2010 | Aoyama et al. |
| 8,909,575 B2 | 12/2014 | Hunzinger et al. |
| 2010/0312735 A1 | 12/2010 | Knoblauch |
| 2012/0117012 A1* | 5/2012 | Szatmary et al. ............... 706/27 |

(Continued)

FOREIGN PATENT DOCUMENTS

| | | |
|---|---|---|
| CN | 1150847 A | 5/1997 |
| WO | WO-04097733 A2 | 11/2004 |
| WO | WO-2014081671 | 5/2014 |

OTHER PUBLICATIONS

Sandberg et al., Synaptic Depression as an Intrinsic Driver of Reinstatement Dynamics in an Attractor Network, Neurocomputing, vol. 44-46, p. 615-622, Jun. 2002.*

(Continued)

*Primary Examiner* — Stanley K Hill
*Assistant Examiner* — Robert H Bejcek, II
(74) *Attorney, Agent, or Firm* — Rupit M. Patel

(57) ABSTRACT

Aspects of the present disclosure support techniques for neural component memory transfer. A pattern in a plurality of afferent neuron outputs can be first referenced with one or more referencing neurons. One or more first relational aspects can be matched, with one or more first relational aspect neurons, between the referenced pattern and an output of the one or more referencing neurons. The referenced pattern can be transferred to one or more transferee neurons by inducing the plurality of afferent neurons to output a pattern substantially the same as the referenced pattern by the one or more referencing neurons.

34 Claims, 70 Drawing Sheets

(56) References Cited

U.S. PATENT DOCUMENTS

2012/0251989 A1* 10/2012 Wetmore et al. ............ 434/236
2013/0046716 A1  2/2013 Chan et al.
2013/0117210 A1  5/2013 Hunzinger et al.
2013/0117212 A1  5/2013 Hunzinger et al.
2013/0117213 A1  5/2013 Hunzinger et al.

OTHER PUBLICATIONS

Andreas Knoblauch, "Structural plasticity, cortical memory, and the spacina effect", BMC Neuroscience, Jul. 13, 2009, p. O16, vol. 10, No. Suppl 1, Biomed Central, London, GB, XP021056533, ISSN: 1471-2202, DOI: 10.1186/1471-2202-10-S1-O16.
Battaglia, Francesco P. et al., "The Construction of Semantic Memory: Grammar-Based Representations Learned from Relational Episodic Information", Frontiers in Computational Neuroscience, Jan. 1, 2011, vol. 5, XP055056188, ISSN: 1662-5188, DOI: 10.3389/fncom.2011.00036.
Froemke Rober C. et al., "Dendritic synapse location and neocortical spike-timing-dependent plasticity", Frontiers in Synaptic Neuroscience, Jul. 21, 2010, pp. 1-14, vol. 2, XP055055332, DOI: 10.3389/fnsyn.2010.00029.
Girardeau, Gabrielle et al., "Hippocampal ripples and memory consolidation", Current Opinion in Neurobiology, Mar. 1, 2011, pp. 452-459, vol. 21, No. 3, XP028240358, ISSN: 0959-4388. DOI: 10.1016/J.CoNB.2011.02.005 [retrieved on Feb. 9, 2011].
International Search Report and Written Opinion—PCT/US2012/064517—ISA/EPO—Mar. 13, 2013.
Marre, et al., "Relable Recall of Sponaneous Activity Patterns in Cortical Networks," The Journal of Neuroscience, Nov. 18, 2009, 11 pages.
Poirazi Panaylota et al., "Impact of Active Dendrites and Structural Plasticity on the Memory CapaCity of Neural Tissue", Neuron, Mar. 1, 2001, pp. 779-796, vol. 29, No. 3, XP055055318, ISSN: 0896-6273, DOI: 10.1016/S0896-6273(01)00252-5.
Damasio A., et al., "Behind the Looking-Glass", Nature, Macmillan Publishers, vol. 454, Jul. 10, 2008, pp. 167-168.
Hasselmo M.E, "Temporally Structured Replay of Neural Activity in a Model of Entorhinal Cortex, Hippocampus, and Postsubiculum", European Journal of Neuroscience, vol. 28, 2008, pp. 1301-1315.
Lubenov E.B., et al., "Decoupling through synchrony in neuronal circuits with propagation delays", Neuron, vol. 58, No. 1, Apr. 9, 2008, pp. 118-131, XP055101258, DOI:10.1016/j.neuron.2008.01.036 Experimental procedures.
Meyer K., et al., "Convergence and Divergence in a Neural Architecture for Recognition and Memory", Trends in Neurosciences, vol. 32 No. 7, Jun. 2009, pp. 376-382.
Miyamoto H., et al., "Reciprocal Interaction of Sleep and Synaptic Plasticity", Molecular Interventions, vol. 3, Issue 7, Oct. 2003, pp. 404-417.
Peyrache A., et al., "Replay of Rule-Learning Related Neural Patterns in the Prefrontal Cortex during Sleep", Nature Neuroscience, vol. 12, No. 7, Jul. 2009, pp. 919-929.
Ermentrout., et al., "Fine Structure of Neural Spiking and Synchronization in the Presence of Conduction Delays", Proc. Natl. Acad. Sci. USA, vol. 95, Feb. 1998, pp. 1259-1264.
Samura T., et al., "Formation of refined memories by hippocampal model", Technical Report of the Institute of Electronics, Information and Communication Engineers, The Institute of Electronics, Information and Communication Engineers, May 22, 2003, vol. 103, No. 92, pp. 7-12.
Ito M., et al., "Long-Term Memory of Temporal Patterns in a Hippocampus-Cortex Model", Technical Report of the Institute of Electronics, Information and Communication Engineers (IEICE), IEICE, Jun. 15, 2000, vol. 100, No. 126, pp. 25-32.

* cited by examiner

*Degraded Input + Lagging Completion*

*Degraded Input + Replay Completion*

METHODS AND APPARATUS FOR NEURAL COMPONENT MEMORY TRANSFER OF A REFERENCED PATTERN BY INCLUDING NEURONS TO OUTPUT A PATTERN SUBSTANTIALLY THE SAME AS THE REFERENCED PATTERN

CROSS REFERENCE TO RELATED APPLICATIONS

The present application for patent is related by subject matter to U.S. patent application, entitled, "METHODS AND APPARATUS FOR UNSUPERVISED NEURAL REPLAY, LEARNING REFINEMENT, ASSOCIATION AND MEMORY TRANSFER: NEURAL COMPONENT REPLAY", filed Nov. 9, 2011, U.S. patent application, entitled, "METHODS AND APPARATUS FOR UNSUPERVISED NEURAL REPLAY, LEARNING REFINEMENT, ASSOCIATION AND MEMORY TRANSFER: NEURAL ASSOCIATIVE LEARNING, PATTERN COMPLETION, SEPARATION, GENERALIZATION AND HIERARCHICAL REPLAY", filed Nov. 9, 2011 and U.S. patent application, entitled, "METHODS AND APPARATUS FOR UNSUPERVISED NEURAL REPLAY, LEARNING REFINEMENT, ASSOCIATION AND MEMORY TRANSFER: STRUCTURAL PLASTICITY AND STRUCTURAL CONSTRAINT MODELING", filed Nov. 9, 2011, filed herewith and assigned to the assignee hereof and hereby expressly incorporated by reference herein.

BACKGROUND

1. Field

Certain aspects of the present disclosure generally relate to neural system engineering and, more particularly, to methods and apparatus for unsupervised neural replay, learning refinement, association, and memory transfer.

2. Background

In the field of neural system engineering, there is a fundamental problem of truly replaying, in absence of an original stimulus, a neural firing pattern that has been learned by one or more neurons. Further, the problems of fast learning, learning refinement, association, and memory transfer after the original stimulus is no longer present still remain to be addressed.

Current methods of learning a pattern with biologically inspired neuron models are functionally one-way methods: in order to determine what pattern a neuron matches, one would need to try different patterns until the matching one is found. A method of true replay of what has been learned, either biologically or by machine is unknown.

SUMMARY

Certain aspects of the present disclosure provide a method of neural component replay. The method generally includes referencing a pattern in a plurality of afferent neuron outputs with one or more referencing neurons, matching one or more relational aspects between the pattern in the plurality of afferent neuron outputs and an output of the one or more referencing neurons with one or more relational aspect neurons, and inducing one or more of the plurality of afferent neurons to output a substantially similar pattern as the referenced pattern by the one or more referencing neurons.

Certain aspects of the present disclosure provide an apparatus for neural component replay. The apparatus generally includes a first circuit configured to reference a pattern in a plurality of afferent neuron outputs with one or more referencing neurons, a second circuit configured to match one or more relational aspects between the pattern in the plurality of afferent neuron outputs and an output of the one or more referencing neurons with one or more relational aspect neurons, and a third circuit configured to induce one or more of the plurality of afferent neurons to output a substantially similar pattern as the referenced pattern by the one or more referencing neurons.

Certain aspects of the present disclosure provide an apparatus for neural component replay. The apparatus generally includes means for referencing a pattern in a plurality of afferent neuron outputs with one or more referencing neurons, means for matching one or more relational aspects between the pattern in the plurality of afferent neuron outputs and an output of the one or more referencing neurons with one or more relational aspect neurons, and means for inducing one or more of the plurality of afferent neurons to output a substantially similar pattern as the referenced pattern by the one or more referencing neurons.

Certain aspects of the present disclosure provide a computer program product for neural component replay. The computer program product generally includes a computer-readable medium comprising code for referencing a pattern in a plurality of afferent neuron outputs with one or more referencing neurons, matching one or more relational aspects between the pattern in the plurality of afferent neuron outputs and an output of the one or more referencing neurons with one or more relational aspect neurons, and inducing one or more of the plurality of afferent neurons to output a substantially similar pattern as the referenced pattern by the one or more referencing neurons.

Certain aspects of the present disclosure provide a method of neural component learning refinement and fast learning. The method generally includes referencing a pattern in a plurality of afferent neuron outputs with one or more pattern learning neurons, matching one or more relational aspects between the pattern in the plurality of afferent neuron outputs and an output of one or more referencing neurons with one or more relational aspect neurons, inducing one or more of the plurality of afferent neurons to output a substantially similar pattern as the referenced pattern by the one or more referencing neurons, and refining learning by the one or more pattern learning neurons using the induced substantially similar pattern.

Certain aspects of the present disclosure provide an apparatus for neural component learning refinement and fast learning. The apparatus generally includes a first circuit configured to reference a pattern in a plurality of afferent neuron outputs with one or more pattern learning neurons, a second circuit configured to match one or more relational aspects between the pattern in the plurality of afferent neuron outputs and an output of one or more referencing neurons with one or more relational aspect neurons, a third circuit configured to induce one or more of the plurality of afferent neurons to output a substantially similar pattern as the referenced pattern by the one or more referencing neurons, and a fourth circuit configured to refine learning by the one or more pattern learning neurons using the induced substantially similar pattern.

Certain aspects of the present disclosure provide an apparatus for neural component learning refinement and fast learning. The apparatus generally includes means for referencing a pattern in a plurality of afferent neuron outputs with one or more pattern learning neurons, means for matching one or more relational aspects between the pattern in the plurality of afferent neuron outputs and an output of one or more referencing neurons with one or more relational aspect neurons, means for inducing one or more of the plurality of afferent neurons to output a substantially similar pattern as the referenced pattern by the one or more referencing neurons, and means for refining learning by the one or more pattern learning neurons using the induced substantially similar pattern.

Certain aspects of the present disclosure provide a computer program product for neural component learning refinement and fast learning. The computer program product generally includes a computer-readable medium comprising code for referencing a pattern in a plurality of afferent neuron outputs with one or more pattern learning neurons, matching one or more relational aspects between the pattern in the plurality of afferent neuron outputs and an output of one or more referencing neurons with one or more relational aspect neurons, inducing one or more of the plurality of afferent neurons to output a substantially similar pattern as the referenced pattern by the one or more referencing neurons, and refining learning by the one or more pattern learning neurons using the induced substantially similar pattern.

Certain aspects of the present disclosure provide a method of neural learning refinement. The method generally includes learning a subset of a pattern in a set of inputs with a stimulus, learning a relational aspect between elements of the pattern and the subset of the pattern, replaying the pattern in the set of inputs using the learned relational aspect without the stimulus, and refining learning of the pattern in the set of inputs without the stimulus.

Certain aspects of the present disclosure provide an apparatus for neural learning refinement. The apparatus generally includes a first circuit configured to learn a subset of a pattern in a set of inputs with a stimulus, a second circuit configured to learn a relational aspect between elements of the pattern and the subset of the pattern, a third circuit configured to replay the pattern in the set of inputs using the learned relational aspect without the stimulus, and a fourth circuit configured to refine learning of the pattern in the set of inputs without the stimulus.

Certain aspects of the present disclosure provide an apparatus for neural learning refinement. The apparatus generally includes means for learning a subset of a pattern in a set of inputs with a stimulus, means for learning a relational aspect between elements of the pattern and the subset of the pattern, means for replaying the pattern in the set of inputs using the learned relational aspect without the stimulus, and means for refining learning of the pattern in the set of inputs without the stimulus.

Certain aspects of the present disclosure provide a computer program product for neural learning refinement. The computer program product generally includes a computer-readable medium comprising code for learning a subset of a pattern in a set of inputs with a stimulus, learning a relational aspect between elements of the pattern and the subset of the pattern, replaying the pattern in the set of inputs using the learned relational aspect without the stimulus, and refining learning of the pattern in the set of inputs without the stimulus.

Certain aspects of the present disclosure provide a method of neural component replay. The method generally includes referencing a pattern in a plurality of afferent neuron outputs with one or more referencing neurons, matching one or more relational aspects between the pattern in the plurality of afferent neuron outputs and an output of the one or more referencing neurons with one or more relational aspect neurons, and inducing one or more of the plurality of afferent neurons to output a substantially similar pattern as the referenced pattern by the one or more referencing neurons by bursting the output by the one or more relational aspect neurons.

Certain aspects of the present disclosure provide an apparatus for neural component replay. The apparatus generally includes a first circuit configured to reference a pattern in a plurality of afferent neuron outputs with one or more referencing neurons, a second circuit configured to match one or more relational aspects between the pattern in the plurality of afferent neuron outputs and an output of the one or more referencing neurons with one or more relational aspect neurons, and a third circuit configured to induce one or more of the plurality of afferent neurons to output a substantially similar pattern as the referenced pattern by the one or more referencing neurons by bursting the output by the one or more relational aspect neurons.

Certain aspects of the present disclosure provide an apparatus for neural component replay. The apparatus generally includes means for referencing a pattern in a plurality of afferent neuron outputs with one or more referencing neurons, means for matching one or more relational aspects between the pattern in the plurality of afferent neuron outputs and an output of the one or more referencing neurons with one or more relational aspect neurons, and means for inducing one or more of the plurality of afferent neurons to output a substantially similar pattern as the referenced pattern by the one or more referencing neurons by bursting the output by the one or more relational aspect neurons.

Certain aspects of the present disclosure provide a computer program product for neural component replay. The computer program product generally includes a computer-readable medium comprising code for referencing a pattern in a plurality of afferent neuron outputs with one or more referencing neurons, matching one or more relational aspects between the pattern in the plurality of afferent neuron outputs and an output of the one or more referencing neurons with one or more relational aspect neurons, and inducing one or more of the plurality of afferent neurons to output a substantially similar pattern as the referenced pattern by the one or more referencing neurons by bursting the output by the one or more relational aspect neurons.

Certain aspects of the present disclosure provide a method of neural component replay. The method generally includes referencing a pattern in a plurality of afferent neuron outputs with one or more referencing neurons, matching one or more relational aspects between the pattern in the plurality of afferent neuron outputs and an output of the one or more referencing neurons with one or more relational aspect neurons, and inducing one or more of the plurality of afferent neurons to output a substantially similar pattern as the referenced pattern by the one or more referencing neurons, wherein signaling between at least one of the afferent neurons, the one or more referencing neurons, or the one or more relational aspect neurons comprises at least one of a rapid spike sequence or independent spikes.

Certain aspects of the present disclosure provide an apparatus for neural component replay. The apparatus generally includes a first circuit configured to reference a pattern in a plurality of afferent neuron outputs with one or more referencing neurons, a second circuit configured to match one or more relational aspects between the pattern in the plurality of afferent neuron outputs and an output of the one or more referencing neurons with one or more relational aspect neurons, and a third circuit configured to induce one or more of the plurality of afferent neurons to output a substantially similar pattern as the referenced pattern by the one or more referencing neurons, wherein signaling between at least one of the afferent neurons, the one or more referencing neurons, or the one or more relational aspect neurons comprises at least one of a rapid spike sequence or independent spikes.

Certain aspects of the present disclosure provide an apparatus for neural component replay. The apparatus generally includes means for referencing a pattern in a plurality of afferent neuron outputs with one or more referencing neurons, means for matching one or more relational aspects between the pattern in the plurality of afferent neuron outputs and an output of the one or more referencing neurons with one or more relational aspect neurons, and means for inducing one or more of the plurality of afferent neurons to output a substantially similar pattern as the referenced pattern by the one or more referencing neurons, wherein signaling between at least one of the afferent neurons, the one or more referencing neurons, or the one or more relational aspect neurons comprises at least one of a rapid spike sequence or independent spikes.

Certain aspects of the present disclosure provide a computer program product for neural component replay. The computer program product generally includes a computer-readable medium comprising code for referencing a pattern in a plurality of afferent neuron outputs with one or more referencing neurons, matching one or more relational aspects between the pattern in the plurality of afferent neuron outputs and an output of the one or more referencing neurons with one or more relational aspect neurons, and inducing one or more of the plurality of afferent neurons to output a substantially similar pattern as the referenced pattern by the one or more referencing neurons, wherein signaling between at least one of the afferent neurons, the one or more referencing neurons, or the one or more relational aspect neurons comprises at least one of a rapid spike sequence or independent spikes.

Certain aspects of the present disclosure provide a method of neural component memory transfer. The method generally includes referencing a pattern in a plurality of afferent neuron outputs with one or more referencing neurons, matching one or more first relational aspects between the pattern in the plurality of afferent neuron outputs and an output of the one or more referencing neurons with one or more first relational aspect neurons, and transferring the pattern to one or more transferee neurons by inducing the plurality of afferent neurons to output a first substantially similar pattern as the referenced pattern by the one or more referencing neurons.

Certain aspects of the present disclosure provide an apparatus for neural component memory transfer. The apparatus generally includes a first circuit configured to reference a pattern in a plurality of afferent neuron outputs with one or more referencing neurons, a second circuit configured to match one or more first relational aspects between the pattern in the plurality of afferent neuron outputs and an output of the one or more referencing neurons with one or more first relational aspect neurons, and a third circuit configured to transfer the pattern to one or more transferee neurons by inducing the plurality of afferent neurons to output a first substantially similar pattern as the referenced pattern by the one or more referencing neurons.

Certain aspects of the present disclosure provide an apparatus for neural component memory transfer. The apparatus generally includes means for referencing a pattern in a plurality of afferent neuron outputs with one or more referencing neurons, means for matching one or more first relational aspects between the pattern in the plurality of afferent neuron outputs and an output of the one or more referencing neurons with one or more first relational aspect neurons, and means for transferring the pattern to one or more transferee neurons by inducing the plurality of afferent neurons to output a first substantially similar pattern as the referenced pattern by the one or more referencing neurons.

Certain aspects of the present disclosure provide a computer program product for neural component memory transfer. The computer program product generally includes a computer-readable medium comprising code for referencing a pattern in a plurality of afferent neuron outputs with one or more referencing neurons, matching one or more first relational aspects between the pattern in the plurality of afferent neuron outputs and an output of the one or more referencing neurons with one or more first relational aspect neurons, and transferring the pattern to one or more transferee neurons by inducing the plurality of afferent neurons to output a first substantially similar pattern as the referenced pattern by the one or more referencing neurons.

Certain aspects of the present disclosure provide a method of neural associative learning. The method generally includes referencing a first pattern in a set of one or more inputs with a first stimulus, learning a relational aspect between one or more elements of the first pattern in the set of inputs and referencing of the first pattern, referencing a second pattern in the set of one or more inputs with a second stimulus, learning a relational aspect between one or more elements of the second pattern in the set of inputs and referencing of the second pattern, replaying the first and second patterns in the set of inputs using the learned relational aspects without the first and second stimuli, and associating the first and second patterns based on the replay.

Certain aspects of the present disclosure provide an apparatus for neural associative learning. The apparatus generally includes a first circuit configured to reference a first pattern in a set of one or more inputs with a first stimulus, a second circuit configured to learn a relational aspect between one or more elements of the first pattern in the set of inputs and referencing of the first pattern, a third circuit configured to reference a second pattern in the set of one or more inputs with a second stimulus, a fourth circuit configured to learn a relational aspect between one or more elements of the second pattern in the set of inputs and referencing of the second pattern, a fifth circuit configured to replay the first and second patterns in the set of inputs using the learned relational aspects without the first and second stimuli, and a sixth circuit configured to associate the first and second patterns based on the replay.

Certain aspects of the present disclosure provide an apparatus for neural associative learning. The apparatus generally includes means for referencing a first pattern in a set of one or more inputs with a first stimulus, means for learning a relational aspect between one or more elements of the first pattern in the set of inputs and referencing of the first pattern, means for referencing a second pattern in the set of one or more inputs with a second stimulus, means for learning a relational aspect between one or more elements of the second pattern in the set of inputs and referencing of the second pattern, means for replaying the first and second patterns in the set of inputs using the learned relational aspects without the first and second stimuli, and means for associating the first and second patterns based on the replay.

Certain aspects of the present disclosure provide a computer program product for neural associative learning. The computer program product generally includes a computer-readable medium comprising code for referencing a first pattern in a set of one or more inputs with a first stimulus, learning a relational aspect between one or more elements of the first pattern in the set of inputs and referencing of the first pattern, referencing a second pattern in the set of one or more inputs with a second stimulus, learning a relational aspect between one or more elements of the second pattern in the set of inputs and referencing of the second pattern, replaying the first and second patterns in the set of inputs using the learned relational aspects without the first and second stimuli, and associating the first and second patterns based on the replay.

Certain aspects of the present disclosure provide a method of neural comparison. The method generally includes referencing a first pattern in a set of one or more inputs with a first stimulus, learning a relational aspect between one or more elements of the first pattern in the set of inputs and referencing of the first pattern, referencing a second pattern in the set of one or more inputs with a second stimulus, replaying the first pattern, and comparing the first pattern with the second pattern based on the replay and referencing of the first and second patterns.

Certain aspects of the present disclosure provide an apparatus for neural comparison. The apparatus generally includes a first circuit configured to reference a first pattern in a set of one or more inputs with a first stimulus, a second circuit configured to learn a relational aspect between one or more elements of the first pattern in the set of inputs and referencing of the first pattern, a third circuit configured to reference a second pattern in the set of one or more inputs with a second stimulus, a fourth circuit configured to replay the first pattern, and a fifth circuit configured to compare the first pattern with the second pattern based on the replay and referencing of the first and second patterns.

Certain aspects of the present disclosure provide an apparatus for neural comparison. The apparatus generally includes means for referencing a first pattern in a set of one or more inputs with a first stimulus, means for learning a relational aspect between one or more elements of the first pattern in the set of inputs and referencing of the first pattern, means for referencing a second pattern in the set of one or more inputs with a second stimulus, means for replaying the first pattern, and means for comparing the first pattern with the second pattern based on the replay and referencing of the first and second patterns.

Certain aspects of the present disclosure provide a computer program product for neural comparison. The computer program product generally includes a computer-readable medium comprising code for referencing a first pattern in a set of one or more inputs with a first stimulus, learning a relational aspect between one or more elements of the first pattern in the set of inputs and referencing of the first pattern, referencing a second pattern in the set of one or more inputs with a second stimulus, replaying the first pattern, and comparing the first pattern with the second pattern based on the replay and referencing of the first and second patterns.

Certain aspects of the present disclosure provide a method of neural pattern completion. The method generally includes referencing a first pattern in a set of one or more inputs with a first stimulus, learning a relational aspect between one or more elements of the first pattern in the set of inputs and referencing of first pattern, referencing a second pattern in the set of one or more inputs with a second stimulus, wherein the second pattern comprises a degraded version of the first pattern, and replaying at least one element of the first pattern missing or being degraded from the second pattern in response to exposure to at least one of the second pattern or the second stimulus.

Certain aspects of the present disclosure provide an apparatus for neural pattern completion. The apparatus generally includes a first circuit configured to reference a first pattern in a set of one or more inputs with a first stimulus, a second circuit configured to learn a relational aspect between one or more elements of the first pattern in the set of inputs and referencing of first pattern, a third circuit configured to reference a second pattern in the set of one or more inputs with a second stimulus, wherein the second pattern comprises a degraded version of the first pattern, and a fourth circuit configured to replay at least one element of the first pattern missing or being degraded from the second pattern in response to exposure to at least one of the second pattern or the second stimulus.

Certain aspects of the present disclosure provide an apparatus for neural pattern completion. The apparatus generally includes means for referencing a first pattern in a set of one or more inputs with a first stimulus, means for learning a relational aspect between one or more elements of the first pattern in the set of inputs and referencing of first pattern, means for referencing a second pattern in the set of one or more inputs with a second stimulus, wherein the second pattern comprises a degraded version of the first pattern, and means for replaying at least one element of the first pattern missing or being degraded from the second pattern in response to exposure to at least one of the second pattern or the second stimulus.

Certain aspects of the present disclosure provide a computer program product for neural pattern completion. The computer program product generally includes a computer-readable medium comprising code for referencing a first pattern in a set of one or more inputs with a first stimulus, learning a relational aspect between one or more elements of the first pattern in the set of inputs and referencing of first pattern, referencing a second pattern in the set of one or more inputs with a second stimulus, wherein the second pattern comprises a degraded version of the first pattern, and replaying at least one element of the first pattern missing or being degraded from the second pattern in response to exposure to at least one of the second pattern or the second stimulus.

Certain aspects of the present disclosure provide a method of neural pattern separation. The method generally includes referencing a first pattern in a set of one or more inputs with one or more referencing neurons, learning a first relational aspect between one or more elements of the first pattern and referencing of the first pattern, referencing a second pattern in the set of one or more inputs with the one or more referencing neurons, wherein the second pattern is similar to the first pattern, learning a second relational aspect between one or more elements of the second pattern and referencing of the second pattern, modifying at least one of the first pattern or the second pattern to increase a difference between the first and second patterns, and referencing, after the modification using the one or more referencing neurons, the first pattern with a first stimulus and the second pattern with a second stimulus, wherein the first stimulus is distinct from the second stimulus.

Certain aspects of the present disclosure provide an apparatus for neural pattern separation. The apparatus generally includes a first circuit configured to reference a first pattern in a set of one or more inputs with one or more referencing neurons, a second circuit configured to learn a first relational aspect between one or more elements of the first pattern and referencing of the first pattern, a third circuit configured to reference a second pattern in the set of one or more inputs with the one or more referencing neurons, wherein the second pattern is similar to the first pattern, a fourth circuit configured to learn a second relational aspect between one or more elements of the second pattern and referencing of the second pattern, a fifth circuit configured to modify at least one of the first pattern or the second pattern to increase a difference between the first and second patterns, and a sixth circuit configured to reference, after the modification using the one or more referencing neurons, the first pattern with a first stimulus and the second pattern with a second stimulus, wherein the first stimulus is distinct from the second stimulus.

Certain aspects of the present disclosure provide an apparatus for neural pattern separation. The apparatus generally includes means for referencing a first pattern in a set of one or more inputs with one or more referencing neurons, means for learning a first relational aspect between one or more elements of the first pattern and referencing of the first pattern, means for referencing a second pattern in the set of one or more inputs with the one or more referencing neurons, wherein the second pattern is similar to the first pattern, means for learning a second relational aspect between one or more elements of the second pattern and referencing of the second pattern, means for modifying at least one of the first pattern or the second pattern to increase a difference between the first and second patterns, and means for referencing, after the modification using the one or more referencing neurons, the first pattern with a first stimulus and the second pattern with a second stimulus, wherein the first stimulus is distinct from the second stimulus.

Certain aspects of the present disclosure provide a computer program product for neural pattern separation. The computer program product generally includes a computer-readable medium comprising code for referencing a first pattern in a set of one or more inputs with one or more referencing neurons, learning a first relational aspect between one or more elements of the first pattern and referencing of the first pattern, referencing a second pattern in the set of one or more inputs with the one or more referencing neurons, wherein the second pattern is similar to the first pattern, learning a second relational aspect between one or more elements of the second pattern and referencing of the second pattern, modifying at least one of the first pattern or the second pattern to increase a difference between the first and second patterns, and referencing, after the modification using the one or more referencing neurons, the first pattern with a first stimulus and the second pattern with a second stimulus, wherein the first stimulus is distinct from the second stimulus.

Certain aspects of the present disclosure provide a method of neural pattern generalization. The method generally includes referencing a first pattern in a set of one or more inputs with a first stimulus, learning a relational aspect between one or more elements of the first pattern in the set of inputs and referencing of the first pattern, referencing a second pattern in the set of one or more inputs with a second stimulus, learning a relational aspect between one or more elements of the second pattern in the set of inputs and referencing of the second pattern, replaying at least one of the first pattern or the second pattern without the first and second stimuli, and learning a generalization of the first and second patterns based on the replay.

Certain aspects of the present disclosure provide an apparatus for neural pattern generalization. The apparatus generally includes a first circuit configured to reference a first pattern in a set of one or more inputs with a first stimulus, a second circuit configured to learn a relational aspect between one or more elements of the first pattern in the set of inputs and referencing of the first pattern, a third circuit configured to reference a second pattern in the set of one or more inputs with a second stimulus, a fourth circuit configured to learn a relational aspect between one or more elements of the second pattern in the set of inputs and referencing of the second pattern, a fifth circuit configured to replay at least one of the first pattern or the second pattern without the first and second stimuli, and a sixth circuit configured to learn a generalization of the first and second patterns based on the replay.

Certain aspects of the present disclosure provide an apparatus for neural pattern generalization. The apparatus generally includes means for referencing a first pattern in a set of one or more inputs with a first stimulus, means for learning a relational aspect between one or more elements of the first pattern in the set of inputs and referencing of the first pattern, means for referencing a second pattern in the set of one or more inputs with a second stimulus, means for learning a relational aspect between one or more elements of the second pattern in the set of inputs and referencing of the second pattern, means for replaying at least one of the first pattern or the second pattern without the first and second stimuli, and means for learning a generalization of the first and second patterns based on the replay.

Certain aspects of the present disclosure provide a computer program product for neural pattern generalization. The computer program product generally includes a computer-readable medium comprising code for referencing a first pattern in a set of one or more inputs with a first stimulus, learning a relational aspect between one or more elements of the first pattern in the set of inputs and referencing of the first pattern, referencing a second pattern in the set of one or more inputs with a second stimulus, learning a relational aspect between one or more elements of the second pattern in the set of inputs and referencing of the second pattern, replaying at least one of the first pattern or the second pattern without the first and second stimuli, and learning a generalization of the first and second patterns based on the replay.

Certain aspects of the present disclosure provide a method of neural pattern sequence completion. The method generally includes referencing each sequence of parts of a pattern in a set of one or more first layer neurons with a second layer of referencing neurons, learning a relational aspect between one or more elements of the pattern and the referencing of that sequence of parts of the pattern, referencing a pattern sequence in the second layer of referencing neurons with a third layer of referencing neurons, learning a relational aspect between one or more elements of the pattern sequence and the referencing of pattern sequence in the second layer of referencing neurons, and replaying a subsequent part of the pattern in the first layer neurons upon producing a prior part of the pattern.

Certain aspects of the present disclosure provide an apparatus for neural pattern sequence completion. The apparatus generally includes a first circuit configured to reference each sequence of parts of a pattern in a set of one or more first layer neurons with a second layer of referencing neurons, a second circuit configured to learn a relational aspect between one or more elements of the pattern and the referencing of that sequence of parts of the pattern, a third circuit configured to reference a pattern sequence in the second layer of referencing neurons with a third layer of referencing neurons, a fourth circuit configured to learn a relational aspect between one or more elements of the pattern sequence and the referencing of pattern sequence in the second layer of referencing neurons, and a fifth circuit configured to replay a subsequent part of the pattern in the first layer neurons upon producing a prior part of the pattern.

Certain aspects of the present disclosure provide an apparatus for neural pattern sequence completion. The apparatus generally includes means for referencing each sequence of parts of a pattern in a set of one or more first layer neurons with a second layer of referencing neurons, means for learning a relational aspect between one or more elements of the pattern and the referencing of that sequence of parts of the pattern, means for referencing a pattern sequence in the second layer of referencing neurons with a third layer of referencing neurons, means for learning a relational aspect between one or more elements of the pattern sequence and the referencing of pattern sequence in the second layer of referencing neurons, and means for replaying a subsequent part of the pattern in the first layer neurons upon producing a prior part of the pattern.

Certain aspects of the present disclosure provide a computer program product for neural pattern sequence completion. The computer program product generally includes a computer-readable medium comprising code for referencing each sequence of parts of a pattern in a set of one or more first layer neurons with a second layer of referencing neurons, learning a relational aspect between one or more elements of the pattern and the referencing of that sequence of parts of the pattern, referencing a pattern sequence in the second layer of referencing neurons with a third layer of referencing neurons, learning a relational aspect between one or more elements of the pattern sequence and the referencing of pattern sequence in the second layer of referencing neurons, and replaying a subsequent part of the pattern in the first layer neurons upon producing a prior part of the pattern.

Certain aspects of the present disclosure provide a method of neural pattern hierarchical replay. The method generally includes referencing each sequence of parts of a pattern in a set of one or more first layer neurons with a second layer of referencing neurons, learning a relational aspect between one or more elements of each pattern and the referencing of that sequence of parts of the pattern in the set of one or more first layer neurons, referencing a pattern sequence in the second layer of referencing neurons with a third layer of referencing neurons, learning a relational aspect between one or more elements of the pattern sequence and the referencing of the pattern sequence in the second layer of referencing neurons, invoking replay of the referencing of the pattern sequence in the second layer based on the third layer of referencing neurons, and replaying that sequence of parts of the pattern in the first layer based on the invoking of replay of the referencing of the pattern sequence in the second layer.

Certain aspects of the present disclosure provide an apparatus for neural pattern hierarchical replay. The apparatus generally includes a first circuit configured to reference each sequence of parts of a pattern in a set of one or more first layer neurons with a second layer of referencing neurons, a second circuit configured to learn a relational aspect between one or more elements of each pattern and the referencing of that sequence of parts of the pattern, a third circuit configured to reference a pattern sequence in the second layer of referencing neurons with a third layer of referencing neurons, a fourth circuit configured to learn a relational aspect between one or more elements of the pattern sequence and the referencing of the pattern sequence in the second layer of referencing neurons, a fifth circuit configured to invoke replay of the referencing of the pattern sequence in the second layer based on the third layer of referencing neurons, and a sixth circuit configured to replay that sequence of parts of the pattern in the first layer based on the invoking of replay of the referencing of the pattern sequence in the second layer.

Certain aspects of the present disclosure provide an apparatus for neural pattern hierarchical replay. The apparatus generally includes means for referencing each sequence of parts of a pattern in a set of one or more first layer neurons with a second layer of referencing neurons, means for learning a relational aspect between one or more elements of each pattern and the referencing of that sequence of parts of the pattern, means for referencing a pattern sequence in the second layer of referencing neurons with a third layer of referencing neurons, means for learning a relational aspect between one or more elements of the pattern sequence and the referencing of the pattern sequence in the second layer of referencing neurons, means for invoking replay of the referencing of the pattern sequence in the second layer based on the third layer of referencing neurons, and means for replaying that sequence of parts of the pattern in the first layer based on the invoking of replay of the referencing of the pattern sequence in the second layer.

Certain aspects of the present disclosure provide a computer program product for neural pattern hierarchical replay. The computer program product generally includes a computer-readable medium comprising code for referencing each sequence of parts of a pattern in a set of one or more first layer neurons with a second layer of referencing neurons, learning a relational aspect between one or more elements of each pattern and the referencing of that sequence of parts of the pattern in the set of one or more first layer neurons, referencing a pattern sequence in the second layer of referencing neurons with a third layer of referencing neurons, learning a relational aspect between one or more elements of the pattern sequence and the referencing of the pattern sequence in the second layer of referencing neurons, invoking replay of the referencing of the pattern sequence in the second layer based on the third layer of referencing neurons, and replaying that sequence of parts of the pattern in the first layer based on the invoking of replay of the referencing of the pattern sequence in the second layer.

Certain aspects of the present disclosure provide a method of neural pattern sequence completion. The method generally includes referencing a plurality of parts of a pattern in a plurality of afferent neurons with a plurality of referencing neurons, relating, with one or more relational aspect neurons, one or more of the parts of the pattern to a subset of the referencing neurons based on a delay between the afferent neurons and the one or more relational aspect neurons being smaller than a first value, relating, with the one or more relational aspect neurons, one or more remaining parts of the pattern to the subset of referencing neurons based on the delay being larger than a second value, and inducing replay of the one or more remaining parts of the pattern by the subset of referencing neurons based on firing elements of the one or more parts of the pattern by the afferent neurons.

Certain aspects of the present disclosure provide an apparatus for neural pattern sequence completion. The apparatus generally includes a first circuit configured to reference a plurality of parts of a pattern in a plurality of afferent neurons with a plurality of referencing neurons, a second circuit configured to relate, with one or more relational aspect neurons, one or more of the parts of the pattern to a subset of the referencing neurons based on a delay between the afferent neurons and the one or more relational aspect neurons being smaller than a first value, a third circuit configured to relate, with the one or more relational aspect neurons, one or more remaining parts of the pattern to the subset of referencing neurons based on the delay being larger than a second value, and a fourth circuit configured to induce replay of the one or more remaining parts of the pattern by the subset of referencing neurons based on firing elements of the one or more parts of the pattern by the afferent neurons.

Certain aspects of the present disclosure provide an apparatus for neural pattern sequence completion. The apparatus generally includes means for referencing a plurality of parts of a pattern in a plurality of afferent neurons with a plurality of referencing neurons, means for relating, with one or more relational aspect neurons, one or more of the parts of the pattern to a subset of the referencing neurons based on a delay between the afferent neurons and the one or more relational aspect neurons being smaller than a first value, means for relating, with the one or more relational aspect neurons, one or more remaining parts of the pattern to the subset of referencing neurons based on the delay being larger than a second value, and means for inducing replay of the one or more remaining parts of the pattern by the subset of referencing neurons based on firing elements of the one or more parts of the pattern by the afferent neurons.

Certain aspects of the present disclosure provide a computer program product for neural pattern sequence completion. The computer program product generally includes a computer-readable medium comprising code for referencing a plurality of parts of a pattern in a plurality of afferent neurons with a plurality of referencing neurons, relating, with one or more relational aspect neurons, one or more of the parts of the pattern to a subset of the referencing neurons based on a delay between the afferent neurons and the one or more relational aspect neurons being smaller than a first value, relating, with the one or more relational aspect neurons, one or more remaining parts of the pattern to the subset of referencing neurons based on the delay being larger than a second value, and inducing replay of the one or more remaining parts of the pattern by the subset of referencing neurons based on firing elements of the one or more parts of the pattern by the afferent neurons.

Certain aspects of the present disclosure provide a method of neural component replay. The method generally includes referencing a pattern in a plurality of afferent neuron outputs with one or more referencing neurons, learning one or more relational aspects between the pattern in the plurality of afferent neuron outputs and an output of the one or more referencing neurons with one or more relational aspect neurons using structural plasticity, and inducing one or more of the plurality of afferent neurons to output a substantially similar pattern as the referenced pattern by the one or more referencing neurons.

Certain aspects of the present disclosure provide an apparatus for neural component replay. The apparatus generally includes a first circuit configured to reference a pattern in a plurality of afferent neuron outputs with one or more referencing neurons, a second circuit configured to learn one or more relational aspects between the pattern in the plurality of afferent neuron outputs and an output of the one or more referencing neurons with one or more relational aspect neurons using structural plasticity, and a third circuit configured to induce one or more of the plurality of afferent neurons to output a substantially similar pattern as the referenced pattern by the one or more referencing neurons.

Certain aspects of the present disclosure provide an apparatus for neural component replay. The apparatus generally includes means for referencing a pattern in a plurality of afferent neuron outputs with one or more referencing neurons, means for learning one or more relational aspects between the pattern in the plurality of afferent neuron outputs and an output of the one or more referencing neurons with one or more relational aspect neurons using structural plasticity, and means for inducing one or more of the plurality of afferent neurons to output a substantially similar pattern as the referenced pattern by the one or more referencing neurons.

Certain aspects of the present disclosure provide a computer program product for neural component replay. The computer program product generally includes a computer-readable medium comprising code for referencing a pattern in a plurality of afferent neuron outputs with one or more referencing neurons, learning one or more relational aspects between the pattern in the plurality of afferent neuron outputs and an output of the one or more referencing neurons with one or more relational aspect neurons using structural plasticity, and inducing one or more of the plurality of afferent neurons to output a substantially similar pattern as the referenced pattern by the one or more referencing neurons.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
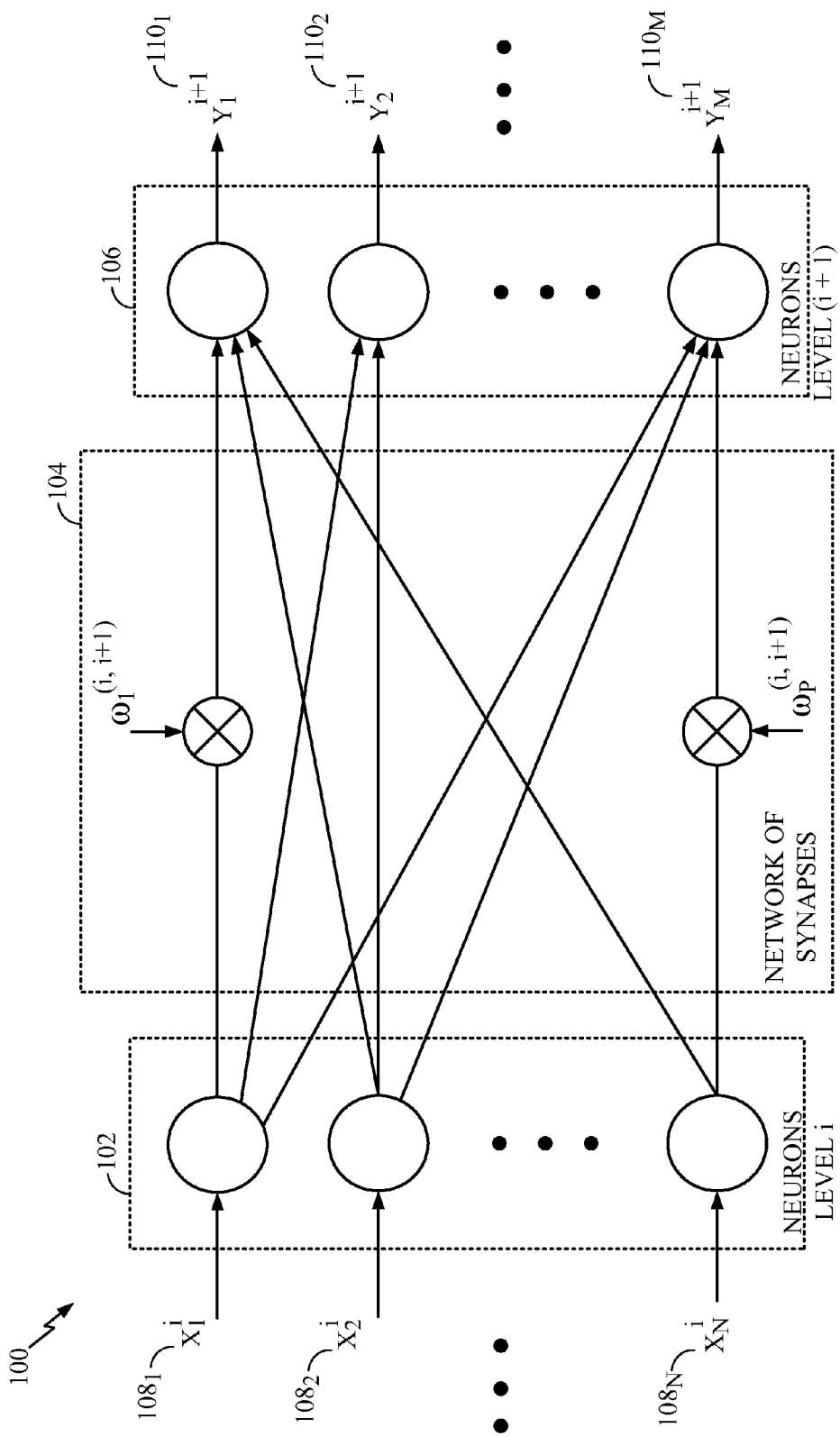
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104. For simplicity, only two levels of neurons are illustrated in FIG. 1, although fewer or more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons, scale those signals according to adjustable synaptic weights $w_1^{(i,i+1)}, \ldots, w_P^{(i,i+1)}$ (where P is a total number of synaptic connections between the neurons of levels 102 and 106), and combine the scaled signals as an input signal of each neuron in the level 106. Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated by an electrical circuit and utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Certain aspects of the present disclosure support methods for solving the problem of truly replaying a neural firing pattern that has been learned by one or more neurons (e.g., the neurons illustrated in FIG. 1) in the absence of original stimulus. Furthermore, the methods proposed in the present disclosure solve the problems of fast learning, learning refinement, association, and memory transfer after the original stimulus is no longer present.

Current methods of learning a pattern with biologically inspired neuron models are functionally one-way methods: in order to determine what pattern a neuron matches, one would need to try different patterns until the matching one is found. A method of true replay of what has been learned, either biologically or by machine is generally unknown. The present disclosure provides a method to learn to replay a pattern (either forward, or reverse, or both) and to replay the true pattern by the same neurons that produced the original pattern under stimulus and, furthermore, by excitation of the same neuron(s) that learned the pattern or that learned merely a subset of the pattern. Moreover, methods of the present disclosure allow for very fast learning and can be highly scalable because multiple patterns, learned by one or more neurons, can be replayed by the same neural structure (without adding neurons). Finally, learning of patterns and learning to replay can both be achieved in an unsupervised manner.

Learning replay may also provide a basis for learning a pattern better or more completely. Moreover, it may alleviate the requirement to learn the pattern during the stimulus. In addition to replay, the present disclosure provides a method for new or continued downstream or upstream (or both) processing operations without the original stimulus. Thus, using methods of the present disclosure, even if a stimulus is presented only briefly, the capability to replay an internal response pattern and continue to process the experience may become possible, thereby offering substantial advantages for machine learning. The present disclosure not only provides a method to replay true neural patterns, but also provide methods to refine learning of patterns without stimulus to improve or extend learning, as well as to transfer, consolidate or organize memories, to complete patterns or sequences of patterns, and to associate or learn association of concepts and/or inputs without the need to have a stimulus present. Finally, since these methods may be applicable to concepts, sensory inputs, or signals at any level of abstraction, context and content, the proposed methods may be both fundamental and general.

Replay of Neural Firing Pattern

As aforementioned, prior methods of truly replaying a neural firing pattern are generally unknown. However, it may be required not only to determine if a given pattern matches a stored (or learned) pattern, but to directly determine what the stored (or learned) pattern is. In addition, it may be required to reproduce the pattern in the original afferents (inputs), via the neurons that originally produced the pattern. Further, it may be required to relate the pattern replay to the neuron that learned or matched the pattern (or had some correspondence to the pattern). In addition, it may be required to reproduce a faithful or high-fidelity replay of the stored (or learned) pattern, as well as to proceed with continued processing such as learning refinement, association, memory transfer using replay without the requirement for the original stimulus to produce the pattern.

Although certain methods of pattern replay exist in the literature, these methods have several flaws. First, the pattern may not be played by the same neurons that played the pattern under a stimulus. Therefore, this may not represent a true replay, but rather a copy of replay by some other neurons. In this case, downstream effects from the afferents may be lost because the "replay" is not produced by the same afferents.

Second, elements of the pattern (e.g., spikes) may not be uniquely distinguishable, and connection between a particular pattern element and a particular afferent may be lost. Therefore, this may not be a replay of the same pattern, but rather a replay of a different pattern (e.g., an aggregated pattern). Third, there may be interference in the pattern (e.g., other activity in the afferents typically due to the "replay" trigger). Therefore, this may not actually be the same pattern, and downstream effects, including neuron matching to the pattern, may be disrupted.

Fourth, there may be interference (typically due to the "replay" trigger) in the output of neuron that learned the pattern. Hence, downstream effects from this neuron may be disrupted. Fifth, the "replay" capability may not be learnable in an unsupervised manner, or no method of learning at all may be known or available. Furthermore, other additional flaws may exist, such as only being able to "replay" in reverse, or only being able to "replay" with an approximate firing rate. These and other flaws will be discussed in reference to examples and analogies.

Problem of Truly Replaying What Neuron Matched/Learned

Figure 2:
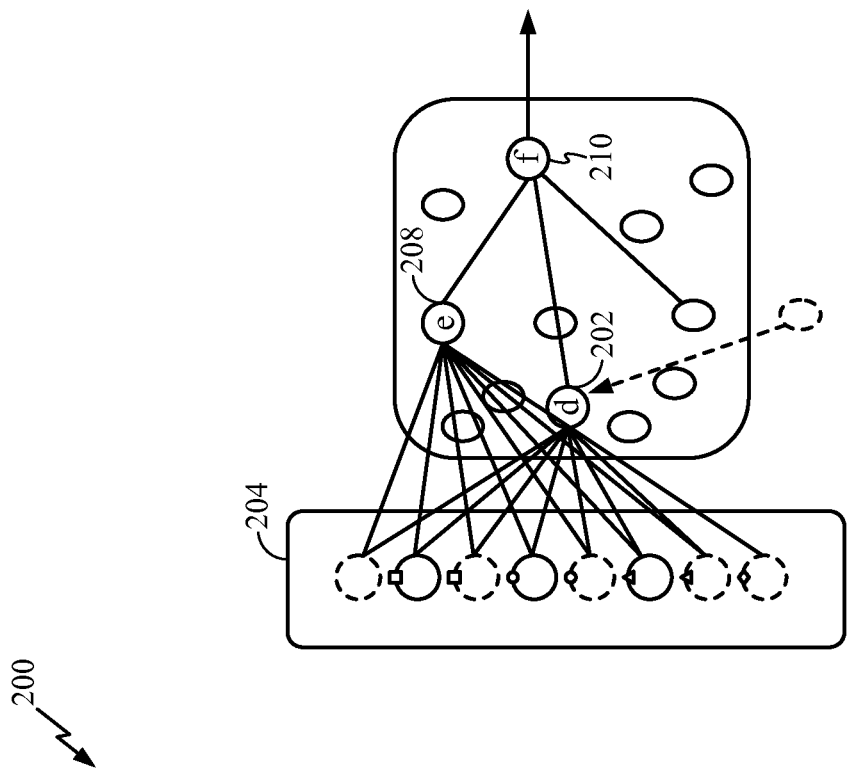
FIG. 2 illustrates an example of afferent neurons connected to a pattern-matching neuron in accordance with certain aspects of the present disclosure.
Figure 2:
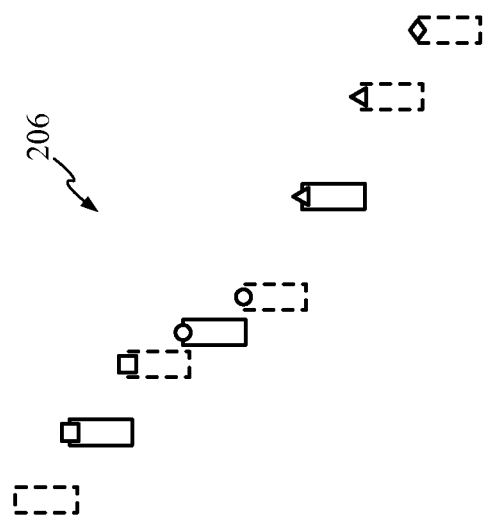

FIG. 2 illustrates an example 200 of afferent neurons connected to a pattern-matching neuron in accordance with certain aspects of the present disclosure. For example, a neuron 202 may match a pattern in a set of afferents (inputs) 204, whatever the cause or stimulus may be, whether external or internal. This situation is illustrated in FIG. 2 where the neuron 202 may match a pattern produced by the output of the afferent neurons 204 (corresponding to their firing pattern 206, where the x-axis may be thought of as time or firing rate or other coding dimension). In this case, the term afferent is not meant to infer any particular meaning in terms of stage or layer of processing except that it represents an input to the neuron 202 (i.e., afferents from the point of view of neuron 202). The afferents 204 may be merely upstream neurons (e.g., upstream of the neuron 202), or sensory neurons, or neurons in any particular stage or layer of processing.

Typical neurons may be modeled as leaky-integrate-and-fire (LIF) neurons, or as dynamic spiking neurons, or even simple sum and sigmoid functions. Regardless, these operations may be one-way functions since it may not be possible operationally to determine what specific signal combination or pattern the neuron 202 matches without trying different patterns until a match is found (i.e., without analyzing the internals such as synaptic weights and delays). There may be a fundamental difference between being able to store information and whether or not (and how) this information can be read out of memory. The question is how a learned pattern can be read out (replayed).

Problem of Replay Fidelity

Ideally, the read-out pattern should be faithful enough to the original to be recognized by a neuron that learned the original pattern during a stimulus. The question is how the read-out pattern can be reproduced so well that the very neuron that learned it can recognize it.

Problem of Offline Processing

The inability to truly replay a pattern without the original stimulus may be a critical limitation for machine learning because it may require that an input or stimulus is present long enough for all aspects of learning to occur. Yet, learning may need to occur at multiple stages in a downstream processing network (or even in upstream due to a feedback) or in a different order than presented in real-time. The question is how continued learning, refinement of learning, transfer of memory (learning), and other various downstream operations (or upstream operations or feedback) can be proceed once the original stimulus (input) is over.

Flawed "Replay" Attempts

First, one might consider just stimulating a neuron that matched a pattern (e.g., the neuron 202 in FIG. 2) to fire (spike output) again, but this would have limited use because it may not provide a method for reproducing the same downstream effects at other neurons (e.g., neurons 208 and 210 in FIG. 2). This would be somewhat like claiming merely by stating "that's the person A" is a replay of seeing the person A. With the former, one cannot examine features of the person A, compare them, or proceed with any further processing. Therefore, a method may be required of replaying the original pattern (or substantially similar pattern) produced by the afferents via those same afferents (not other neurons), and without interference to the pattern. Otherwise, the downstream effect would be lost or incomplete. Therefore, if a stimulus is presented only briefly, the capability to replay an internal response pattern and continue to process the experience would be a substantial advantage for machine learning.

Second, it should be noted the importance of distinction as to which neurons replay the pattern. For example, a network may only be able to play the same pattern via different neurons (not the original afferents). Even if those different neurons were also provided as inputs to the neuron 202 from FIG. 2, the question is how the neuron 202 would recognize this as the "same" pattern without having to manually intervene to connect up these different inputs to have the same effect as the neuron 202 learned from the afferents. A clear demonstration of this flaw is that the neuron 202 will not recognize the copy played by the different neurons. Clearly, the "replay" via different neurons does not represent a true replay at all, and it may be ineffective in terms of any downstream effects, including the neuron that learned the pattern.

Third, the relevance of pattern-matching neuron in replay is important. If the pattern matching neuron itself matches the original play as well as the replay, a measure of fidelity may be established. Moreover, if that neuron is involved in invoking that replay, there may be a bi-directional association of the pattern and the pattern-matching neuron. There is thus motivation to relate the replay of the pattern to the neuron or neurons that learned the pattern. In other words, one may like to have the neuron 202 from FIG. 2 involved in the control or inducing process of replaying the pattern that the neuron 202 learned (or at least matched). For example, there could be a requirement to replay a pattern learned by the neuron 202. Ideally, the replay trigger would involve the neuron 202 and have the same downstream effects possible, including recognition of the replayed pattern by the neuron 202 itself. While it may not be necessary that the pattern matching neuron directly induce the replay, it may be of interest that this neuron is involved in the process, e.g., even if it results in a reverse replay first (or some other transform of the original pattern) and then eventually in a transform back to the original version via the original afferents.

Fourth, playing an aggregate, derivative or sum of pattern elements (whether forward or reverse, compressed or not), firing rate or other function of a pattern may not be a replay of that pattern. An analogy would be that typing 'qwert[space]y' on the keyboard can be "replayed" by typing the key 'x' on the keyboard five times followed by a 'space' then 'x' again; yes, there are six letter key presses and the last occurs after a space, but which 'x' corresponds to which of the elements of the pattern is unknown. The point is that one 'x' cannot be distinguished from another 'x' in the so-called "replay", and, therefore, it may not be possible to represent a specific relation between the unique letters in the original pattern. To summarize, what is required is a replay of the actual original pattern via the same afferents without interference.

Problem of Memory Transfer

Patterns have meaning only in terms of what neurons produced the pattern. For an analogy, if one were to state a sequence of numbers, the sequence has meaning in terms of not merely how many numbers are in the sequence and their relative order, but what the specific numbers are. The process of "transferring" memory by learning an output of a first layer with a second layer and then learning the output of the second layer with a third layer does not represent the memory of the first layer pattern being transferred. In order to transfer memory of the first layer, the third layer would also have to learn the first layer output. Without the original stimulus, this would require replay, not of the second layer, but of the first layer.

Generality of Problem

Biological evidence of replay of patterns has been observed in vivo, in particular, in the hippocampus, visual system and other brain areas. Such replay may occur forward and reverse, compressed in time and uncompressed. However, the mechanism causing such replay is unknown. Further, recent evidence has shown that hippocampal cells may match or correspond to upstream patterns or states corresponding to "place" or episodic aspects of behavior, but they may later be "erased" or reset, while memories may be retained. One possibility is that such memory is consolidated into other or longer-term memory.

In general, the replay may be in use since it may apply to any sensory modality or at any conceptual level in order to reverse the learning or memory function. Thus, the replay may represent an important general cortical problem to which a general solution would be very valuable.

Methods of Replay and Associated Methods of Further Processing Including Learning Refinement, Association, and Memory Transfer Certain aspects of the present disclosure support methods of replay, and associated methods of further processing including learning refinement, association, memory transfer and more.

Replay

A method of component replay proposed in the present disclosure may solve the aforementioned problems of pattern replay. The component replay may be generally defined as the replay of pattern in afferents substantially referenced by a particular neuron via the same afferents. The particular neuron that references the pattern (reference neuron) may respond selectively in relation to the pattern and learn that selectivity. Aggregate patterns or larger or longer scale patterns may be replayed by combining component replays. Component replays may thus be utilized to generate systemic replays in neural networks.

Figure 3:
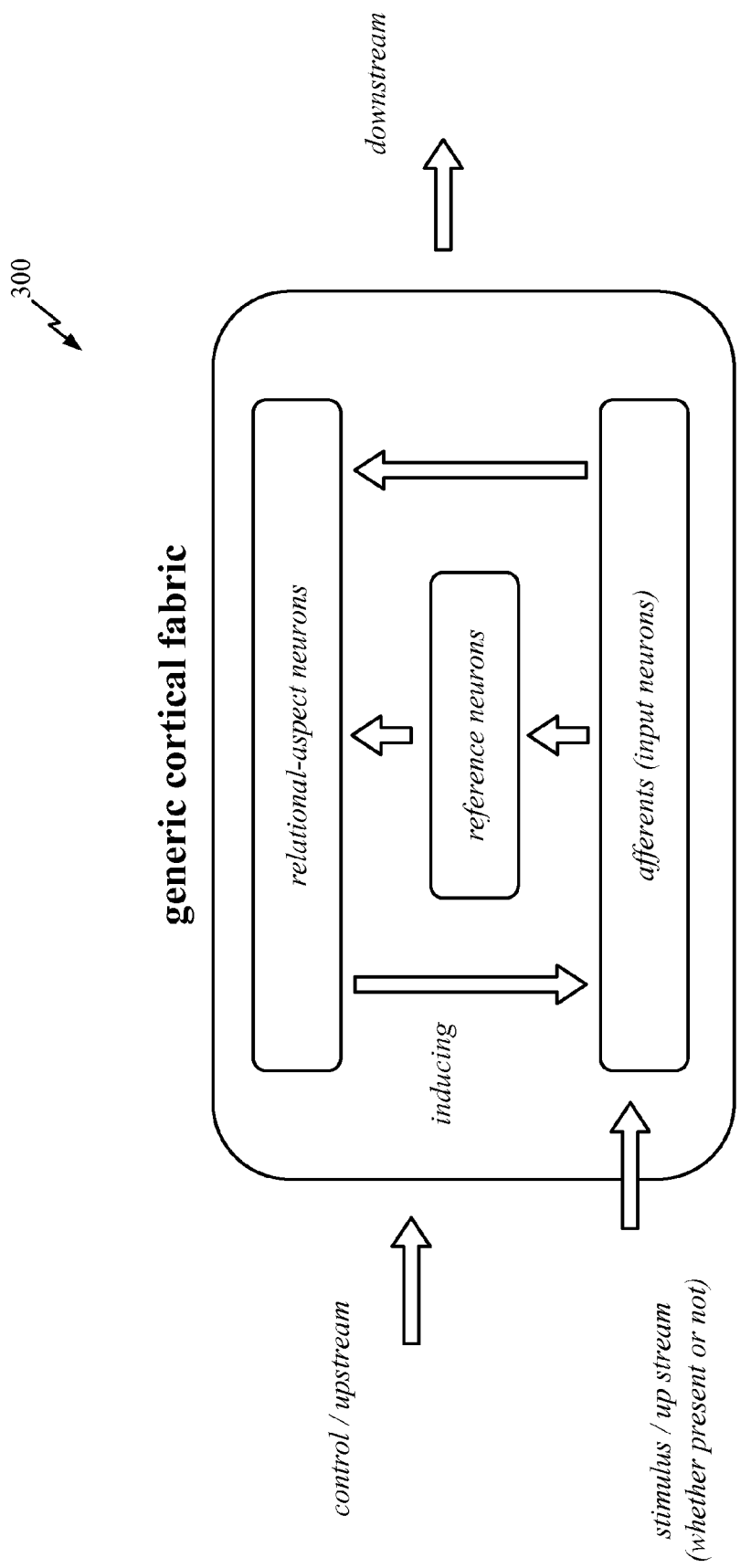
FIG. 3 illustrates an example of general method of component replay in accordance with certain aspects of the present disclosure.

The general method of component replay illustrated by a flow diagram 300 in FIG. 3 may comprise learning (or at least matching) a pattern in a plurality of afferent neuron responses using one or more pattern learning (or at least matching) neurons. Also, the method of component replay may further comprise learning one or more relational aspects of the learning neurons and the afferent pattern using one or more relational learning (or at least matching) neurons.

As illustrated in FIG. 3, the general method of replay may comprise learning a pattern and hence reference neurons may be referred to as pattern learning neurons. However, learning of the pattern by a pattern learning neuron may not be required. Rather, the pattern learning neuron may be replaced by a reference neuron that may or may not learn, may or may not match a pattern in afferents, and may not even be connected to the afferents. All that is required may be a reference that corresponds to the pattern in the afferents (i.e., consistent in having some relation to the pattern, such as firing at a particular time relative to a particular afferent pattern). It should be noted that the mid-layer of cortical fabric can be generally referred to as either reference neurons or pattern learning (or at least matching) neurons.

The neural component replay concept will be described in detail in a temporal coding context, although the method may be general and may be applied to firing rate coding, coincidence coding, or other signal coding variations. Delays due to signal propagation along axons, passing through relays, or dendritic processes or even at synapses may be abstracted.

A Demonstrative Replay Embodiment

Figure 4:
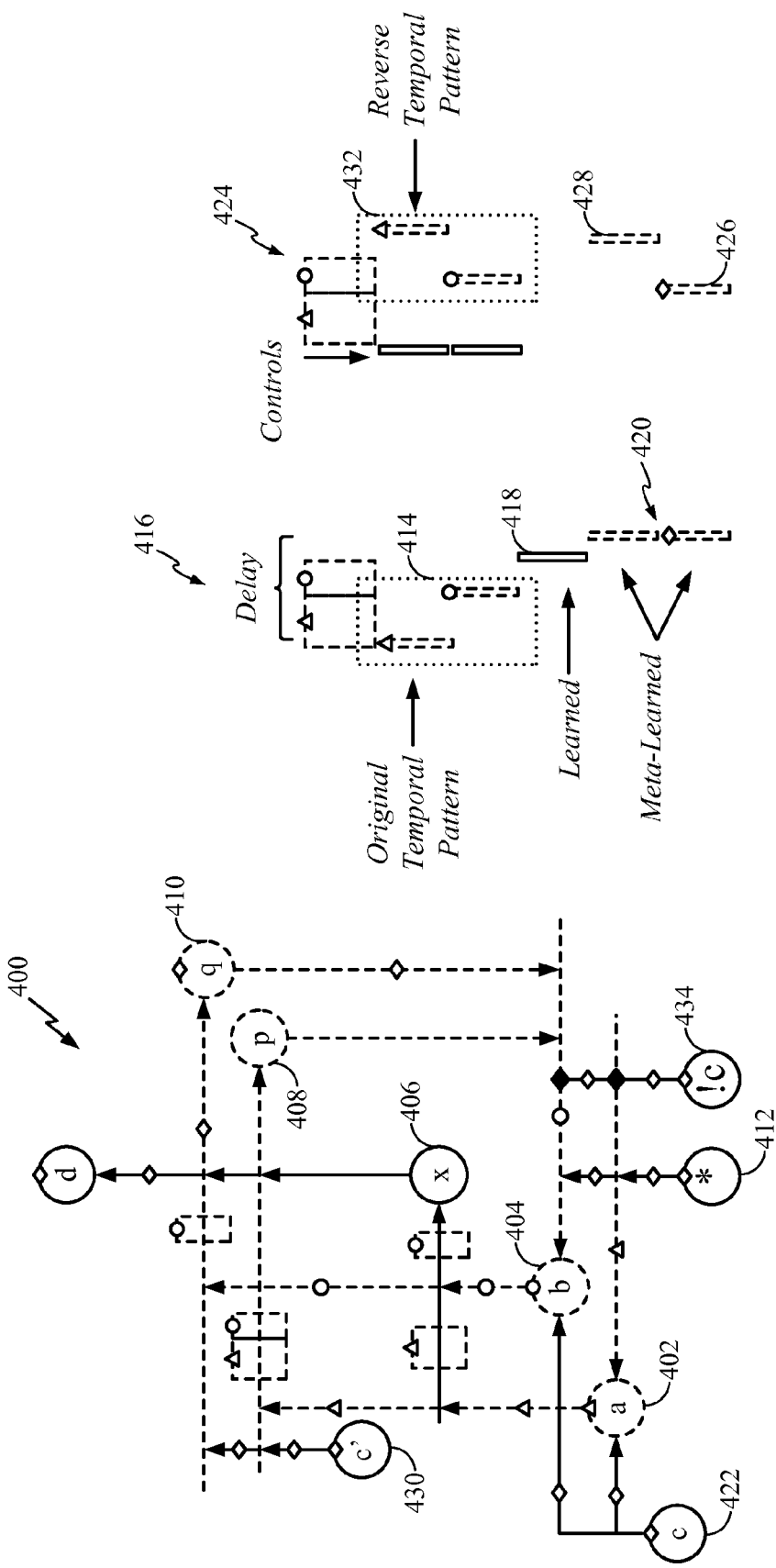
FIG. 4 illustrates an example of demonstrative replay embodiment in accordance with certain aspects of the present disclosure.

FIG. 4 illustrates an example neural connectivity diagram 400 of a first demonstrative embodiment of the present disclosure in such a temporal coding context. Neurons 402 and 404 may be representative of afferents, a neuron 406 may be a pattern-matching or learning neuron, and neurons 408 and 410 may be relational-aspect learning/matching neurons. In this temporal coding context, delays can be represented on connections by rectangles of various widths. The larger the rectangle is horizontally, the longer the delay may be. It should be also noted in the diagram 400 that connections only occur where arrows terminate (i.e., not merely because a line crosses another). The same convention will be used in other neural connectivity diagrams.

Under a stimulus 412, afferent neurons 402 and 404 may fire in a temporal pattern 414 depicted in a diagram 416, where the x-axis represents time and vertical bars indicate the time of firing of each neuron. The stimulus 412 may come from any of a number of sensory modalities such as touch, hearing, smell, taste, vision, etc, or merely from upstream in a neural network. It should be noted that if the neuron 406 is a leaky-integrate-and-fire or other typical neuron model and there is a particular threshold of two inputs for firing, then the neuron 406 might fire when the neuron 402 fires somewhat before the neuron 404. This may be because the connection from neuron 402 may need to pass through a larger delay before reaching the soma of neuron 406, while the connection from neuron 404 may pass through a smaller delay. Thus, the neuron 406 may match that particular temporal sequence, as exhibited in the diagram 416, and it may fire a spike 418. In the diagram 416, the neuron 406 may fire immediately after the delays, but this is merely an example and there may be some delay due to processing by the neuron 406 (e.g., a time constant).

It can be observed from the diagram 400 in FIG. 4 that the neuron 408 may receive input from the afferent neuron 402 and the pattern-matching/learning neuron 406. The delays that the input from neuron 402 encounters may align the signal to the response by the neuron 406. In effect, the neuron 408 may match the relation in timing between the afferent neuron 402 and the response of pattern-matching/learning neuron 406. The neuron 410 may achieve a similar effect with the afferent 404. It can be observed from the diagram 416 in FIG. 4 that, under the original stimulus 412, these relational-aspect learning neurons 408, 410 may fire in response to the respective relational aspects (e.g., a firing 420 in the diagram 416). In the diagram 416, the delay between the firing 418 and the firing 420 may be small, but non-zero. This is also merely an example; the actual delay may be zero or greater. Moreover, there may be a delay inserted between the input of 406 on the dendrites of neurons 408, 410 and the somas of neurons 408, 410.

In order to replay the pattern in this first embodiment, a control 422 may be applied for the original afferents to spike. This control may be from an input other than the stimulus 412 that produces the original pattern. It should be noted that, in this case, the control may be synchronous, as illustrated in a diagram 424 in FIG. 4. Because of the delays that neurons 408, 410 have learned (or at least match), the neurons 408, 410 may fire at delayed times, rather than at the same time (spikes 426 and 428 in the diagram 424). It should be noted that the inputs from neurons 402, 404 may need to be strong enough to cause the neurons 408, 410 to fire (not necessarily immediately, but at least eventually or with some background help such as oscillation excitation or reduced inhibition or additional coincident input from other synapses, as denoted by a stimulus 430). Since the neurons 408, 410 may be fed back to the neurons 402, 404, they may cause those afferents to fire in the reverse of the original pattern, thereby reverse replaying may be achieved, as illustrated by a reverse temporal pattern 432 in the diagram 424. It should be noted that an inhibitory control 434 may be used to prevent the feedback from causing the afferents 402, 404 to fire while the original stimulus 412 is present, although various alternatives such as intermediaries may be substituted. Moreover, the feedback may be allowed to impact the original afferents even during the stimulus.

The advantages of this first demonstrative embodiment can be that the replayed pattern may be true and exact, and may be produced via the original afferents. However, this embodiment can also have certain disadvantages. In an aspect, the pattern may be reversed and the control may be on afferents (the neurons 402, 404 may fire synchronously before recreating in the reverse pattern), and thus may impact downstream (including behavior of the neuron 406). In addition, the neuron 406 may not match the reverse pattern. Moreover, in this embodiment, scalability may be limited because a relational-aspect learning neuron may be required per pattern per afferent. Furthermore, the replay may also require synchrony of the control.

Forward and Reverse Replay

Figure 5:
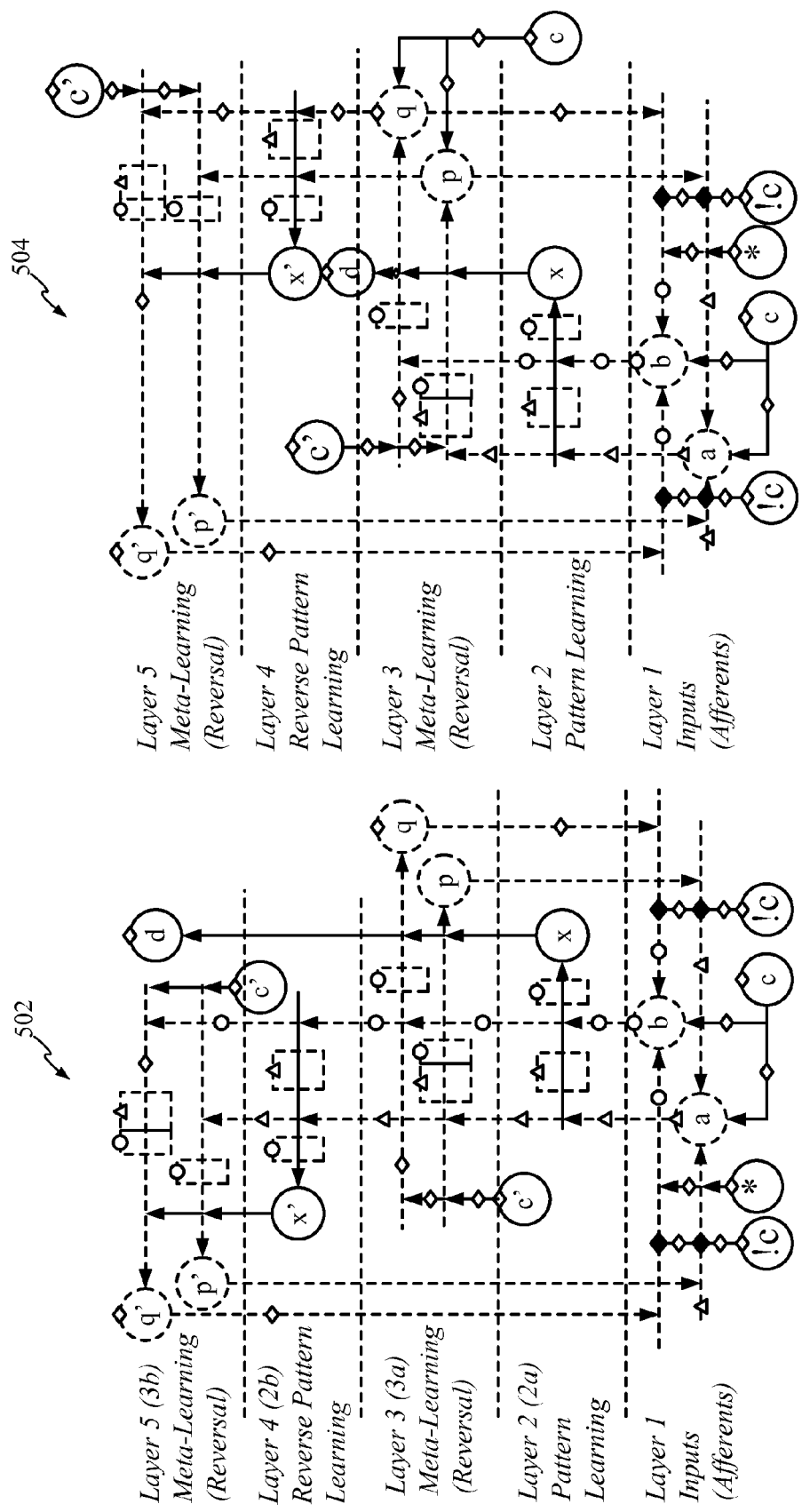
FIG. 5 illustrates another example of demonstrative replay embodiment in accordance with certain aspects of the present disclosure.

A second replay embodiment illustrated in FIG. 5 may solve the problem of replaying a non-reversed pattern by double reversal. Effectively, the aforementioned method associated with FIG. 4 may be repeated, so that a second layer 2 and layer 3 (referred to as layer 4 and 5 in FIG. 5) may be added to match the reverse pattern, the relational aspects of the reversed pattern, and either the original afferents (illustrated in a neural connectivity diagram 502) or the relational-aspect learning neurons p and q (illustrated in a neural connectivity diagram 504). Thus, the proposed method may replay either the reverse pattern or the forward pattern (by controlling either the pattern-matcher x or the reverse-pattern-matcher x', illustrated in FIG. 5). The advantage of the diagram 504 (using the relational-aspect learning neurons for relation learning at the reverse level) may be that reversal learning can be performed on-line (i.e., at the same time as pattern learning). With the neural connectivity diagram 502, reversal learning may be performed by inducing the reverse pattern.

It should be noted that a major difference between methods 502 and 504 may be the use of relational-aspect learning neurons instead of the afferents for the second "replay" stack (layers 4 and 5). In the diagram 504, on-line learning of the second-reversal can be done because of this difference. However, the neuron x' may not be exposed to the afferents but rather to a transform of the afferents.

The advantages of the second embodiment variations illustrated by the diagrams 502, 504 in FIG. 5 can be that the forward and/or reverse patterns may be replayed. However, there may still be a scaling limitation. In an aspect, one relational-aspect learning neuron may be required per pattern per afferent, and the control on afferents may affect downstream. The preferred embodiment discussed later in the present disclosure may overcome these disadvantages.

Memory Transfer

Transfer of learning from one neuron, neural array or cortical area to another may be a critical component for machine intelligence. The replay may serve a key role in this process. To explain this, the neural connectivity diagram 502 from FIG. 5 can be considered. For introducing an aspect of memory transfer, it can be ignored the fact that the replay in the circuitry of FIG. 5 is a reverse of original pattern. A detailed description of memory transfer and further processing aspects will be given further below along with circuits that replay a forward version of the pattern. Meanwhile, the following example may serve to introduce further processing.

The transfer of learning may work as follows. While the stimulus is present, the first circuit (represented by layers 2-3 in the diagram 502) may learn the pattern. Then, off-line (without the stimulus), the memory of this learning may be transferred to the second neuron circuit (represented by layers 4-5 in the diagram 502) by inducing the pattern with the first circuit (via layers 2-3) and allowing the second neuron circuit (layers 4 and 5) to learn (receive) the pattern. Moreover, one or more additional neurons (not shown in the diagram 502) may learn the pattern during replay (whatever circuit they belong to). It should be noted that, after the off-line step, the original circuit (layer 2 and 3) may even be erased and reused for other purposes while still retaining the memory of the learned pattern in the second neuronal circuit (layers 4 and 5).

It should be noted that, with this embodiment, the transferred memory may be with respect to the same original afferents, as being desirable. There may be no reliance on the first circuit (which might even be erased or may "forget" the pattern). In an aspect, another neuron, e.g., a neuron y (not shown in the diagram 502, but in any layer, may serve to replace the neuron x) may be trained (learn) the pattern during replay. Then, if the original stimulus is present again, the neuron y may recognize it (even if layer 2 and 3 are erased), so the pattern may be matched and replayed whenever desired. This memory transfer capability may be generally available with proposed methods and not only with this embodiment, although the transfer may not necessarily involve reversal at each stage depending on the embodiment.

Furthermore, the memory transfer may be only one extension of replay. In an aspect, the replay may also be used to refine learning. By replaying the pattern, downstream neurons (e.g., the neurons 208 and 210 in FIG. 2) may be re-exposed to a pattern via the same afferents so that learning may continue via synaptic plasticity or other means. Further, the replay may even be used to refine the learning by the neuron that learned the pattern, i.e., the neuron x in the diagram 502 in FIG. 5 or the neuron 202 in FIG. 2. In an aspect, learning of a pattern may take one or more stages (learning during a stimulus and one or more refinement stages by replay without the stimulus). An earlier stage of pattern learning (e.g., during the stimulus) may match the pattern by matching a subset of the elements of the pattern. A later stage of pattern learning (e.g., during replay) may pick up additional elements of the pattern to improve matching. A key insight in this is that the relational-aspect learning neurons may learn relational aspects between the pattern-matching neuron's behavior (firing) and elements of the afferent pattern that are not yet relied upon by that pattern-matching neuron to match the pattern.

Further, once neurons learn particular patterns, a downstream network may compare patterns by replaying those patterns (or compare replayed and original patterns) and learn differences or similarities such as classification of patterns into a group. By replaying patterns belonging to one or more groups, higher-level neurons may learn the general aspects of patterns belonging to particular groups (e.g., similar features).

Introduction to Preferred Embodiment for Pattern Replay

The preferred embodiment for pattern replay may comprise a scalable multiplex tapestry or cortical fabric in the sense that it can be used in a general way (i.e., regardless of context or content or coding, layer or level, or stage of processing) and scaled according to a desire or requirement. This particular embodiment may have all the advantages and none of the disadvantages described above. The exact or similar pattern may be replayed in forward or reverse via original afferents. Moreover, it may be compact and scalable because each relational-aspect learning neuron can deal with multiple patterns. Moreover, control may be induced via the neuron that learned the pattern and no control synchrony may be required. The afferent pattern may be clean. Pattern learning may be fully online, if desired (or offline, if desired). A neural connectivity diagram 600 in FIG. 6 outlines a basic implementation of the idea for forward replay (reversal may be achieved by extending the diagram 600 according to the above methods).

Figure 6:
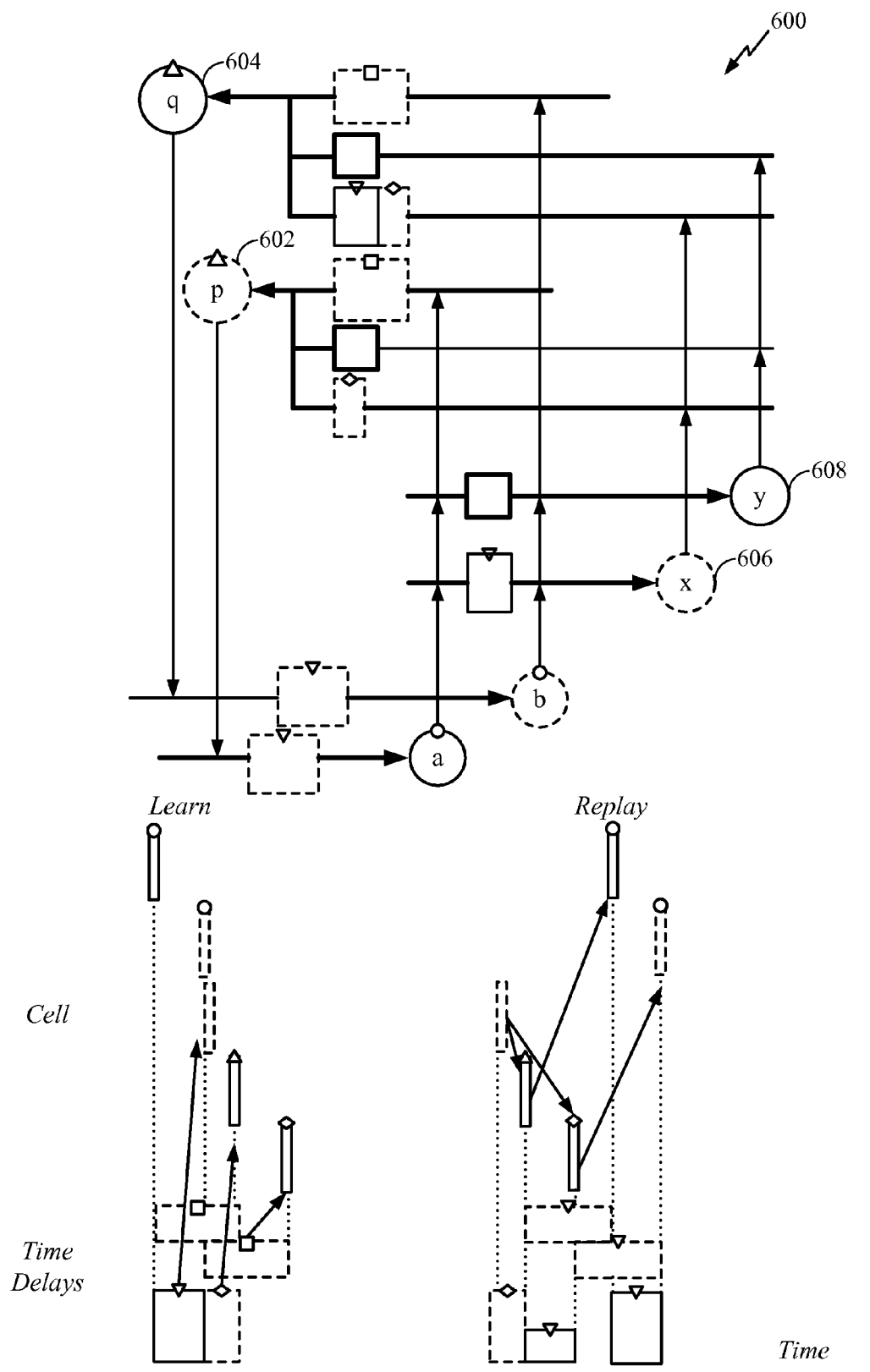
FIG. 6 illustrates an example of preferred replay embodiment in accordance with certain aspects of the present disclosure.
Figure 7:
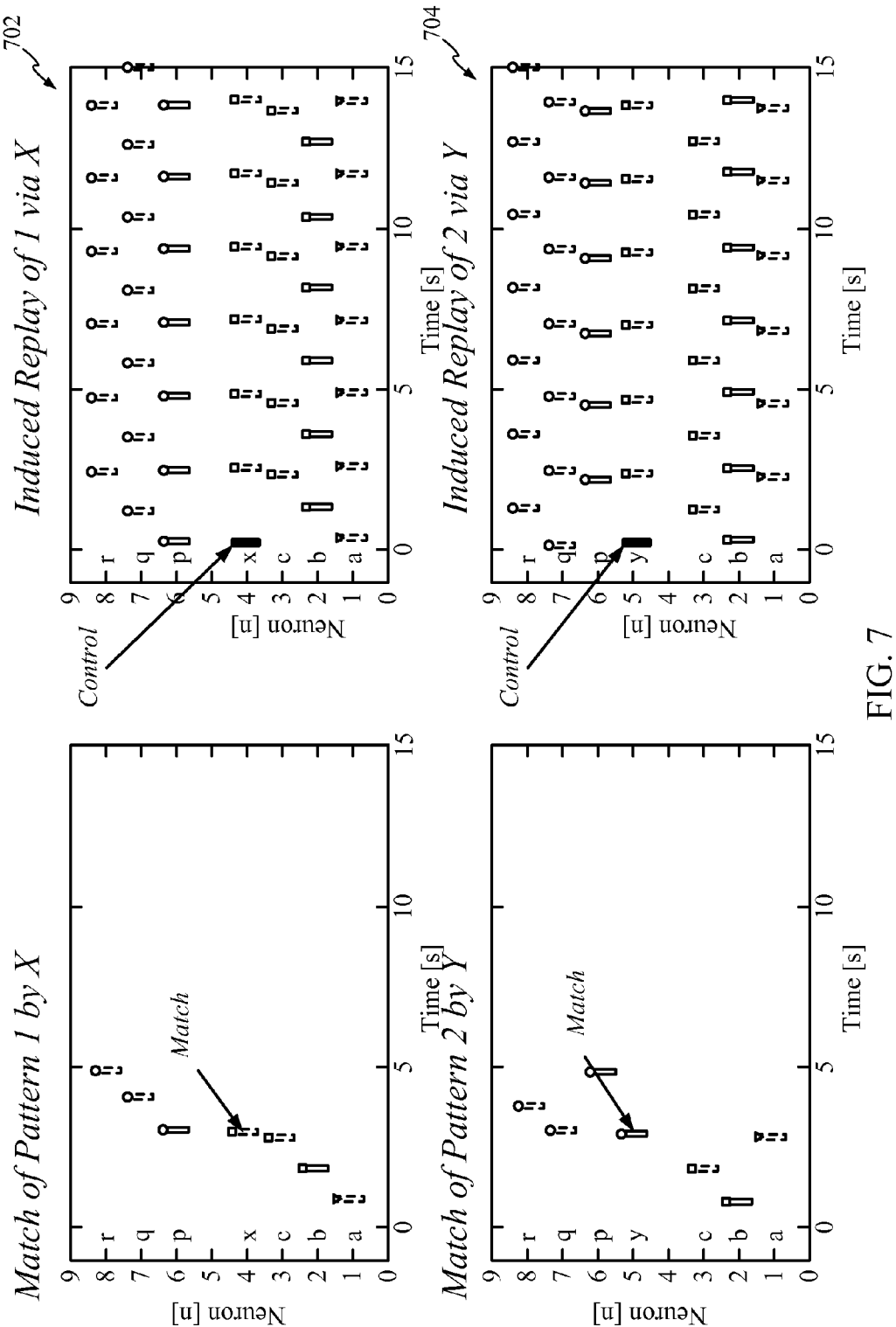
FIG. 7 illustrates an example of pattern matching and replaying in accordance with certain aspects of the present disclosure.

It should be noted that relational-aspect learning (or at least matching) neurons 602 and 604 in FIG. 6 may have inputs from two pattern learning (or referencing) neurons 606 and 608. In general, this could be any number of pattern-learning neurons. This may allow for the scalability mentioned above. Furthermore, the control may be achieved by exciting the pattern matching neuron (i.e., the neuron 606 and/or the neuron 608) in order to get replay of the patterns they matched (respectively). When the neuron 606 is excited, replay of the pattern learned by the neuron 606 may be achieved. When the neuron 608 is excited, replay of the pattern learned by the neuron 608 may be achieved. In the example result with leaky-integrate-and-fire neurons shown by graphs 702, 704 in FIG. 7, the truth of the pattern replay can be evident from the fact that the neurons 606 and 608 may re-fire upon the respective replay (matching the replay of the patterns they learned/match). One may choose to suppress such re-firing as one means to prevent a looping replay.

In the preferred embodiment, the relational-aspect learning/matching may be achieved by learning/matching the difference in delay between a delayed pattern-matching neuron input and afferent signal timing. Although the delay may be illustrated as if occurring on the dendrite of neuron(s) 602, 604, that delay may be axonal or dendritic, or from some other source.

The preferred embodiment will be described further below. From this point onward, the discussion is in reference to this preferred embodiment unless otherwise stated.

Figure 8:
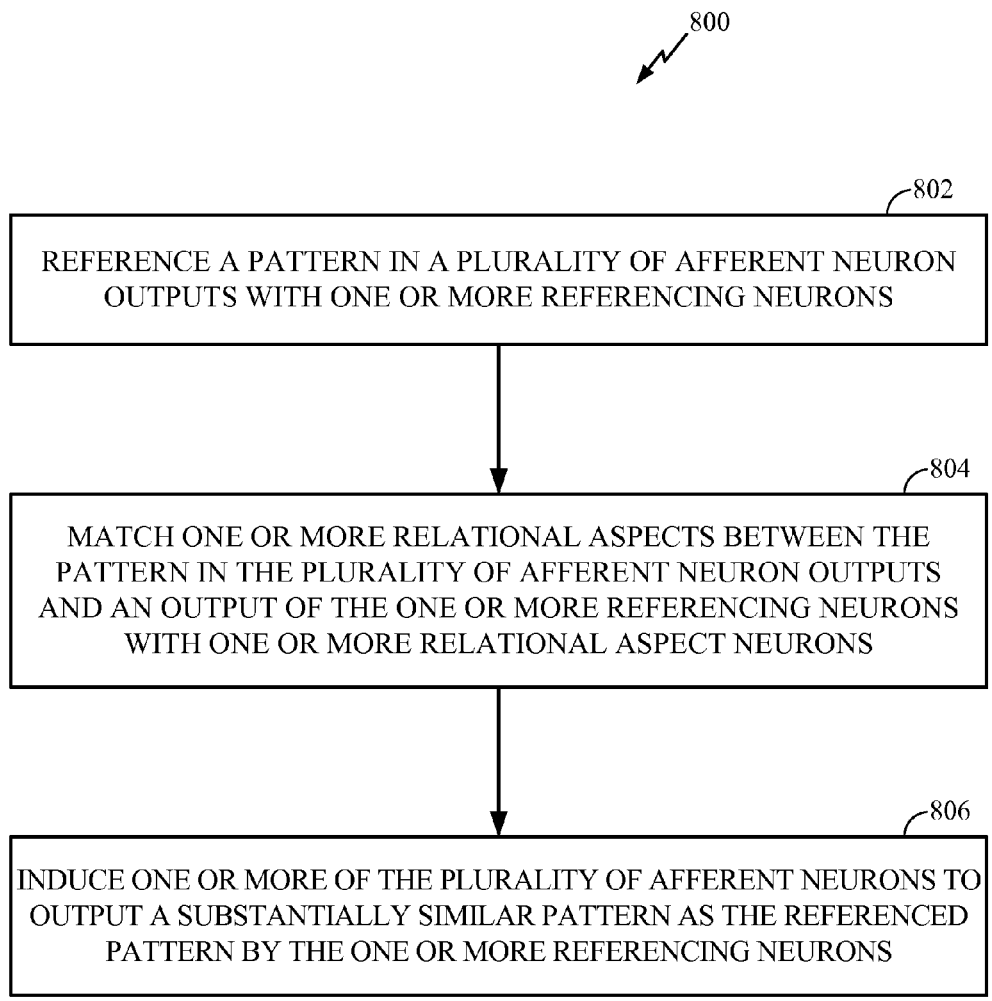
FIG. 8 illustrates example operations for neural component replay in accordance with certain aspects of the present disclosure.
Figure 8A:
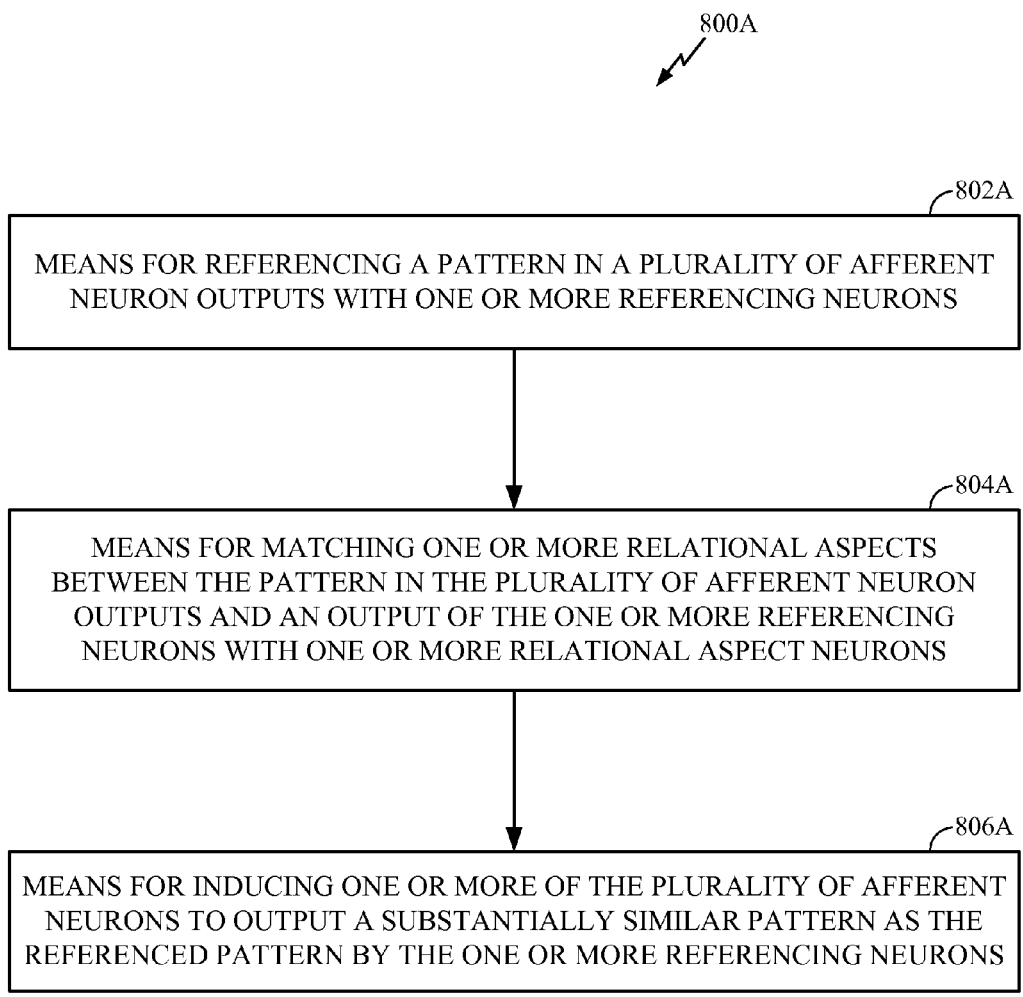
FIG. 8A illustrates example components capable of performing the operations illustrated in FIG. 8.

FIG. 8 illustrates example operations 800 for neural component replay in accordance with certain aspects of the present disclosure. At 802, a pattern in a plurality of afferent neuron outputs may be referenced with one or more referencing neurons. At 804, one or more relational aspects between the pattern in the plurality of afferent neuron outputs and an output of the one or more referencing neurons may be matched with one or more relational aspect neurons. At 806, one or more of the plurality of afferent neurons may be induced to output a substantially similar pattern as the referenced pattern by the one or more referencing neurons.

Learning Replay

Having described how true replay can be achieved (given configured delays, connections, and controls), a method of how to learn replay and control learning within a network (automatically or unsupervised) will also be described. Unsupervised learning will be described in detail, although supervised learning could also be used. In order to describe learning replay in detail, a description will be given in the context of the preferred scalable embodiment (again with temporal coding) with dynamic spiking neurons and plasticity.

Figure 9:
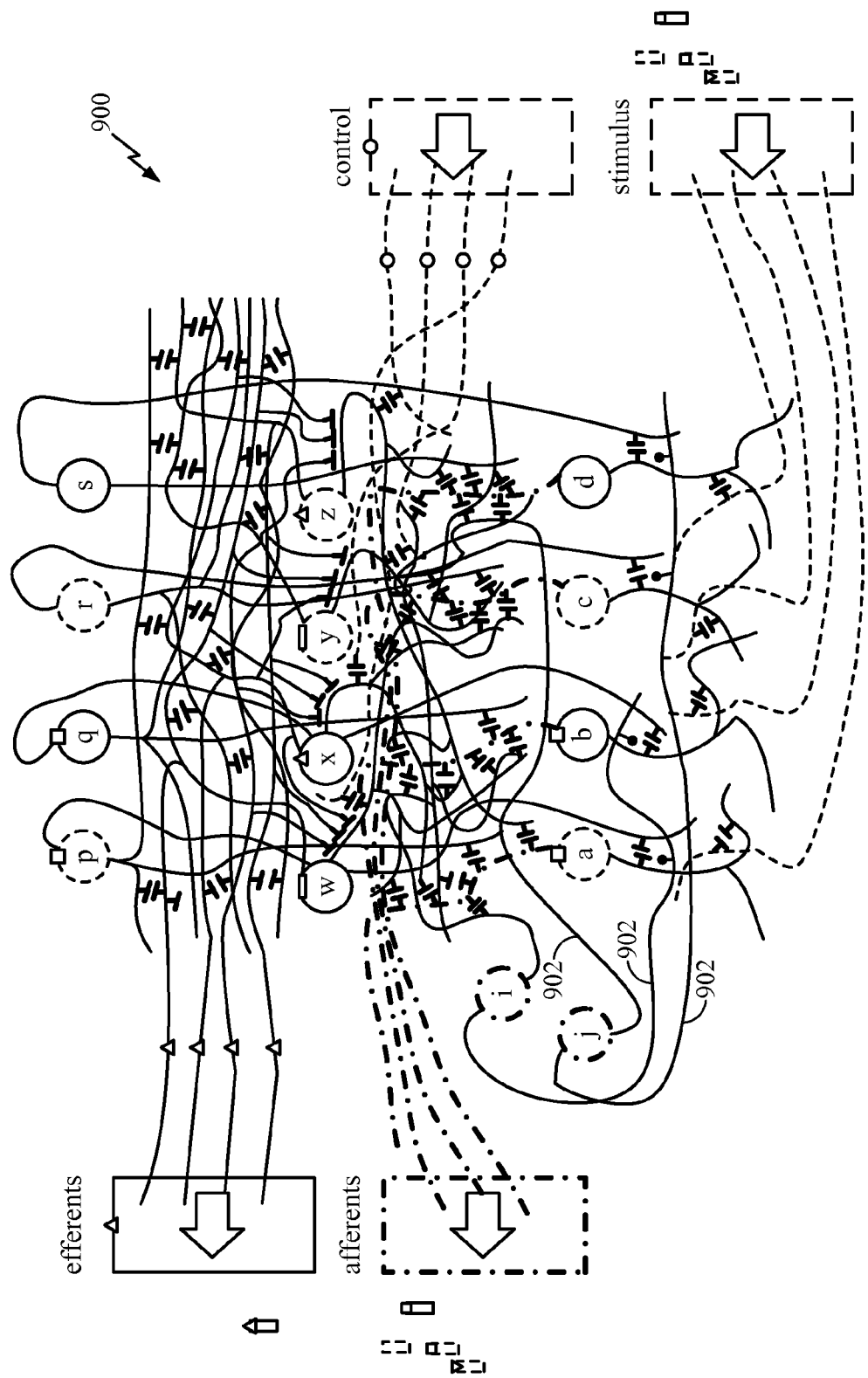
FIG. 9 illustrates an example model of preferred replay embodiment in accordance with certain aspects of the present disclosure.

A neural connectivity diagram 900 in FIG. 9 illustrates a model of the preferred embodiment, showing only a few representatives of each neuron role although this tapestry may be created at various scales either larger or smaller and with different layers (roles) having different population distribution/number or ratio of neurons and some roles can be combined into one neuron. In FIG. 9, the afferents may be represented by neurons a through d, pattern learning neurons by w through z, and relational-aspect learning neurons p through s. While these neurons may have the same or similar internal models, the connections may be important. To aid explanation of such connections, the outputs of pattern-learning neurons can be referred to as efferents (inputs to downstream processing or feeding back to upstream processing). Since afferents may actually be sensory neurons (vision, touch, hearing, etc) or a preceding layer of neurons or neurons at any stage or conceptual level in a neural network, a stimulus can be referred to as whatever causes neurons a through d to fire in one or more patterns. Whatever input or trigger causes particular neurons x through z to fire can be referred to as controls. These signals (afferents, efferents, control and stimulus) typically would connect outside the neural tapestry 900, but this may not be required and other internal signals may also extend from or to points beyond the neural tapestry 800. For clarity, the neural connectivity diagram 900 may focus on mainly relevant connections and aspects.

It should be noted that the general method remains as for the preferred embodiment described above. However, further details are now described which relate to learning. First, the connectivity will be described with reference to example structural aspects that may relate to such connectivity.

Learning and Structure

As described earlier, the pattern learning neurons may learn a pattern in a plurality of afferents (but not necessarily all of them). Such connectivity may be described structurally as cruciate in a biological sense (the dendrites might spread out intersecting axons of the afferents), sampling the afferents with different potential delays. Also, they may connect to one another to laterally inhibit each other (spines 902 in FIG. 9) so that they may compete to learn different patterns (this may be direct, as shown, or via inter-neurons or other inhibitory or competitive mechanisms). This inhibition may be general (i.e., post-synaptic). Also, as described earlier, the relational-aspect learning neurons may receive inputs from the pattern-learning neurons and inputs from the afferents (generally one-to-one). Structurally, the former may be described as basal dendritic processes parallel to the learning neurons' axons (not necessarily just one) and the latter may be described as apical dendrite processes that connect to (preferably) only one afferent's axon.

Such biological structural design may not be necessary or critical, but it is meant to point out how connectivity may be represented in physical space and constraints that may be represented physically. The implications of this will be explained further below. The relational-aspect learning neurons' axons may also connect back (feedback) to the afferent neurons they are paired with (again generally one-to-one). This might be represented as an axonal process extending vertically down to the afferents. Finally, the output of the afferents may inhibit excitation of those afferents by the relational-aspect learning neurons via inter-neurons (one inter-neuron per afferent or many-to-one, one-to-many, or many-to-many). Again, the use of inter-neurons can be an example.

However, in this case, these inhibitory connections may be specific to the particular excitatory connections from the relational-aspect learning neurons (i.e., pre-synaptic inhibition). Another option may be to use an inhibitory connection that is general (i.e., post-synaptic inhibition). Variation may be possible, including aggregating the inhibition effects into one inter-neuron or using intermediary relays.

Synaptic Plasticity and Structural Plasticity

Figure 10:
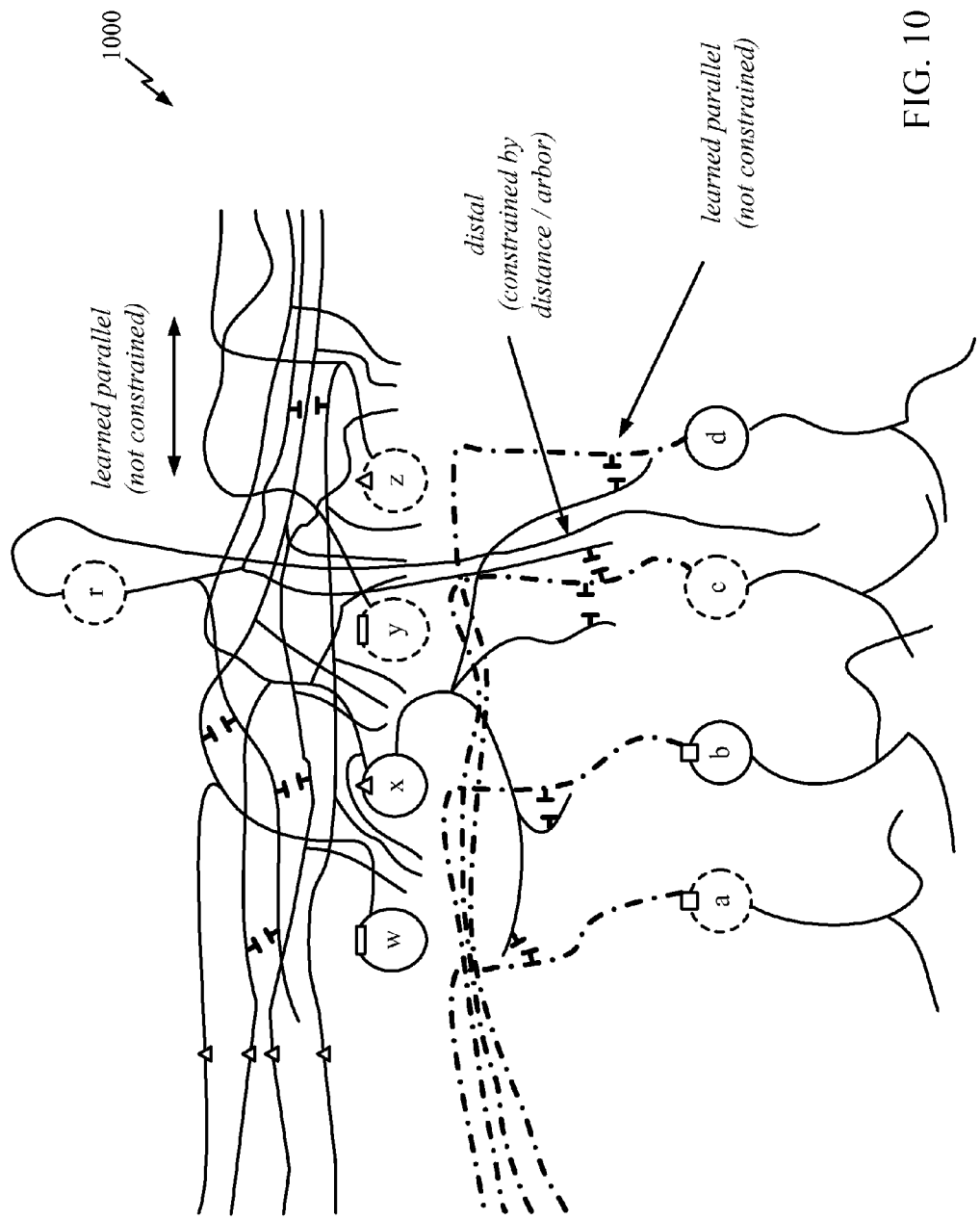
FIG. 10 illustrates another example model of preferred replay embodiment in accordance with certain aspects of the present disclosure.

Synaptic weights may be learned using methods such as spike-timing-dependent plasticity (STDP) or other rules such as Hebbian rules (e.g., Oja or Bienenstock-Copper-Munro (BCM) rules). It should be noted that the described mechanisms can be general enough to learn one or more spikes of the afferent or learning neuron as long as the number of synapses/delays are not restrictively constrained in this respect. The preferred mechanisms comprises a modified STDP learning rule, but variations can also be used such as incorporating consideration of input frequency, or pre/post spike order. The learning relations may be varied across neuron or layer, as illustrated by a neural connectivity diagram 1000 in FIG. 10, which may represent a portion of the diagram 900 from FIG. 9.

Learning may be constrained by particular aspects of the above connectivity and structures. This may be achieved by structural plasticity or constraints on delays, weights and or inputs. In the preferred embodiment, structural plasticity may be applied to move or grow/delete spines (and thus synapses). From a computational standpoint, this may be modeled by reuse of unused synaptic resources. Effectively, when a synapse weight decays below a threshold, the synapse may be reused by reassigning the synapse with one or more of a new weight (preferably at or slightly above the threshold), new delay or input (neuron). In the preferred embodiment, only a new weight and delay may be provided, and one option can be to limit the change in delay (e.g., by amount and/or direction as if structurally growth-rate constrained).

Furthermore, the structural plasticity may be constrained or bounded. For example, distal dendrite synapses may be constrained to a longer delay while apical dendrite synapses may have short or wide-varying delay. If dendritic processes run parallel to axons, then this may allow sampling at various delays and thus learning of particular corresponding delay. In contrast, if an input neuron is far from the receiver (e.g., afferent input to relational aspect learning neuron), the delay may be constrained to be a relatively high value. In addition, equidistant structural components may be assumed to have the same or similar delay. It should be understood that these are merely examples in keeping with the concept of the present disclosure. In the preferred embodiment, the delay encountered by afferent inputs to the relational-aspect learning neurons may be fixed at a relatively large value coinciding with their structural distance, while synapses may have a variable delay within a large range for inputs from the learning neurons. Moreover, the fixed delays for the former may be set to the same or a similar value across relational-aspect learning neurons (as if the distance to the paired afferent is similar regardless of the pair). It should be also noted that one-to-one or other relations may be structurally represented by columnar-type organization and routing of axonal or dendritic processes vertically or horizontally, as the case may be.

Figure 11:
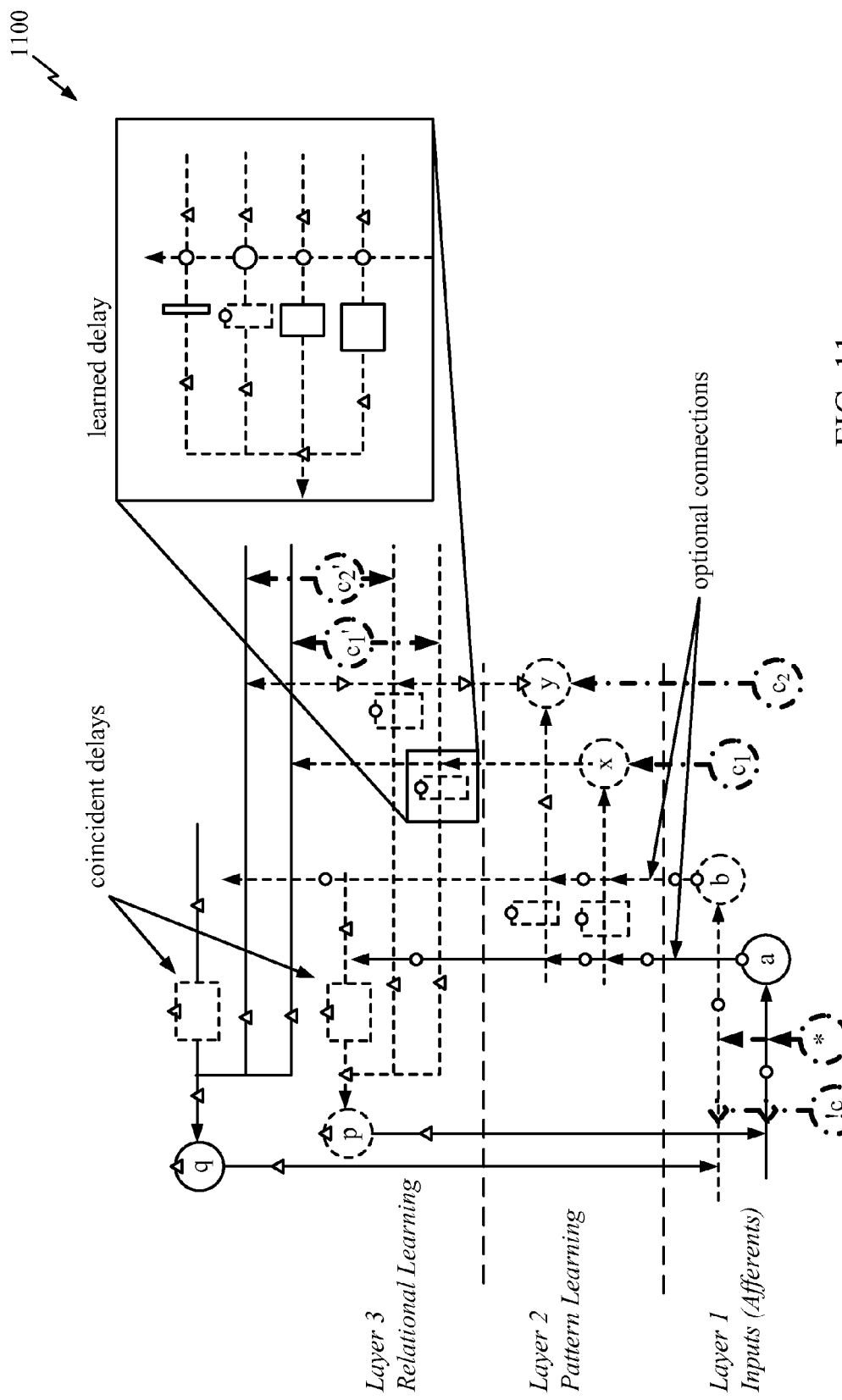
FIG. 11 illustrates an example diagram of pattern learning and relational learning in accordance with certain aspects of the present disclosure.

It should be noted that, in the neural connectivity diagram 1100 in FIG. 11, delays encountered by inputs to the relational neurons from the afferents may be coincident. This may be due to structural constraints (e.g., distance between the layers) or in development. For example, during development, the pattern neuron firing may be inhibited while afferents may fire synchronously. Thus, the relational aspect neurons may learn coincident delays for the afferents. This may occur, for example, using STDP or other learning rule. Then, after development, those coincident delays may be learned with a large weight and may not change during normal stimulation. As a result, the relational aspect neurons may fire with delays depending on the relative delays in the afferents due to the stimulus. The learning and replay processes may then proceed as explained above.

Alternatives for Relational-Aspect Learning

Figure 12:
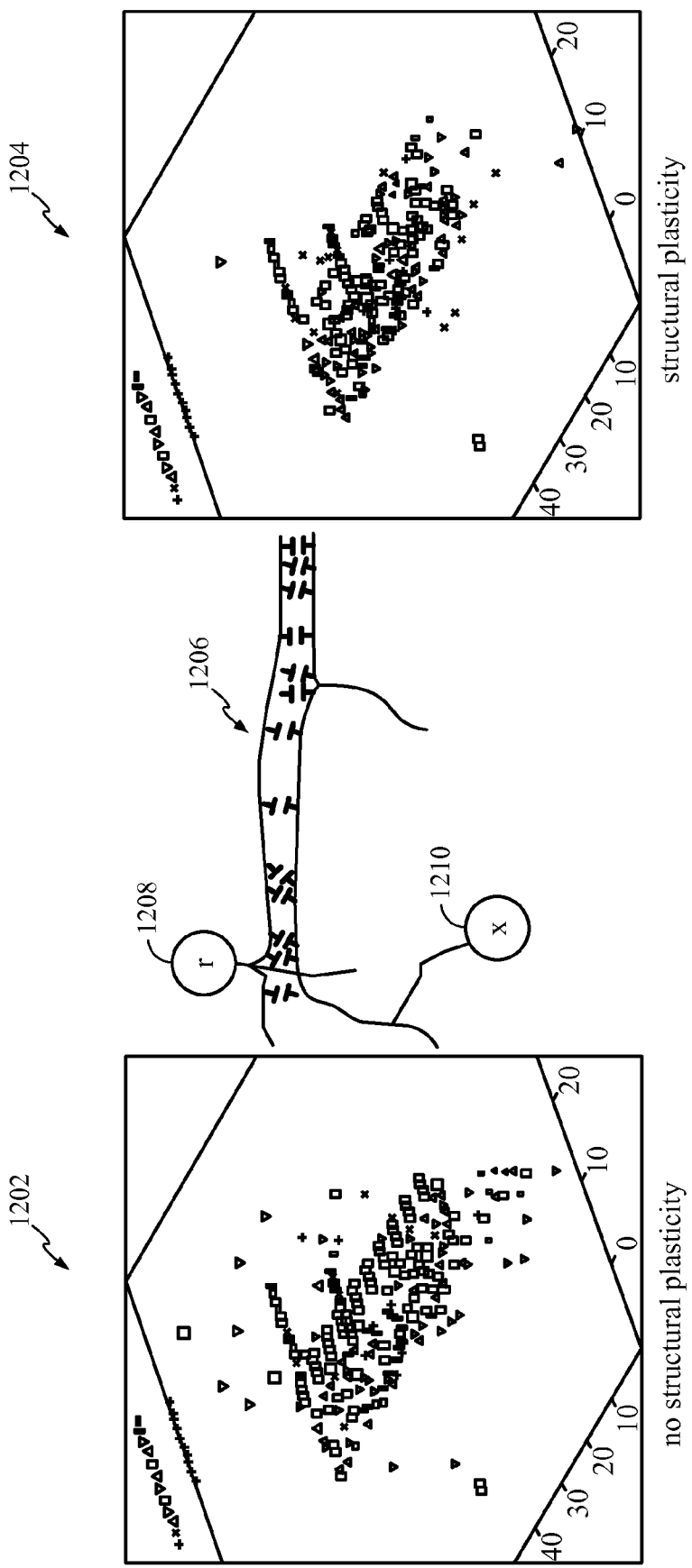
FIG. 12 illustrates an example of synaptic weights obtained based on structural plasticity learning rule in accordance with certain aspects of the present disclosure.

One way to achieve relational-aspect learning computationally may be to have many synapses (or potential synapse sites/spines) with different delay connecting (or potentially connecting) to the same input axon and use only synaptic plasticity to adjust weights, as illustrated in a graph 1202 in FIG. 12. Another way may be to have structural plasticity and only one or a few synapses that, if they decay, may be reassigned with different delay to the same input (e.g., slide along the dendrite/axon parallel processes), as illustrated in a graph 1204 in FIG. 12. Both methods may represent the range of potential connections depicted in an example structure 1206 in FIG. 12. The structure 1206 may comprise parallel processes of dendrite of a neuron 1208 and axon of a neuron 1210. The diagrams 1202 and 1204 show all synaptic states in the network by input (x-axis), delay (y-axis), and weight (z-axis). The positioning of points (synaptic states) belonging to the relational-aspect learning neurons on the plots 1202, 1204 illustrate that there can be many potential synapses with the first case and few with the second case. However, in both cases, one or more synaptic weights may be reinforced at the correct delay and for the correct input.

Both methods have been found to work well although the first one may learn faster since the spines all exist simultaneously rather than being "tried out" in some sequence. However, while the first method may be faster, it may also be subject to imbalance of inputs from different pattern-matching/learning neurons. The second method may be more resource efficient since, in the first method, many of the delay taps (synapses) may end up being unused (see the graph 1202 in FIG. 12). In a sense, these methods are merely different points on a spectrum of the speed or dynamics of spine/synapse motility and structural plasticity.

Further, the first method may have a higher tendency to learn more broad causal input correspondence unless homeostasis is used to counteract this. This may be due to the classical STDP having a long long-term potentiation (LTP) tail (positive footprint), as illustrated by a plot 1302 of a graph 1304 in FIG. 13. The x-axis represents the time-difference between pre- and post-synaptic spikes, where the positive x values correspond to a causal case (pre-synaptic spike is before post-synaptic spike).

Figure 13:
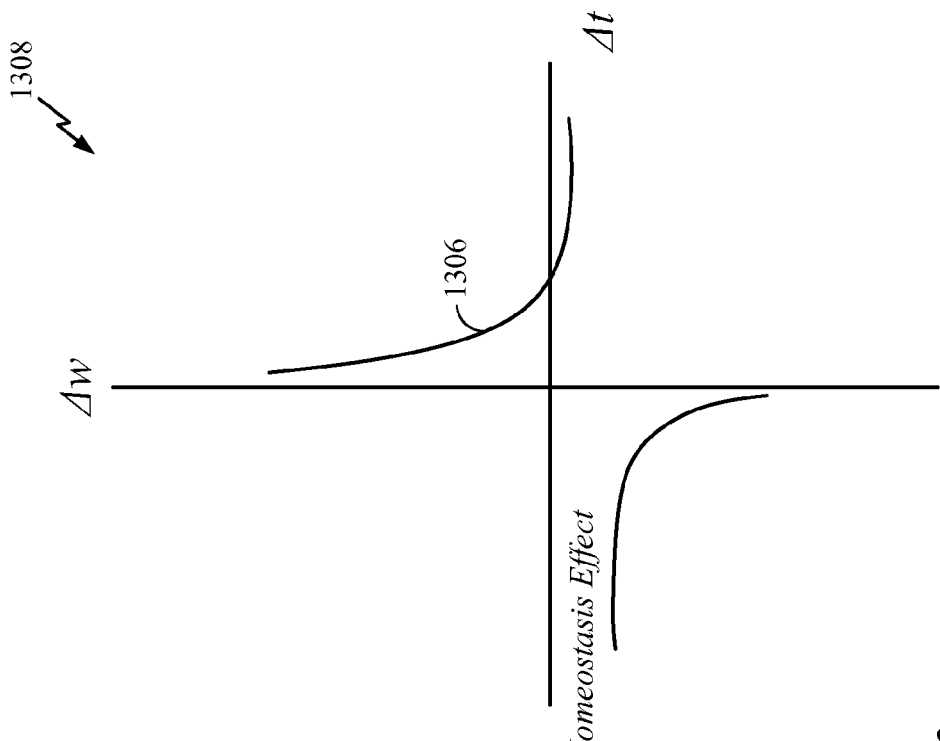
FIG. 13 illustrates example graphs of spike-timing-dependent plasticity (STDP) learning rule in accordance with certain aspects of the present disclosure.
Figure 13:
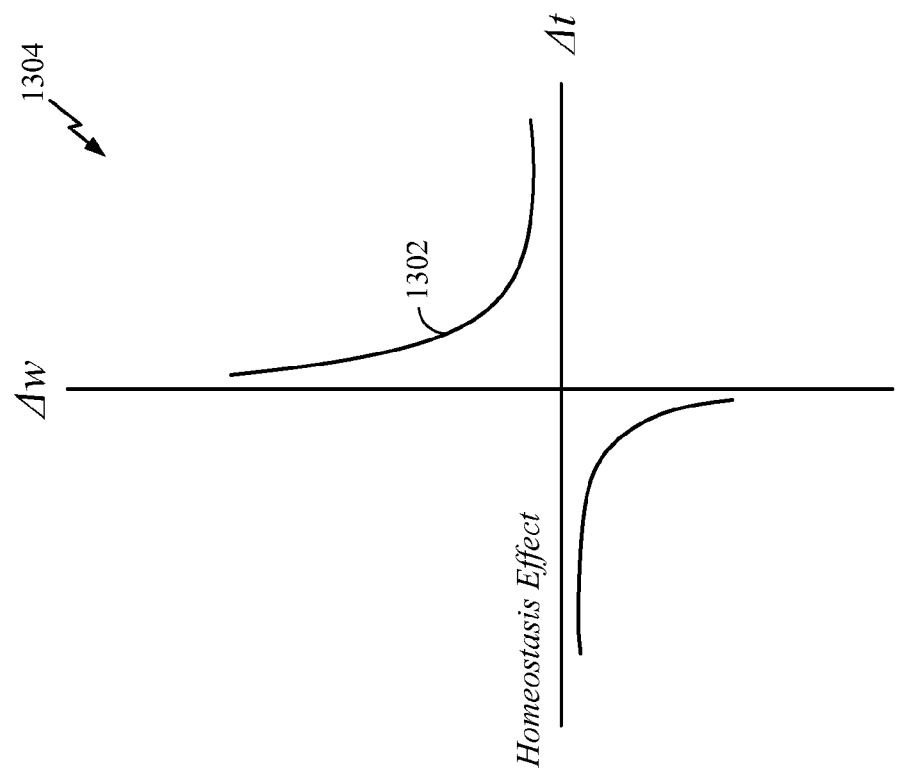

The above problem may be avoided by reducing the positive STDP footprint to a shorter time interval, as illustrated by a plot 1306 of a graph 1308 in FIG. 13. This may be performed by changing the plasticity curve directly (various causal or non-causal variations are possible, such as zero-mean or offset Gaussian), or by using homeostasis to regulate neurons based on their overall activity (e.g., a firing rate) over a longer time frame. The homeostasis may be utilized by increasing or decreasing a general multiplicative modulation of aggregate input to the soma based on whether the long-term firing rate of the neuron is above or below a range (i.e., an upper and lower target value, respectively) in a step-wise or gradual manner. In an aspect, an effect of this may be that even though STDP may otherwise cause weights to increase (or decrease), the homeostasis effect may reduce (or increase) the effect of the synaptic inputs.

When viewed in combination, this effect may be represented as in the graph 1308 where the zero-level is shifted up so that what might be an increase by STDP can actually be a decrease after homeostasis effects (see the plot 1306). The weights that, over the long term, actually increase may be limited to a narrower or expanded to a wider region of the horizontal axis (time difference between pre- and post-synaptic spikes).

Figure 14:
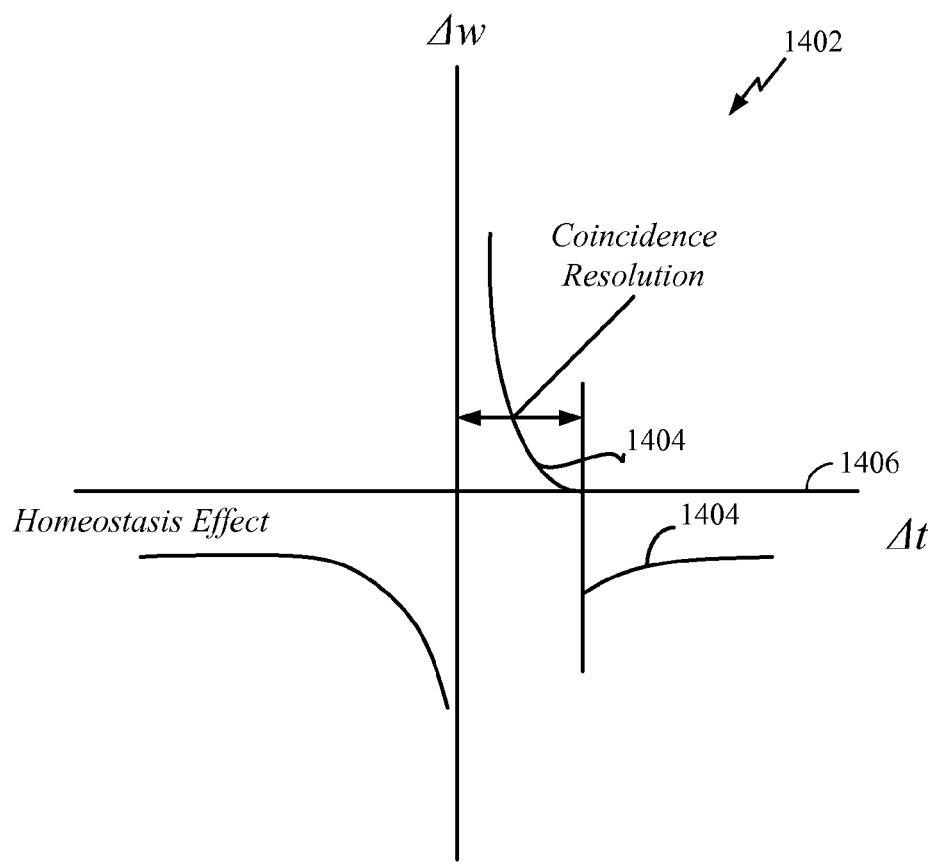
FIG. 14 illustrates an example graph of modified STDP learning rule in accordance with certain aspects of the present disclosure.

A hybrid approach may utilize both homeostasis and alter the curve, as illustrated by a plot 1404 of a graph 1402 in FIG. 14. One reason for pushing the tail down further (away from the zero-weight adjustment level) can be to narrow the temporal coincidence resolution (which may be particularly useful for the relational aspect learning neurons) because homeostasis may not bring down weights that were raised earlier in the learning process (the plot 1404 is being near the zero line 1406). It should be noted that a weight adjustment near zero might not change a weight substantially. Alternatively, weight decay (slow decay of weights toward zero) may be used in combination with the learning process.

Counter-intuitive Behavior

At a first glance, it may be required that pattern-learning neurons do not considerably alter relational-aspect neuron firing times during learning. Since the relational-aspect neurons receive inputs from both afferents and pattern-learning neurons, a balance of inputs might be a consideration. In fact, the pattern-learning neurons may be unlikely to significantly alter the relational-aspect neuron timing unless weights for those connections are considerably stronger than those for afferents or multiple pattern-learning neurons fire substantially at the same time (an effect counterbalanced by lateral inhibition). In any case, this may be avoided or substantially inhibited via spine or synapse constraints (weights, delay). A combination of structural plasticity (spine location on delay-variant dendrite) and non-classical STDP (e.g., resource considerations) can also render the above unlikely.

Figure 15:
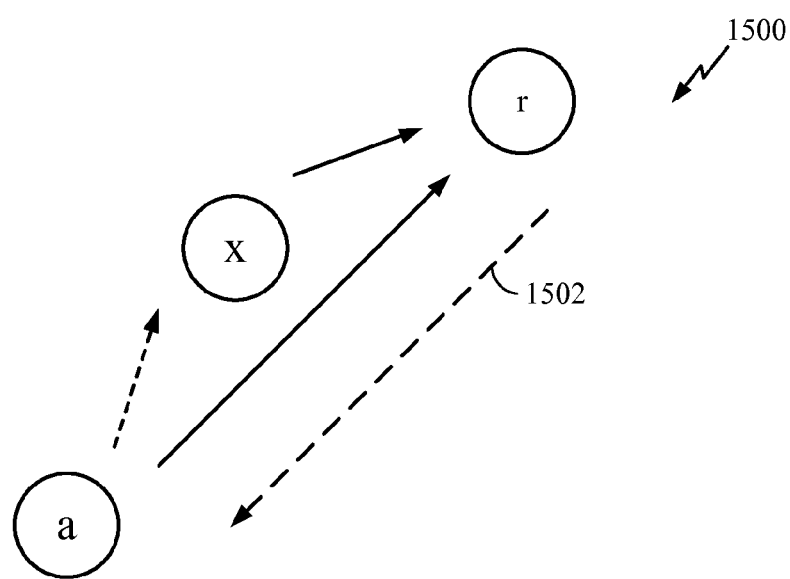
FIG. 15 illustrates an example diagram of feedback of relational firing back to afferents in accordance with certain aspects of the present disclosure.

However, even if imbalance exists and upper layer spike timing is altered, it may not be necessarily something to be avoided. As illustrated by a neural connection diagram 1500 in FIG. 15, a feedback 1502 of relational-aspect firing (which may require being significant in order to enable replay) back to afferents may also alter afferent timing. In other words, there may be a feedback loop so that timing alterations in upper layers cause timing alteration in lower layers. But, what is important is reproducing the afferent pattern, not reproducing the stimulus. Afferents may be thought of as a transformation of the stimulus. If the transform is different, it does not necessarily matter as long as that learning is based on the same transform. In other words, during learning, the afferent pattern may change and this changed afferent pattern may represent the pattern learned, and that may be replayed.

Figure 16:
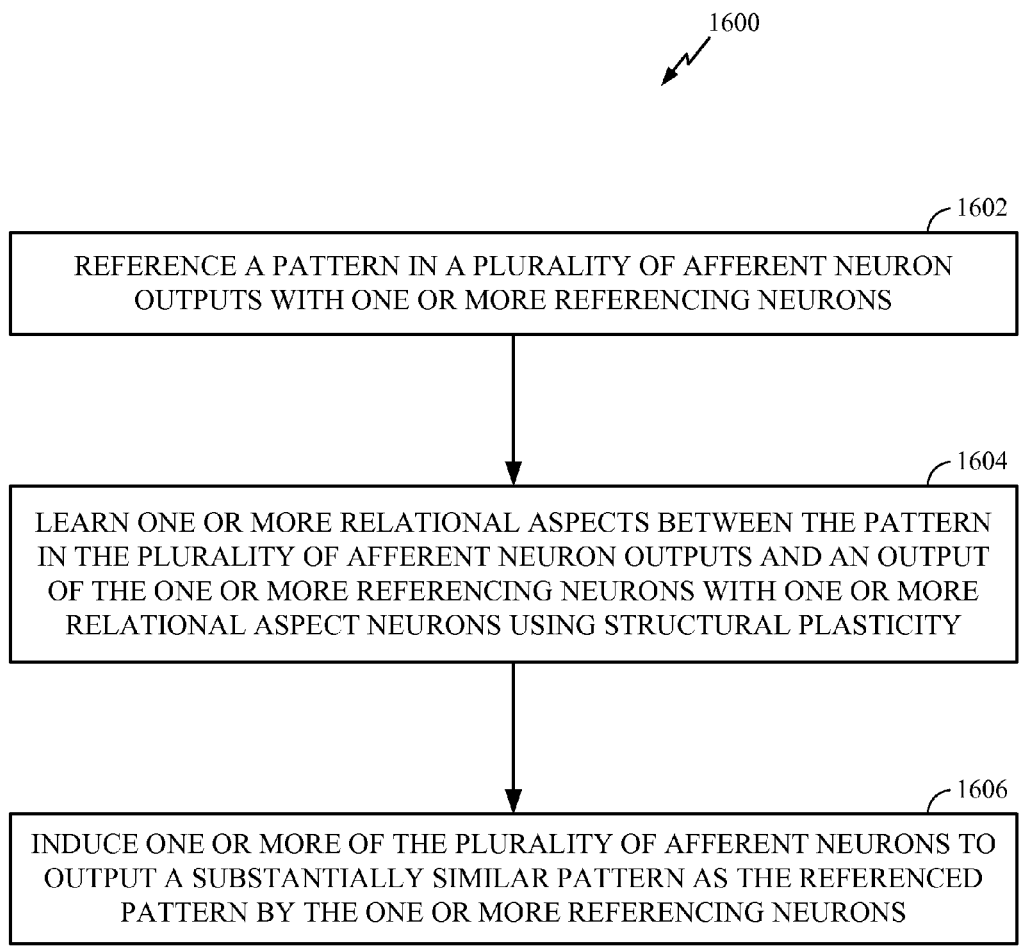
FIG. 16 illustrates example operations for neural component replay in relation to structural plasticity and structural constraint modeling in accordance with certain aspects of the present disclosure.
Figure 16A:
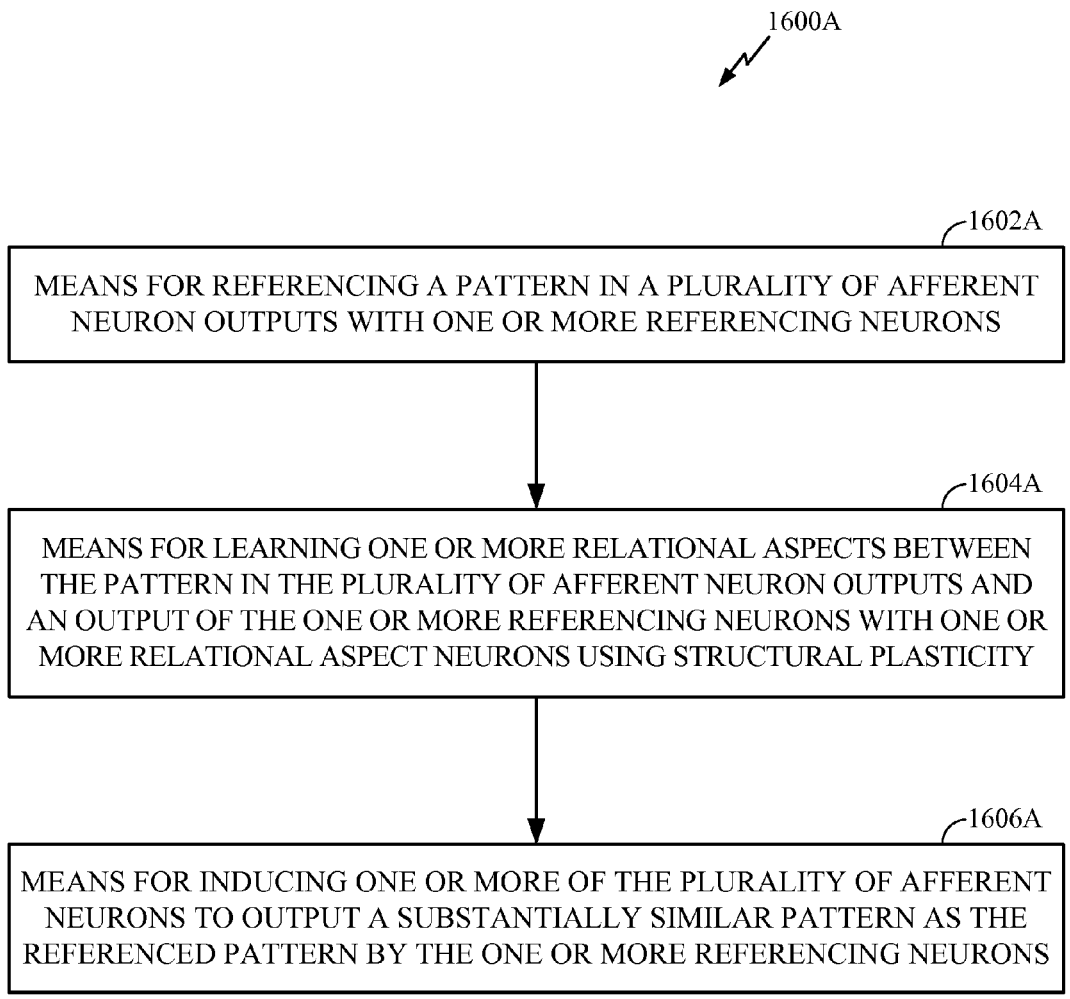
FIG. 16A illustrates example components capable of performing the operations illustrated in FIG. 16.

FIG. 16 illustrates example operations 1600 for neural component replay in relation to structural plasticity and structural constraint modeling in accordance with certain aspects of the present disclosure. At 1602, a pattern in a plurality of afferent neuron outputs may be referenced with one or more referencing neurons. At 1604, one or more relational aspects between the pattern in the plurality of afferent neuron outputs and an output of the one or more referencing neurons with one or more relational aspect neurons may be learned using structural plasticity. At 1606, one or more of the plurality of afferent neurons may be induced to output a substantially similar pattern as the referenced pattern by the one or more referencing neurons.

Controlling Replay

Figure 17:
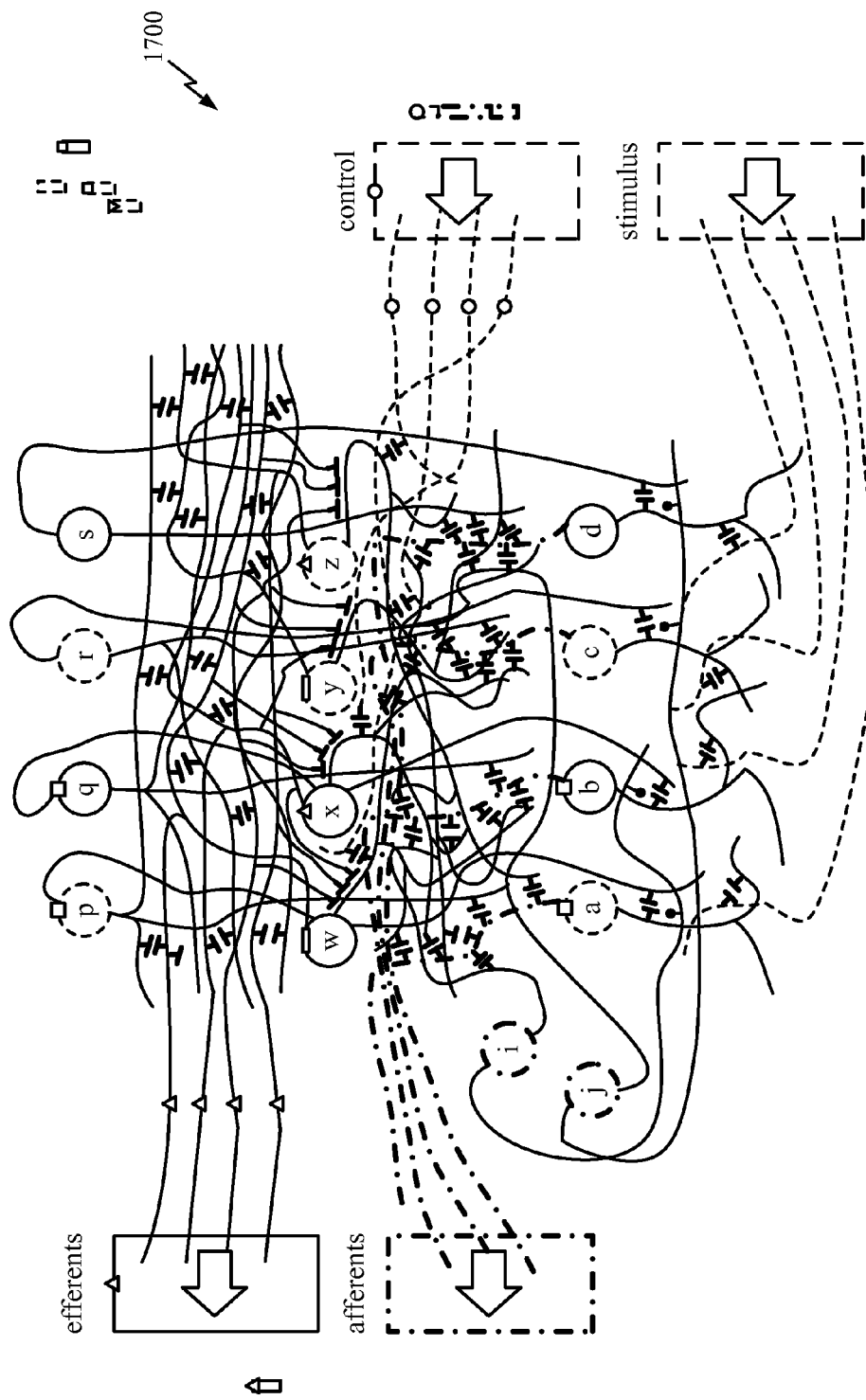
FIG. 17 illustrates an example network diagram for controlling replay in accordance with certain aspects of the present disclosure.
Figure 18:
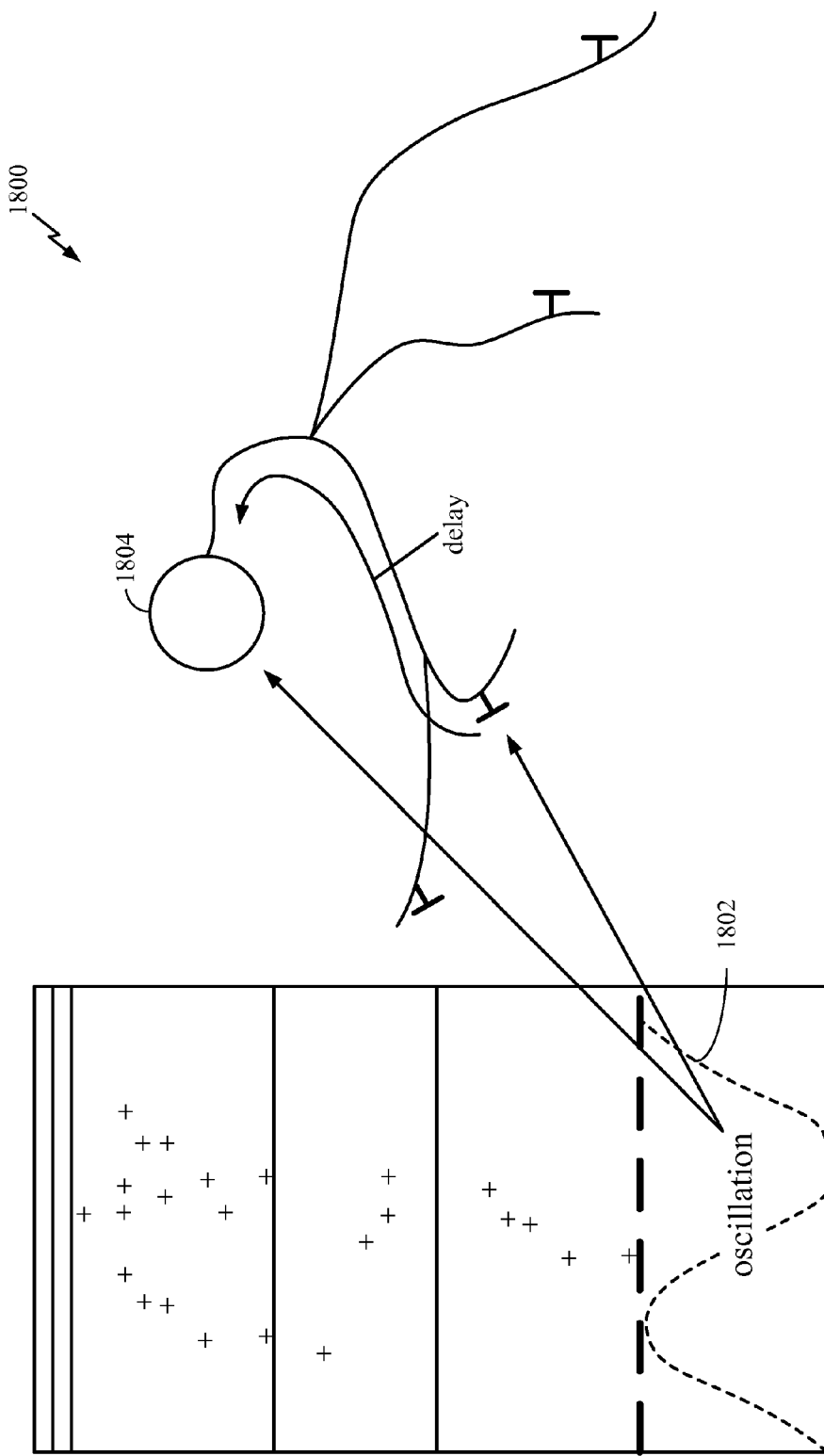
FIG. 18 illustrates an example of excitatory oscillation in accordance with certain aspects of the present disclosure.

In order to replay a learned pattern, a control may be used to excite the neuron that learned the pattern, e.g., neurons w, x, y or z in a network diagram 1700 from FIG. 17. Such control may merely be another synaptic input to the pattern-matching/learning neuron, as illustrated in FIG. 17. Depending on the input balance, such synapses may have stronger weights or the input may be driven during an excitatory oscillation, which may effectively increase the neuron's input or decrease the firing threshold (or during a lull in inhibitory oscillation). While oscillation may be unnecessary, it may be an alternative. The example 1800 from FIG. 18 illustrates a sinusoidal excitatory oscillation 1802. It should be noted that the peak of the oscillation can be when a learning neuron 1804 is controlled to spike and induce the afferent pattern via the relational-aspect learning neurons.

The oscillation 1802 may be applied to the membrane (at soma with low or no delay) of neuron 1804 or at the synapses (thus incurring a delay according to the synapse/connection). The oscillation 1802 may be generally applied to all the neurons in a neighborhood, so the oscillation in the example illustrated in FIG. 19 may boost the effect of the learning neurons on the relational-aspect learning neurons as well. It should be noted that the replay might repeat except that the oscillation used in this example has a trough that suppresses re-excitation after the pattern.

Figure 19:
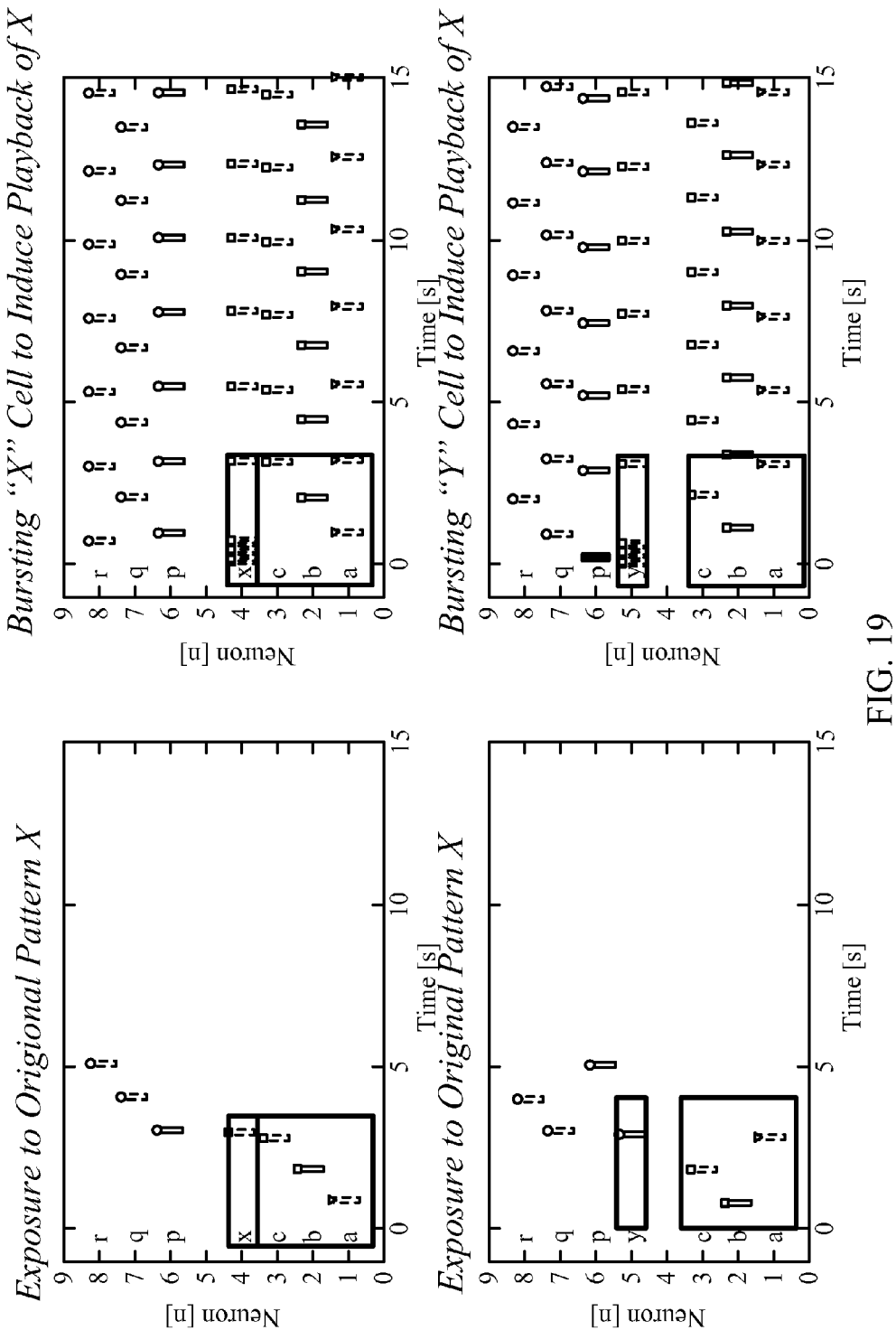
FIG. 19 illustrates an example of controlling replay with bursting in accordance with certain aspects of the present disclosure.
Figure 20:
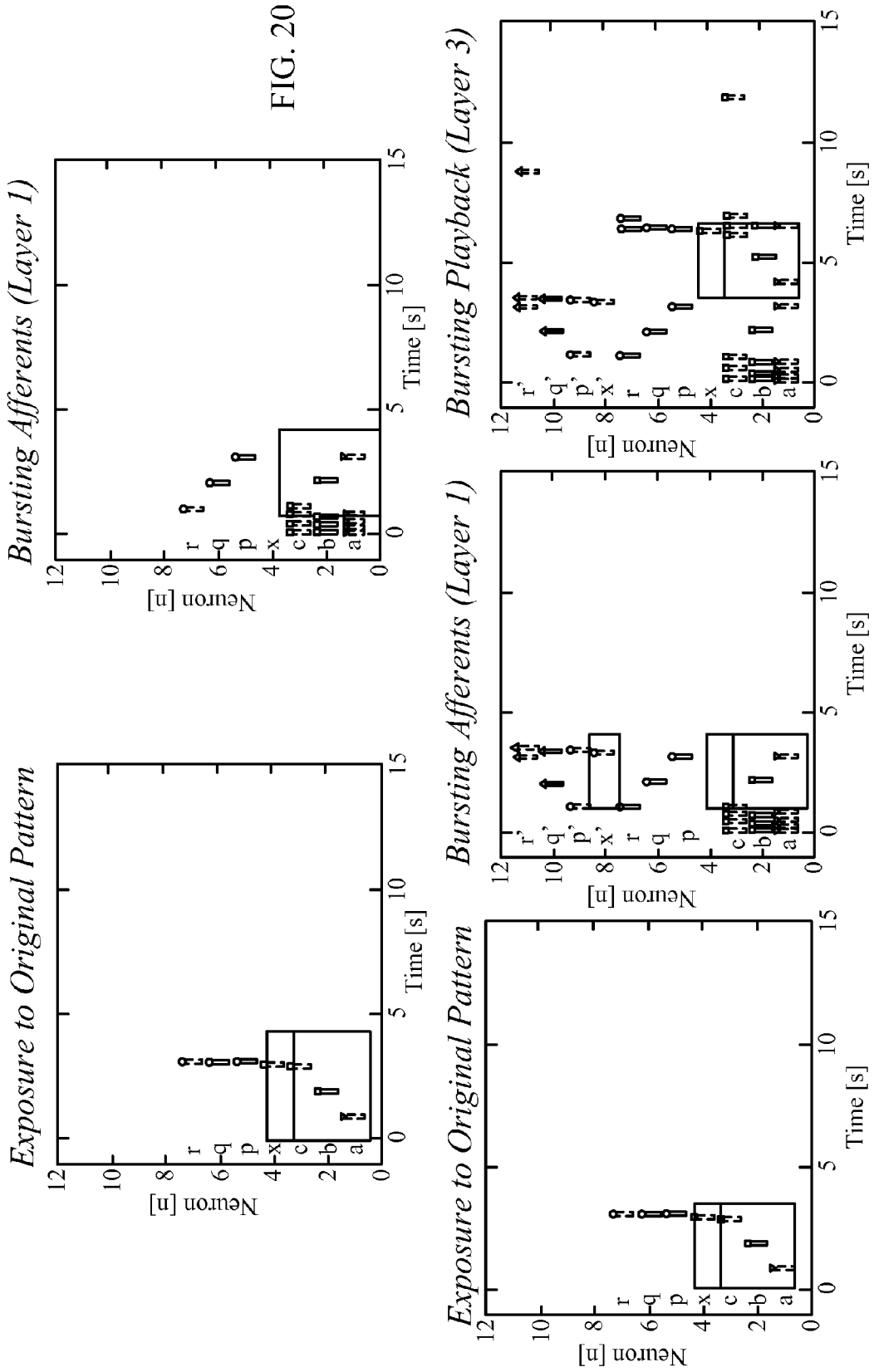
FIG. 20 illustrates another example of controlling replay with bursting in accordance with certain aspects of the present disclosure.

Another way to control replay can be with bursting. The examples from FIG. 19 and FIG. 20 illustrate how bursts by the neuron x or y may be used to cause the relational-aspect learning neurons to fire. This is just an example, since bursting could be used at any layer/neuron.

However, both bursting and oscillation may be unnecessary and may have disadvantages, and thus may not be preferred. Nevertheless, if bursting is a desired feature, it may be recommended that bursting can be used (a) internally to the circuit (i.e., not at points that may have input or output connections for the local circuit) and on less-plastic connections (or non-plastic connections). First, if bursting is only internal to a circuit, it may obviate interference in connected circuits (if certain connections in the array are local-only). Second, if bursting is on less-plastic or non-plastic connections in the circuit, it may obviate some interference with learning aspects internal to the circuit.

A variation of the replay architecture 1700 from FIG. 17 can be considered where afferents and reference neurons (e.g., the neurons a and x, respectively) may not burst (just operate as normal) but relational neurons (e.g., the neuron p) may burst (optionally only in replay mode). This may avoid some of the bursting disadvantages for afferents and reference neurons because, by definition, they may not burst. Moreover, one disadvantage of bursting may be cancelled out in relational neurons: the relational neurons may not have to burst during play; this lower level of activity may then be configured such that it may be insufficient to significantly influence the afferents (feedback loop). Then, removing the inhibitory feedback connections that block repetition may be considered (if repetition is desired or not). Also, several subtle but important issues can be avoided due to a combination of delays, learning and bursting in this case because relational-aspect learners (the only bursting neurons) may be one-to-one connected with afferents and may be causal in that mode. However, there may still be a delay-burst-learn combination problem, if afferents also run learning while replaying. To avoid this, relational-neuron inputs to afferent-neuron connections may be pre-wired (e.g., in development).

Figure 21:
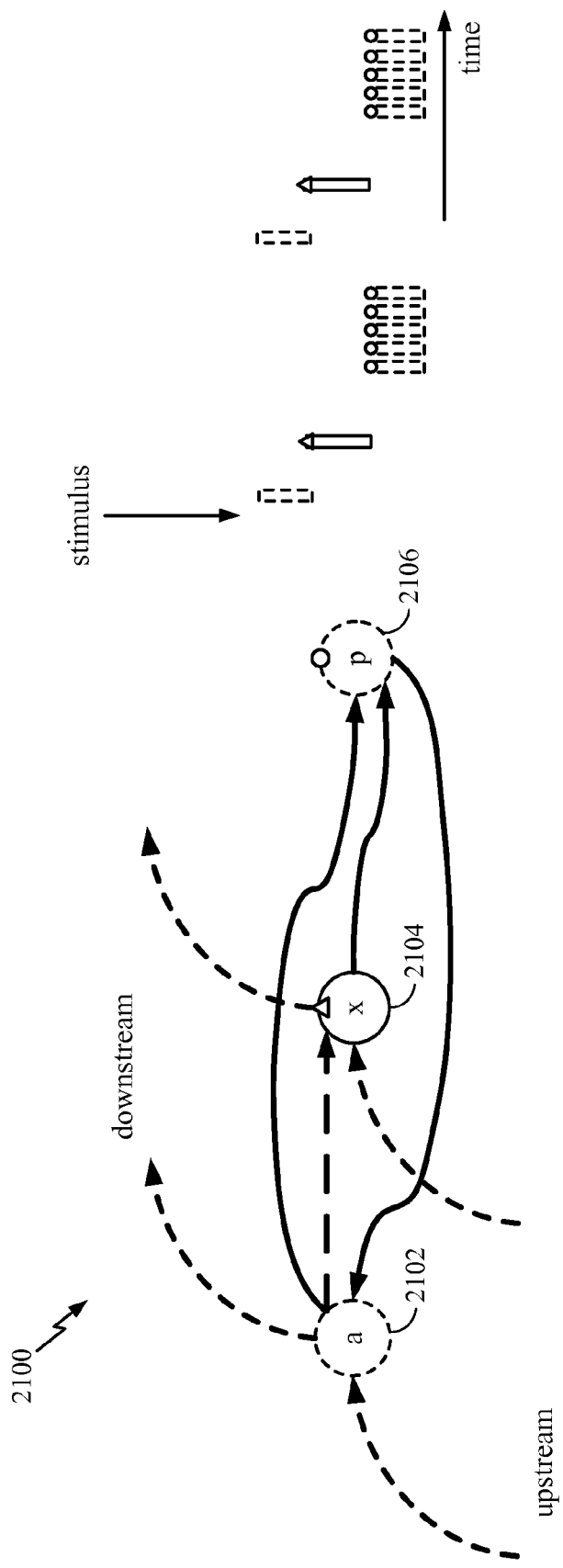
FIG. 21 illustrates an example model of afferent, reference neuron and relational-aspect-learning neuron in accordance with certain aspects of the present disclosure.

A neural connectivity diagram 2100 in FIG. 21 exhibits the above principles with a single neuron 2102 representing afferents, a neuron 2104 representing reference neurons and a neuron 2106 representing relational-aspect-learning neurons. It should be noted that afferents may receive input from upstream or stimulus, and their output may be used downstream or by other reference neurons (pattern matching neurons) such as for matching other patterns, memory transfer, comparison, memory transfer, and so on. The reference neurons may receive control input from upstream or other afferents and their output may be used downstream for generalization, specialization or further processing. However, the relational aspect learning neurons may have only connections internal to the circuit. Thus, according to the description above, only those may burst in one embodiment of the present disclosure.

Also, bursting may be allowed only during replay (or other mode) by altering the dynamics of a neuron in response to a control input. For example, while data input may alter the state of a neuron (current or voltage), a control input may alter effective conductance, resting or threshold potentials, and other dynamics parameters.

Figure 22:
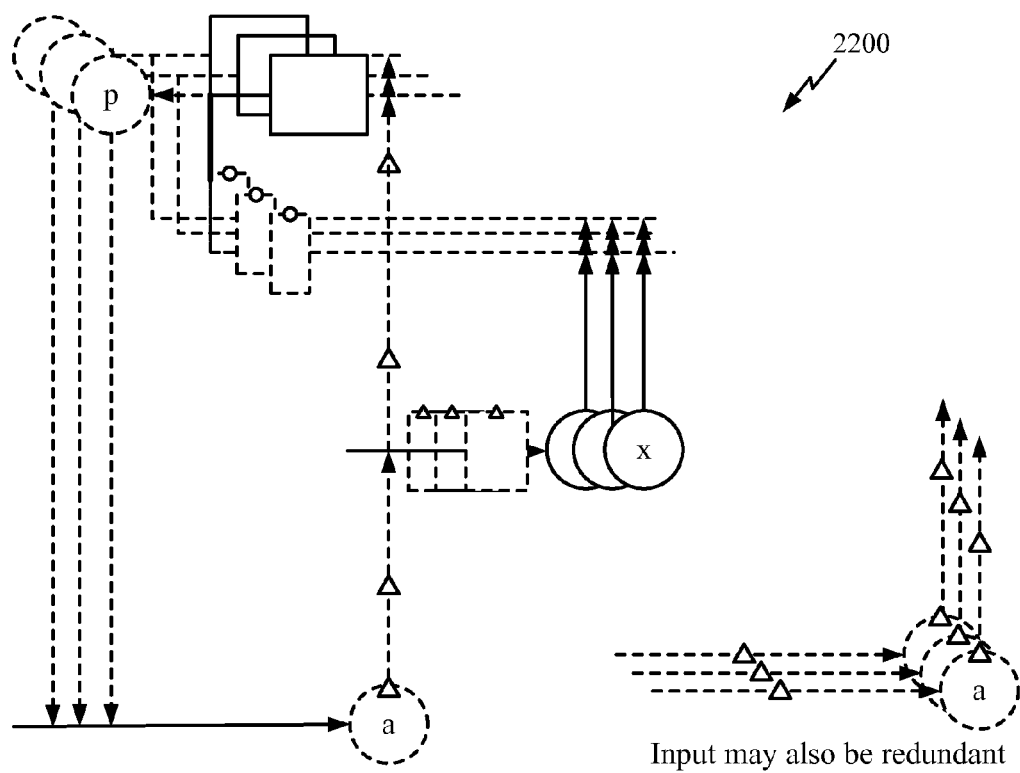
FIG. 22 illustrates an example diagram of afferent, reference neuron and relational-aspect-learning neuron in accordance with certain aspects of the present disclosure.

If a greater control is generally desired, the preferred embodiment may rather be based on expansion. Another way to control replay can be by expanding the network, as illustrated in FIG. 22, in other words, by generalizing from one-to-one relations to one-to-many or many-to-one relations or even many-to-many relations. It should be noted that although it was illustrated in the diagram 2100 from FIG. 21 that the afferents and relational-aspect neurons were connected on a one-to-one basis, this may not be required. This may present at least two possible advantages. First, multiple-to-one and vice-versa connections may improve robustness in the presence of noise or probabilistic firing. Second, if one input is insufficient to cause a receiving neuron to fire (a constraint imposed), then multiple inputs may overcome this limitation.

Figure 23:
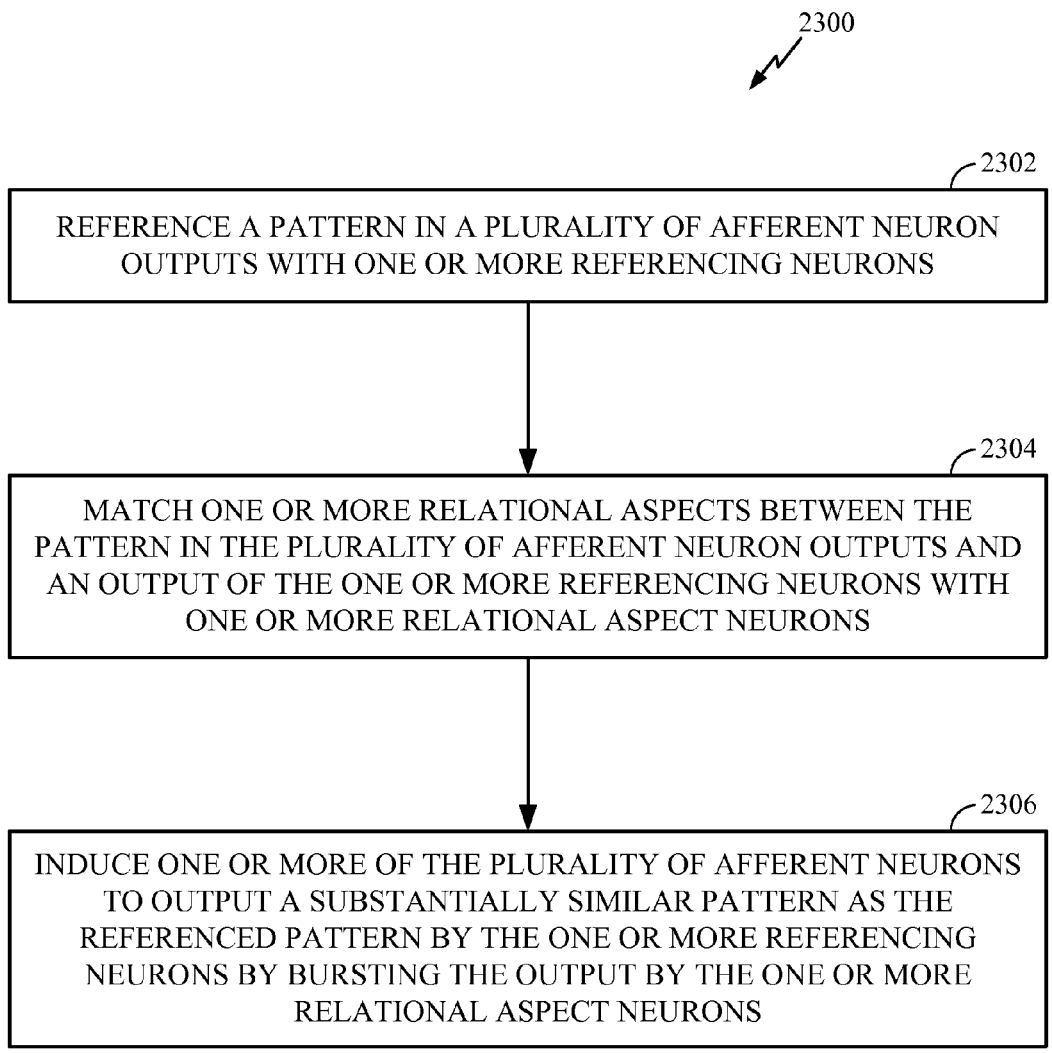
FIG. 23 illustrates other example operations for neural component replay in accordance with certain aspects of the present disclosure.
Figure 23A:
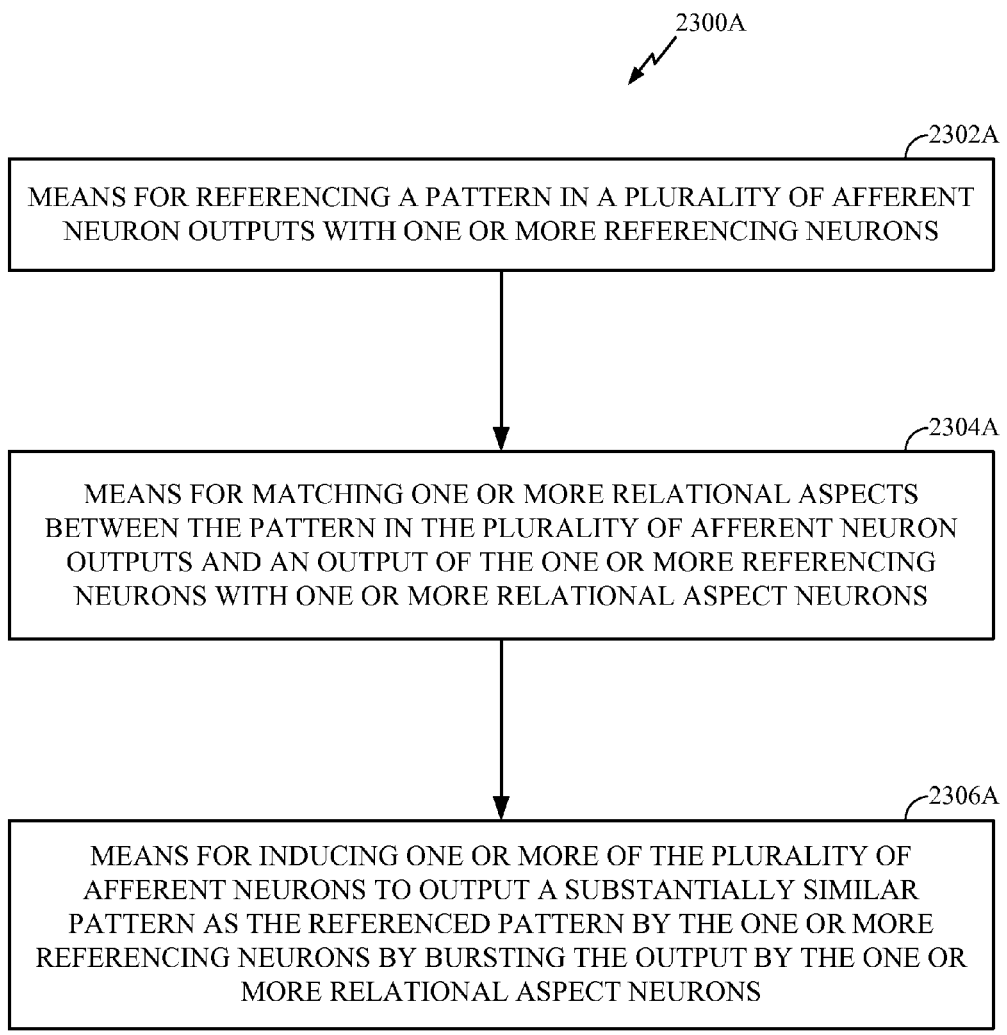
FIG. 23A illustrates example components capable of performing the operations illustrated in FIG. 23.

FIG. 23 illustrates example operations 2300 for neural component replay in accordance with certain aspects of the present disclosure. At 2302, a pattern in a plurality of afferent neuron outputs may be referenced with one or more referencing neurons. At 2304, one or more relational aspects between the pattern in the plurality of afferent neuron outputs and an output of the one or more referencing neurons may be matched with one or more relational aspect neurons. At 2306, one or more of the plurality of afferent neurons may be induced to output a substantially similar pattern as the referenced pattern by the one or more referencing neurons by bursting the output by the one or more relational aspect neurons.

Figure 24:
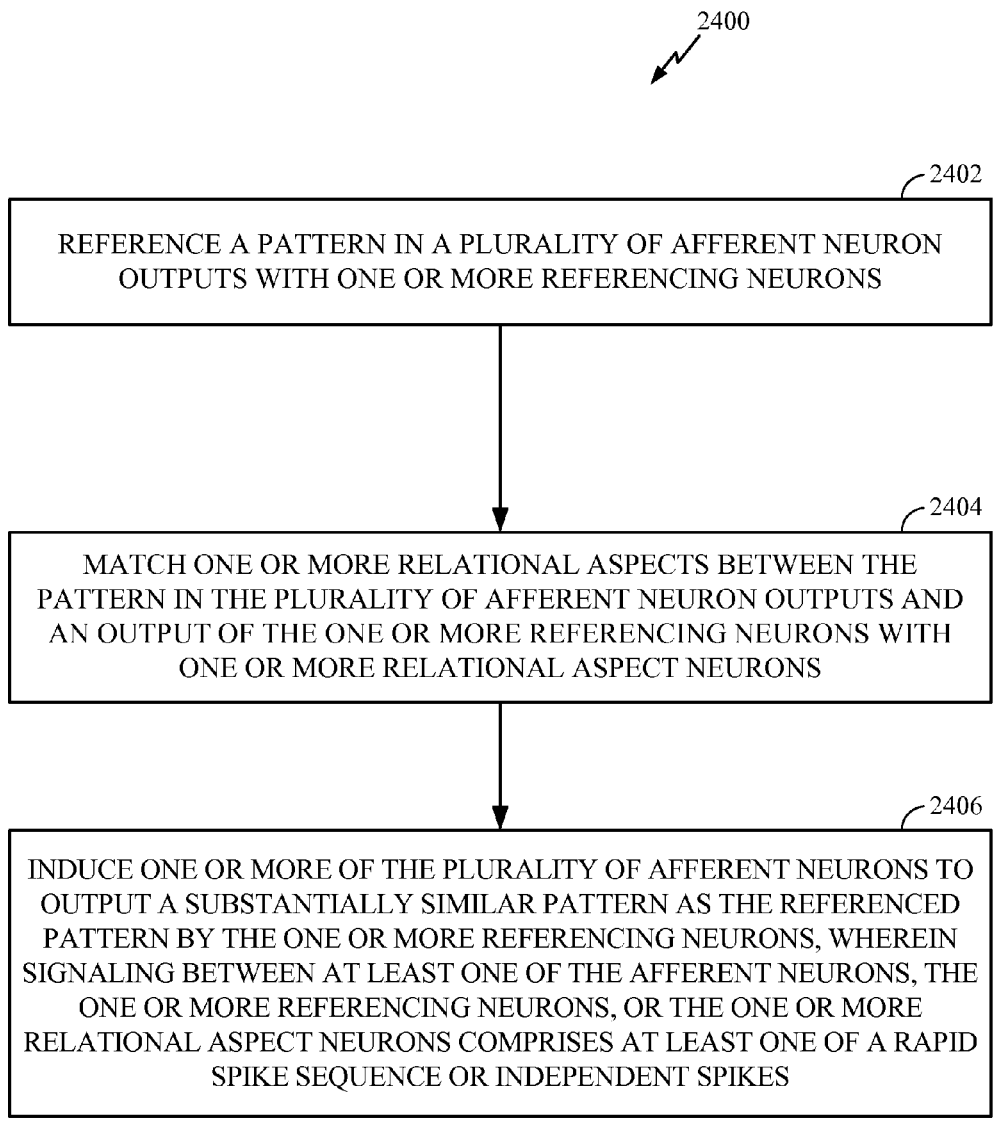
FIG. 24 illustrates other example operations for neural component replay in accordance with certain aspects of the present disclosure.
Figure 24A:
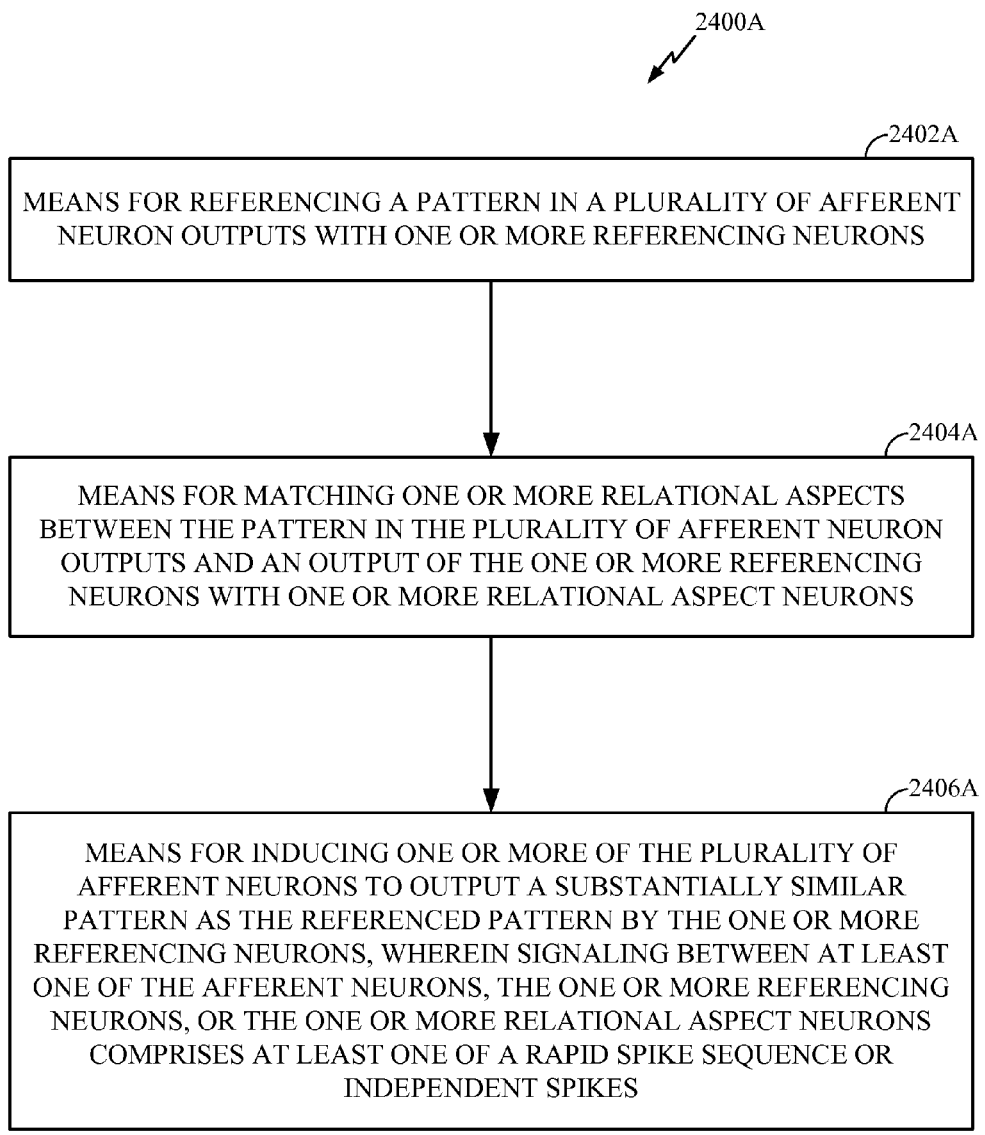
FIG. 24A illustrates example components capable of performing the operations illustrated in FIG. 24.

FIG. 24 illustrates example operations 2400 for neural component replay in accordance with certain aspects of the present disclosure. At 2402, a pattern in a plurality of afferent neuron outputs may be referenced with one or more referencing neurons. At 2404, one or more relational aspects between the pattern in the plurality of afferent neuron outputs and an output of the one or more referencing neurons may be matched with one or more relational aspect neurons. At 2406, one or more of the plurality of afferent neurons may be induced to output a substantially similar pattern as the referenced pattern by the one or more referencing neurons, wherein signaling between at least one of the afferent neurons, the one or more referencing neurons, or the one or more relational aspect neurons may comprise at least one of a rapid spike sequence or independent spikes.

Component Replay and Systemic Replay

Figure 25:
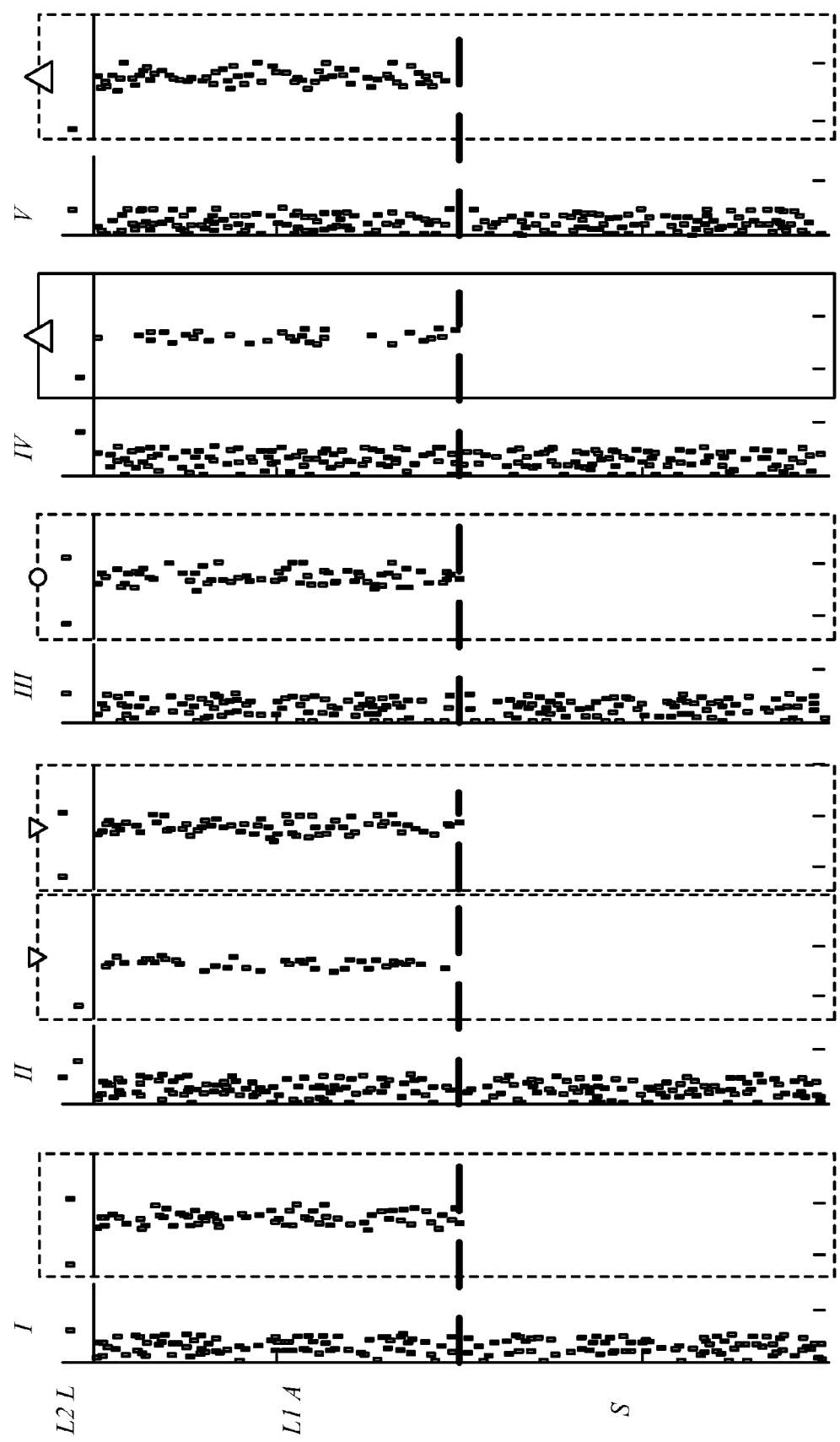
FIG. 25 illustrates an example replay of multiple patterns in accordance with certain aspects of the present disclosure.

Replay of multiple (e.g., five) patterns after a short training duration using the above described temporal coding model with synaptic and structural plasticity is illustrated in FIG. 25. The replays are illustrated in the afferent section (L1 A) of boxes (absent the stimulus (S)) (relational-aspect learning neuron responses not shown in FIG. 25 for purposes of clarity). It should be noted that in the case of the $2^{nd}$ pattern, two neurons learned the pattern. Re-exciting the second one may replay a more complete pattern (more afferents) (see pattern in "L1 A" under "II" second box). Thus, it should be noted that the method may replay a pattern more completely by exciting one or more of the neurons that learned the pattern. In addition, FIG. 21 illustrates how the same architecture can multiplex (learn and replay multiple patterns I through V) with the same neurons. In other words, the architecture may be very scalable.

Learning Refinement and Association

It should be noted that component replay may replay more than the pattern learned by a neuron. This point may appear subtle but it may be very useful. A key insight can be that to refine learning, a method would require to replay a pattern better than it has been learned by whatever entity will undergo refining in learning (or providing a missing piece). However, this may not mean that the pattern is better than any entity has learned the pattern.

Figure 26:
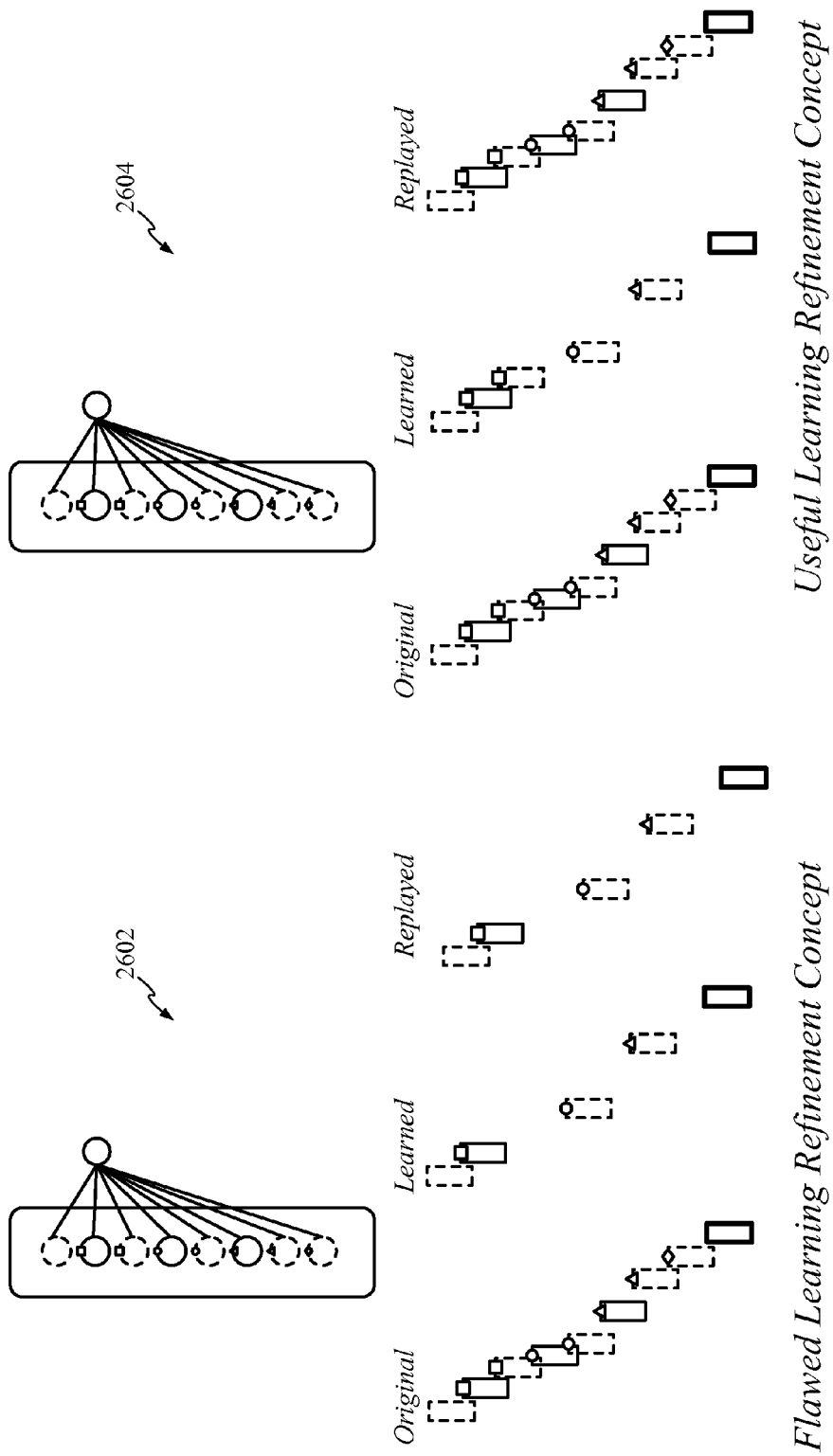
FIG. 26 illustrates examples of flawed and useful learning refinement concepts in accordance with certain aspects of the present disclosure.

In an example 2602 in FIG. 26, a flawed concept of refinement is to replay only the portion of a pattern learned by the entity that will be subject to learning refinement. The question is how further refinement can occur. In an example 2604 in FIG. 26, the replay may be of a more faithful pattern reproduction than it is already learned by the entity that will undergo learning refinement. However, this may not mean that the entity to undergo learning refinement is the only entity that has learned anything about the pattern.

Figure 27:
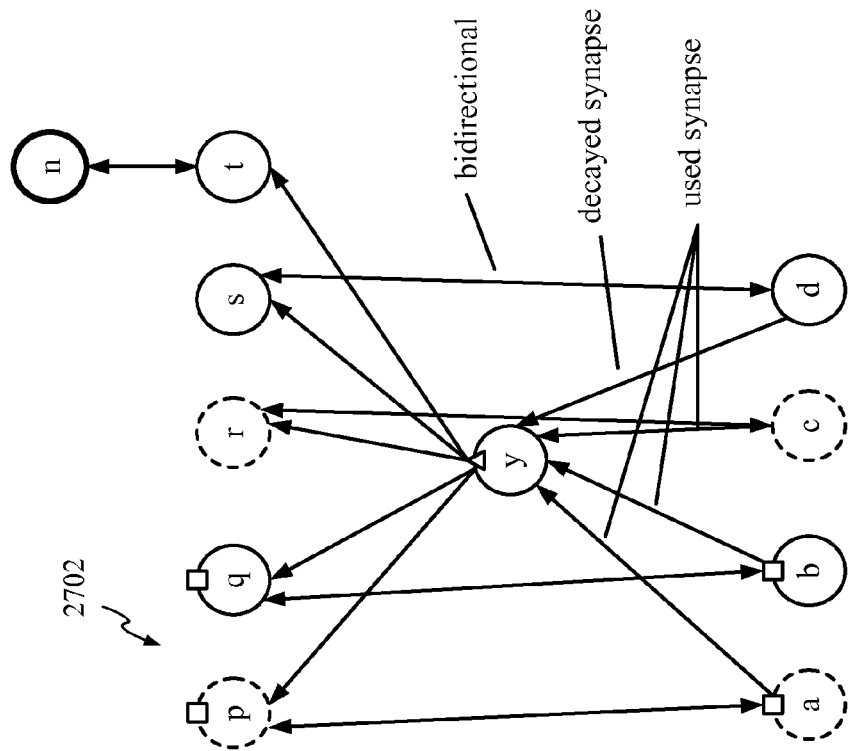
FIG. 27 illustrates examples of relational-aspect learning neurons in accordance with certain aspects of the present disclosure.
Figure 27:
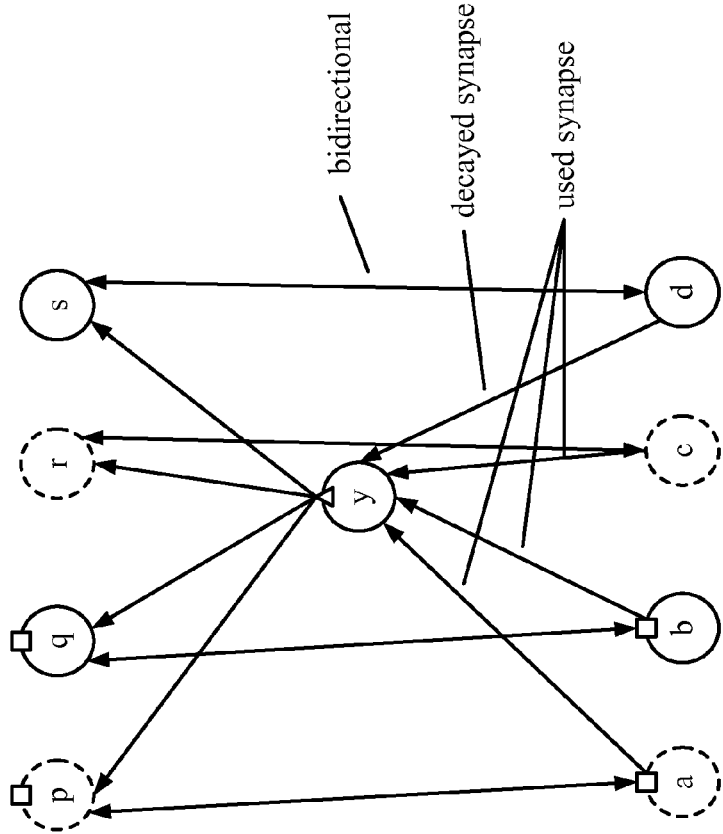

The fact that a particular neuron x learns to fire upon a particular afferent input may be actually due to the neuron x learning fewer than all of the firings in the afferent input pattern. An example is illustrated in FIG. 27 where afferent d may not be relied upon for the pattern recognition by neuron x. As an analogy, it can be considered recognizing someone's face merely because of the eyes and nose. But, the relational-aspect learning neurons may learn the relation between the matching neuron's firing and potentially any one or even all of the elements in the afferent pattern. In other words, the relational-aspect learning neurons may not be constrained by what elements of the pattern neuron x is depending on. As an analogy, it can be considered a third person who hears a first person saying "that's the person A" about a second person. The third person may also see the second person (person A). Maybe, the first person recognizes person A only because of eyes and nose (suppose the rest of face of the person A is occluded). This may not prevent the third person (who can see entire face of the person A) from learning the correspondence between hair of person A and the second person's identification of him as "person A". Thus, relational-aspect learning neurons may reproduce a different (e.g., larger, more complete, or different parts) of an afferent pattern than a learning neuron (or neurons) depend on for matching.

Figure 28:
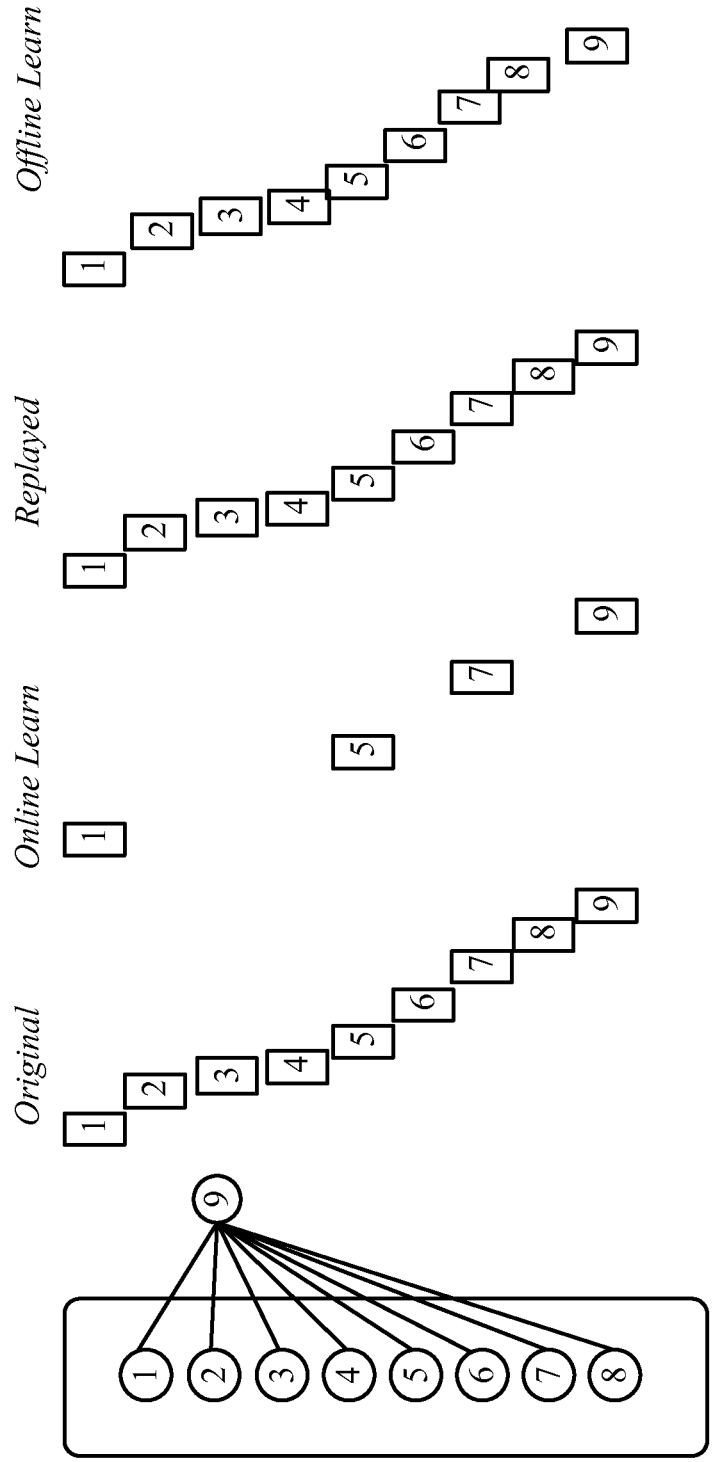
FIG. 28 illustrates an example of learning refinement in accordance with certain aspects of the present disclosure.

It should be noted, however, that the "afferent" may not need to be connected to the pattern learning neuron (e.g., the neuron n in the example 2702 in FIG. 27). As long as there is a paired relational-aspect neuron (e.g., the neuron t), the firing of neuron n may be associated with the afferent pattern and replayed with the afferents. This may provide an online method of associating other signals or activity with a pattern being played by afferents that is being learned. While there may be no need to learn the correspondence at the level of learning neurons, the correspondence may be retained for replay (and learned later or at a higher level or by another neuron) where another piece of the pattern (such as the neuron d in FIG. 27) or a correlated neuron firing (such as the neuron n in FIG. 27). Thus, as illustrated in FIG. 28, the proposed method may refine learning, compare, or proceed with other processing once a stimulus is no longer present.

Figure 29:
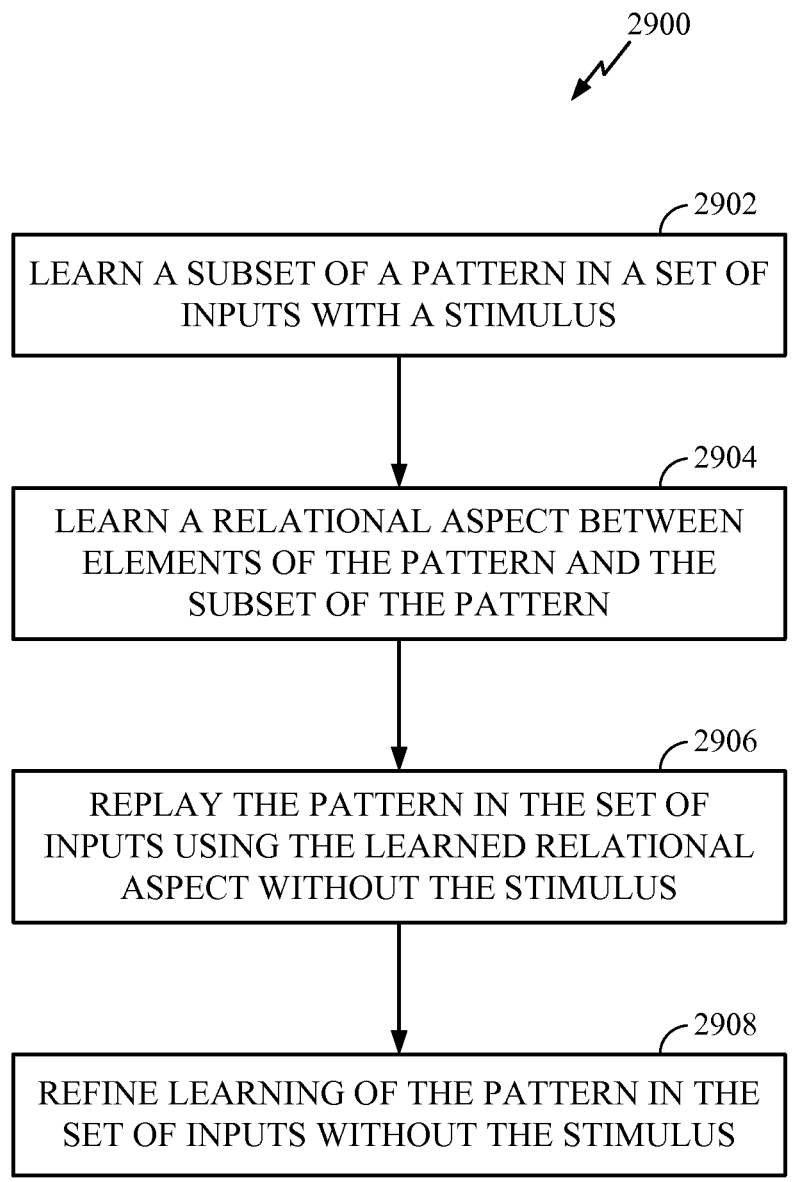
FIG. 29 illustrates example operations for neural learning refinement in accordance with certain aspects of the present disclosure.
Figure 29A:
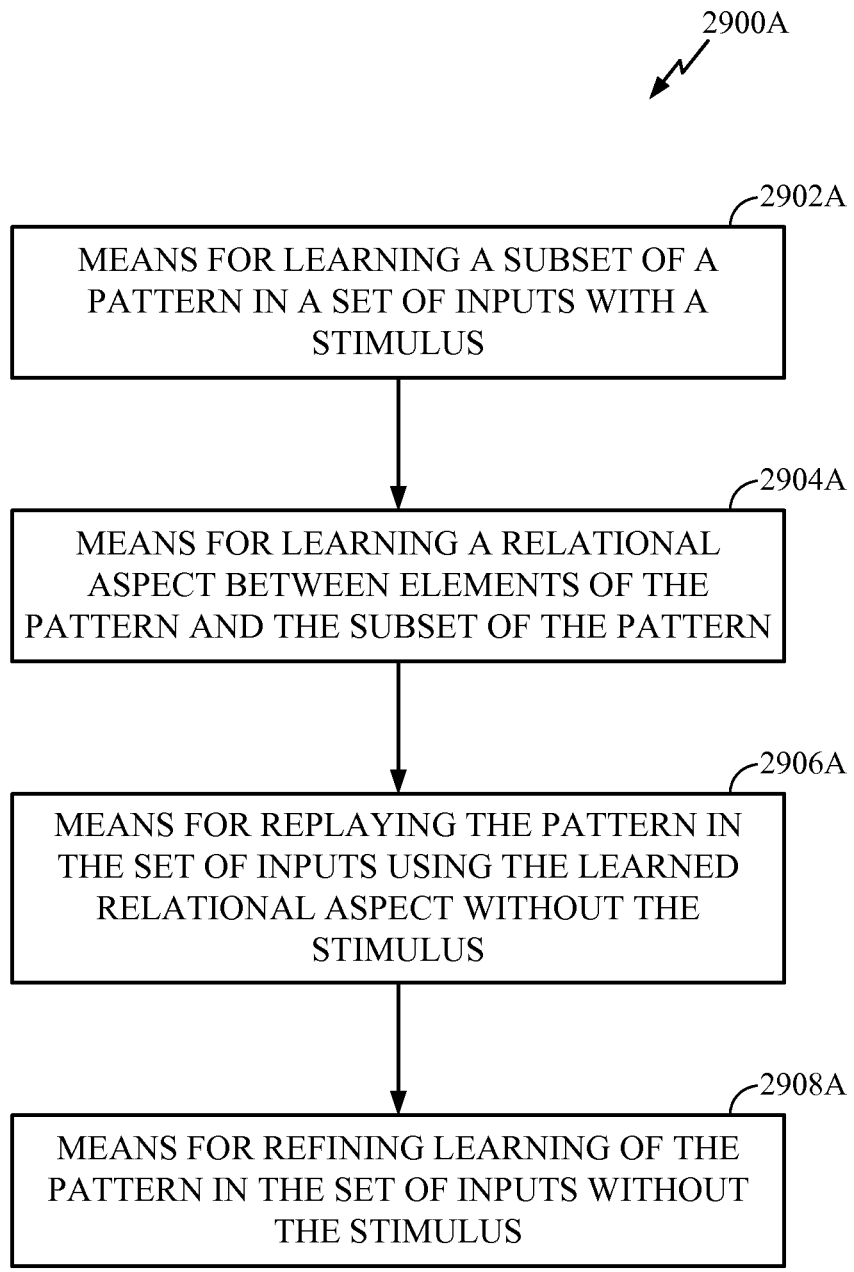
FIG. 29A illustrates example components capable of performing the operations illustrated in FIG. 29.

FIG. 29 illustrates example operations 2900 for neural learning refinement in accordance with certain aspects of the present disclosure. At 2902, a subset of a pattern in a set of inputs may be learned with a stimulus. At 2904, a relational aspect between elements of the pattern and the subset of the pattern may be learned. At 2906, the pattern in the set of inputs may be replayed using the learned relational aspect without the stimulus. At 4208, learning of the pattern in the set of inputs may be refined without the stimulus.

Memory Transfer and Association

Figure 30:
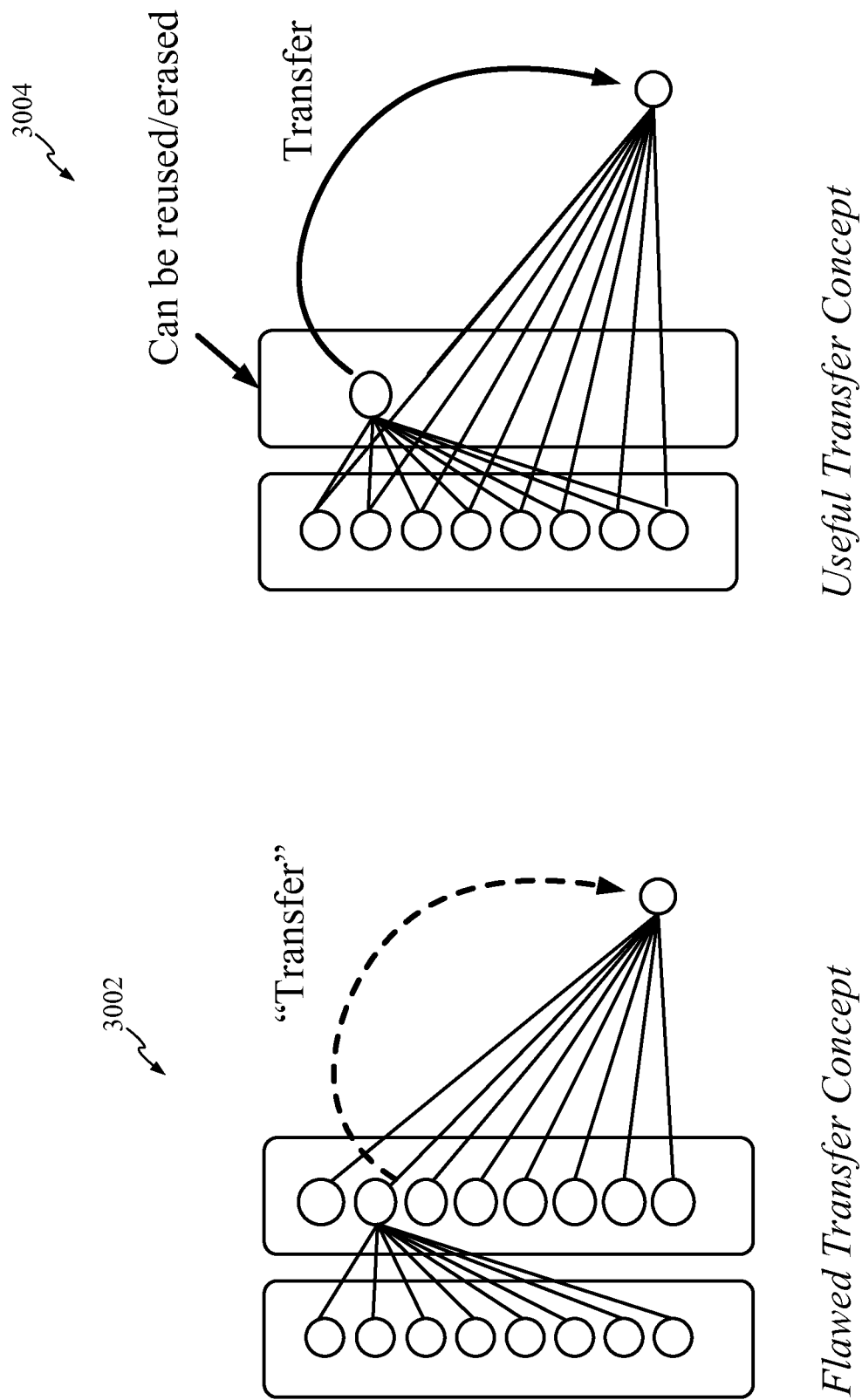
FIG. 30 illustrates examples of flawed and useful memory transfer concepts in accordance with certain aspects of the present disclosure.

Given a method of replay, a method of memory transfer can be described. FIG. 30 points out a key distinction for meaningful memory transfer: without replay via original afferents, "transfer" of memory cannot actually occur because whatever the transferee learns, may not be an aspect of the original afferents. In an example 3002 of FIG. 30, the transferee may learn the output of a pattern-matching neuron. The key insight can be that for useful transfer, the transferee may not need to rely on the transferor afterward to recognize the pattern. In an example 3004 of FIG. 30, this may be the case. Thus, replay via the original afferents may be required for off-line (without stimulus) transfer of the memory. This replay may be component replay or systemic replay resulting from component replay elsewhere in a neural network. Regardless, the pattern recognizing transferor may be involved in triggering the replay, but the transferee may not rely on that.

To transfer a memory, the replay method may be used to replay the pattern via original afferents. Although this may seem counter-intuitive, it should be noted that the transferee (the new pattern matcher) and associated relational-aspect neurons may be unconnected to the transferor (the old pattern matcher) and to any associated relational-aspect neurons (i.e., if the transferor has/requires replay capability; otherwise the relational-aspect neurons are not required). The transferee may learn the replayed pattern. It should be noted that the transferee may learn different elements or aspects of the pattern learned by the transferor. It should be also noted, analogous to the above description of association in relation to learning refinement, that the transferee may learn a combination of the afferent pattern and a pattern in one or more additional input neurons (the neuron n in the example 2702 in FIG. 27). Except, here it may be either due to replay of that other pattern as part of the replay or as mere coinciding "play" of those additional signals in order to associate them with the afferent pattern. In either case, the one or more additional input may or may not be input to the transferor, even input to the transferee or relational-aspect learning neurons.

It should be noted that once a memory is transferred, both the transferor (pattern-matching neuron(s)) and the relational-aspect learning neurons may be reused/erased/reassigned or undergo new learning without disturbing the ability of the transferee to recognize the original pattern.

Figure 31:
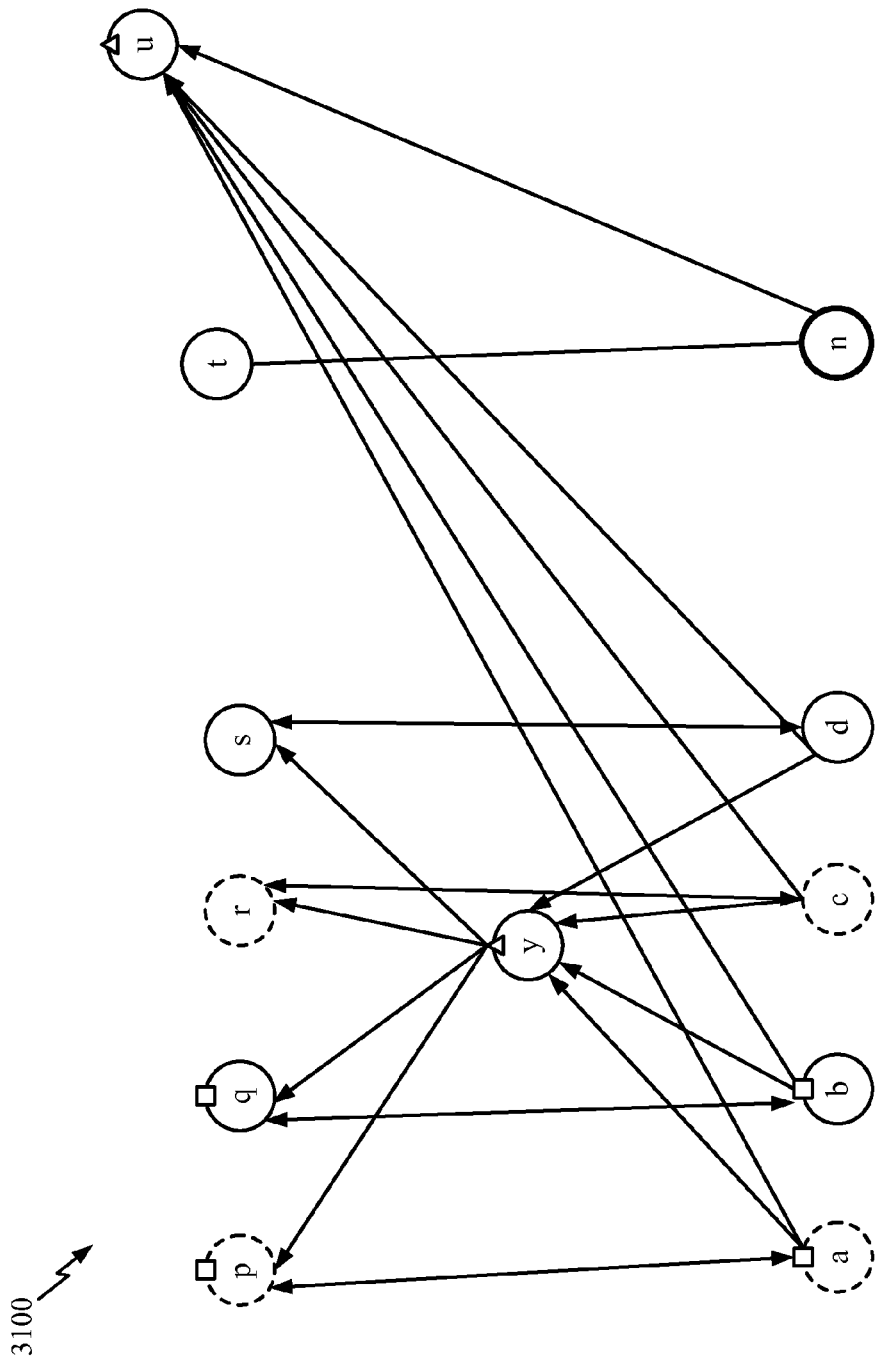
FIG. 31 illustrates an example of network of neurons for memory transfer in accordance with certain aspects of the present disclosure.

It should be also noted that a memory may be transferred based on the relational-aspect neurons as well (neurons p through s in an example 3100 in FIG. 31) rather than, or in addition to, the afferents (neurons a through d). However, if the transferee relies on the relational-aspect neurons, then these should not be erased if the memory is to be retained by the transferee.

Figure 32:
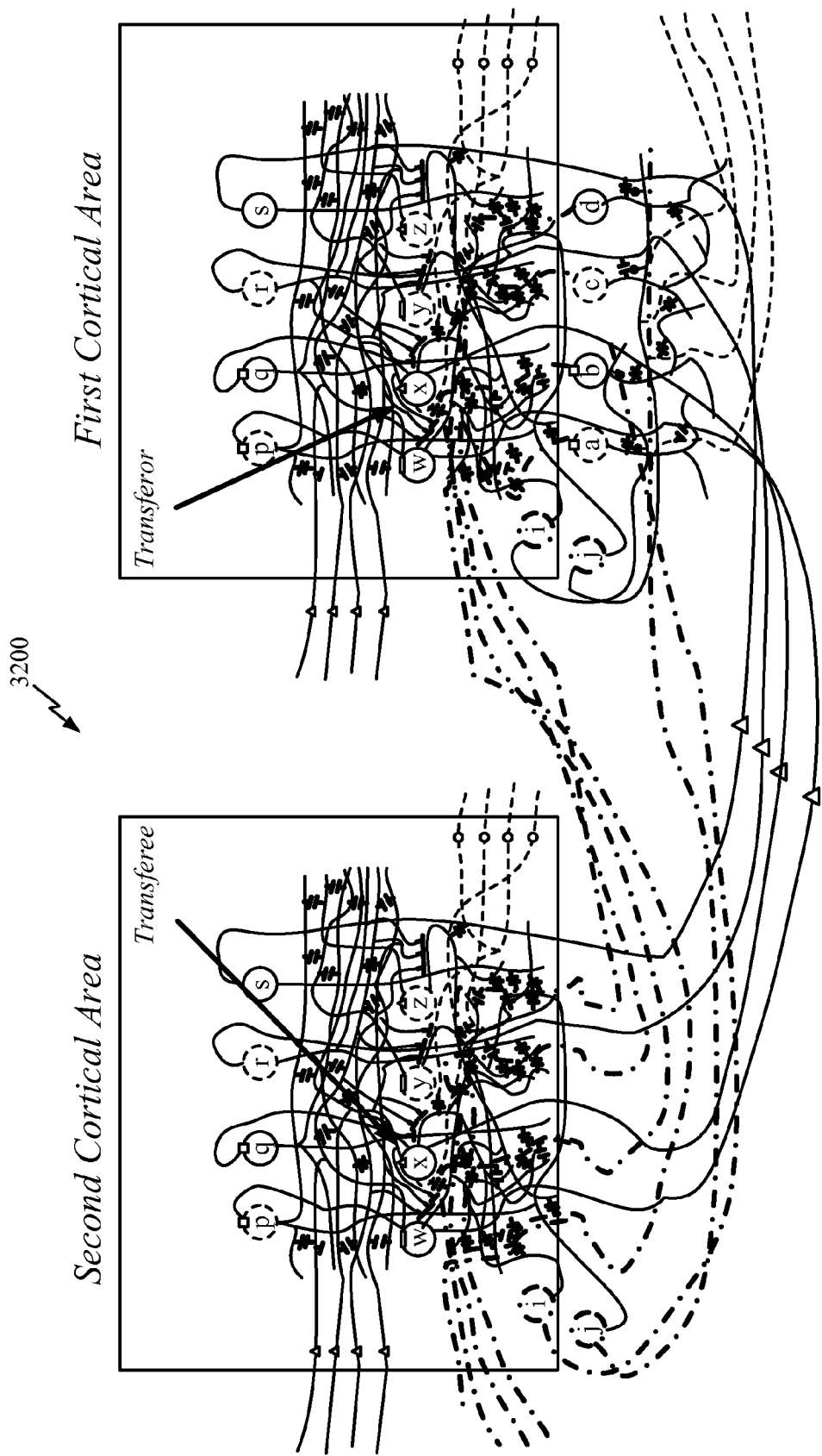
FIG. 32 illustrates an example of connectivity between neurons for memory transfer in accordance with certain aspects of the present disclosure.

Moreover, a new bank of relational-aspect learning neurons may be used in association with the transferee in order to replay the pattern learned by the transferee, refine the transferee's learning or accomplish any of the above discussed further processing, including even transferring the memory again. This may fit well with the generality of the cortical fabric structure of the present disclosure. Such a structure is illustrated in FIG. 32. It should be noted that although the same letters are used for the neurons in both cortical areas, these are not the same neurons. This is merely a convenience and the identification is local to the cortical area.

Figure 33:
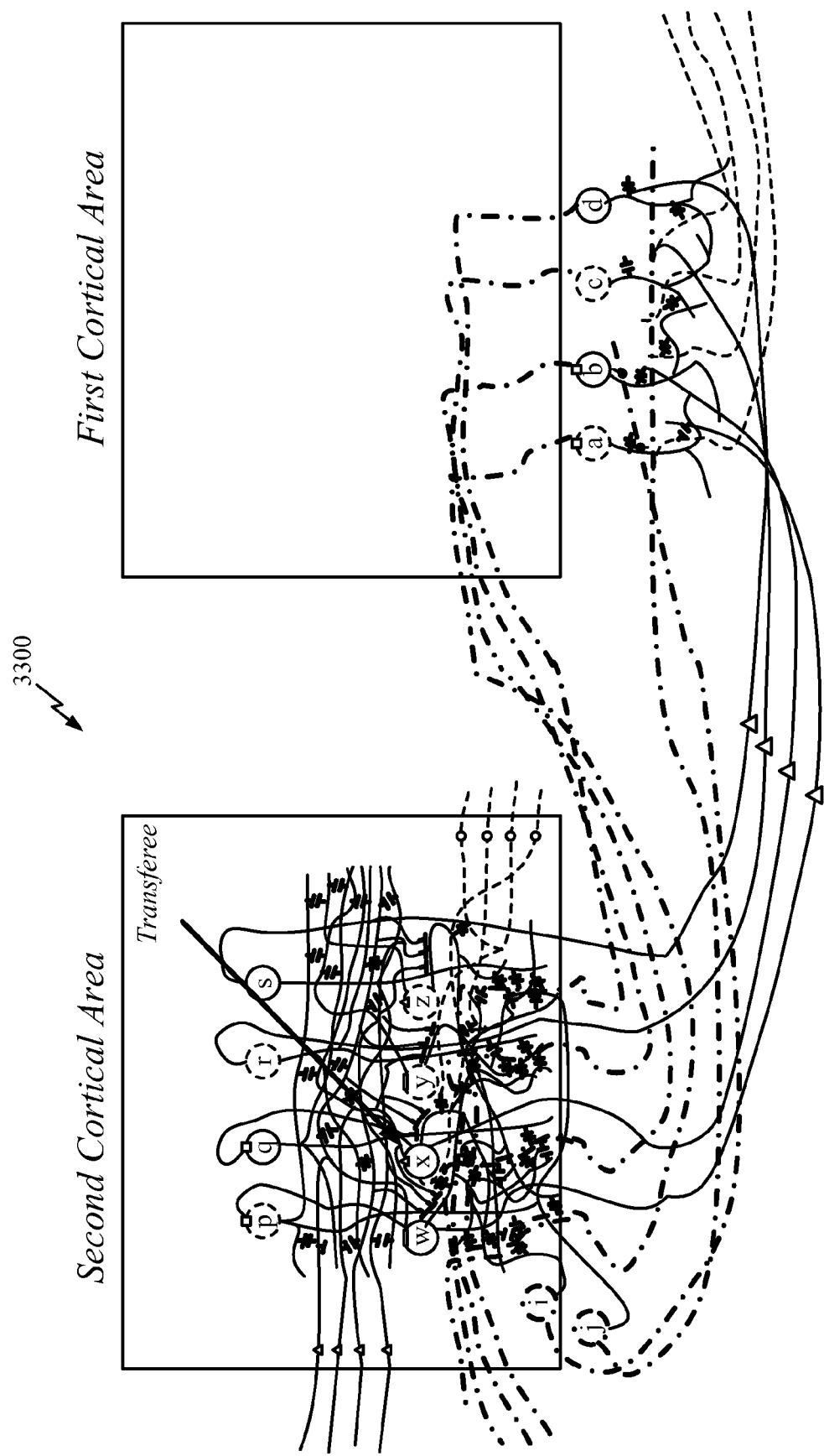
FIG. 33 illustrates another example of connectivity between neurons for memory transfer in accordance with certain aspects of the present disclosure.
Figure 34:
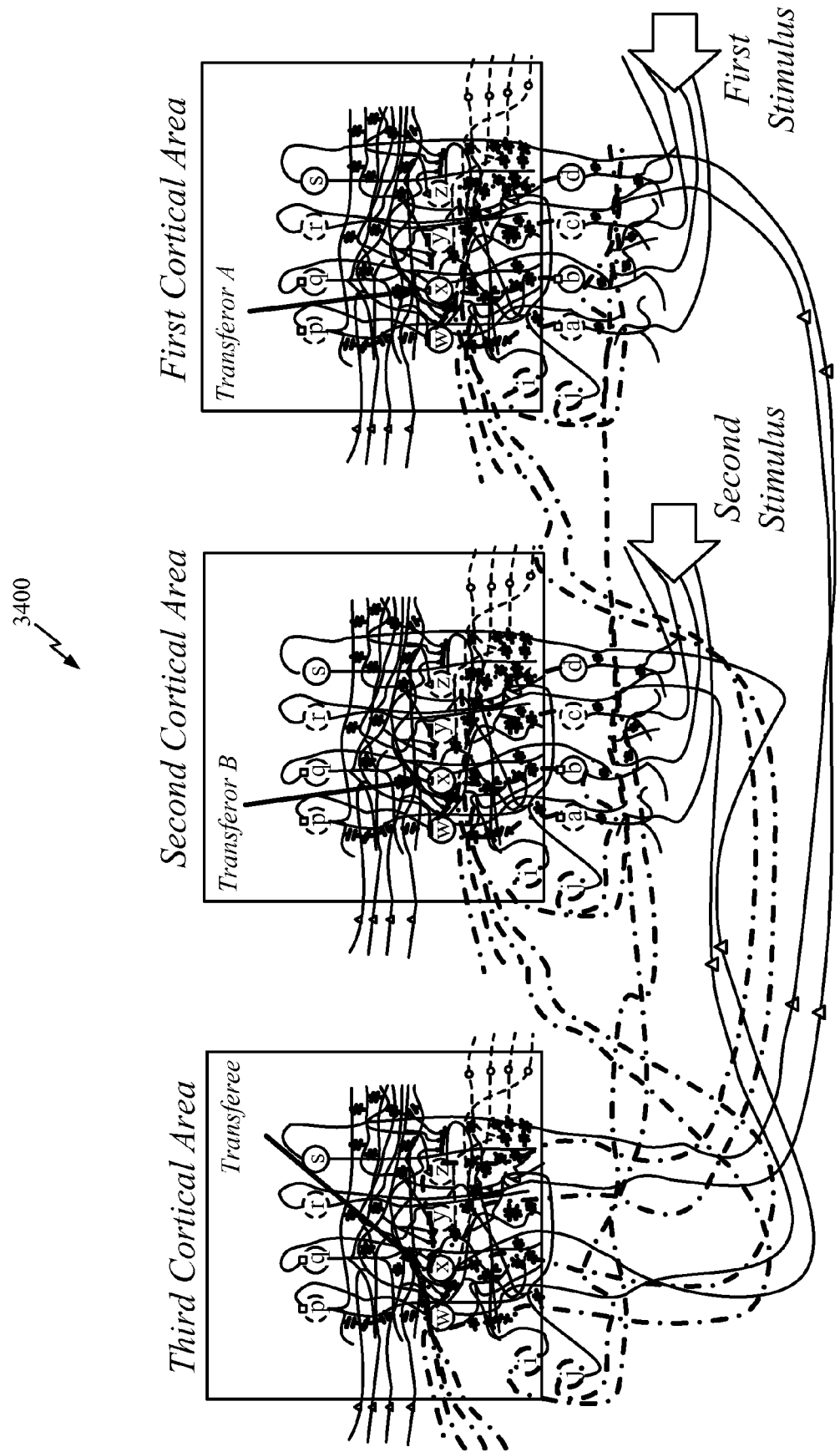
FIG. 34 illustrates an example of connectivity between neurons for memory transfer and association in accordance with certain aspects of the present disclosure.

The diagram 3200 in FIG. 32 illustrates an example of the connectivity for memory transfer. While the cortical areas are shown separately, these may also just be different areas within a common area or points along a stretch of cortical fabric. In the example 3200, both cortical areas may use the same afferents. A diagram 3300 in FIG. 33 shows that once transfer is complete, there may be no dependence on the first cortical area. An example diagram 3400 in FIG. 34 shows an extension to transfer and at the same time associate separately learned patterns from a first and second cortical area by a third cortical area (transfer and associate).

Finally, in regards to memory transfer, there may be a number of extensions and alternatives. Transfer to the second or other memory may be achieved in conjunction with erasing of the original memory. This may be done without impacting replay fidelity because replay can be achieved using the relational aspect neurons.

If replay does trigger the original pattern match to fire and this is desired but learning refinement is not desired at the same time as memory transfer, then the input from layer 2 (referencing or pattern matching neuron(s)) to layer 3 (relational-aspect learning) may be blocked by inhibitory connections. Specifically, pre-synaptic inhibition of layer 2 to layer 3 synapses may be driven by either prior layer 3 output (delayed) or by prior layer 2 output (controlled), for example. Variations of this concept are possible. The main idea is to use a prior output in the procedure as a trigger to inhibit particular connections layer in the procedure.

It should be noted that the above principles can also be applied to alternatives to the pre-synaptic inhibition used during exposure to original stimulus, to inhibit the layer 3 to layer 1 connections by prior layer 1 output, as described above. Variations might include a trigger from the stimulus directly instead of layer 1 (afferents) or post-synaptic inhibition from the stimulus or layer 1. In either of these cases, delay may be used to bring the time frame of the prior signal in the procedure up to the time of the procedural step to be inhibited.

It should be noted that precise delay may not be necessarily required if the inhibitory impact is on a relatively large time scale (causal but, for example, having a decaying impact with a long time constant). Even if the synaptic inhibition has a short time constant, resonating inhibitory inter-neurons might be used to maintain the inhibition for a longer time window. Nevertheless, if the time window of inhibition is narrow, time precision may be more advantageous. The time delay may also be learned (i.e., by the inhibitory neuron or circuit, even in an unsupervised learning) by using a learning rule that cross-correlates the relational-aspect learning firing and the causal afferent firing, thereby raising the weight of the synaptic connections with delays that align those firings.

Figure 35:
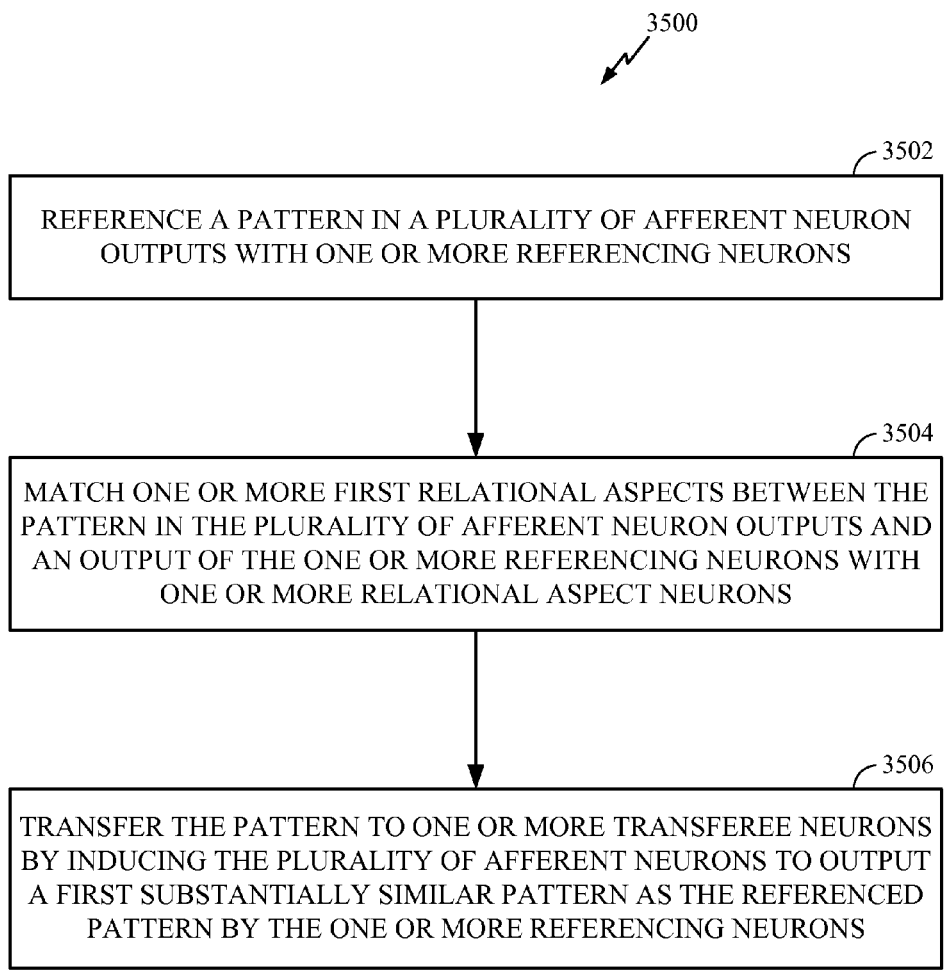
FIG. 35 illustrates example operations for neural component memory transfer in accordance with certain aspects of the present disclosure.
Figure 35A:
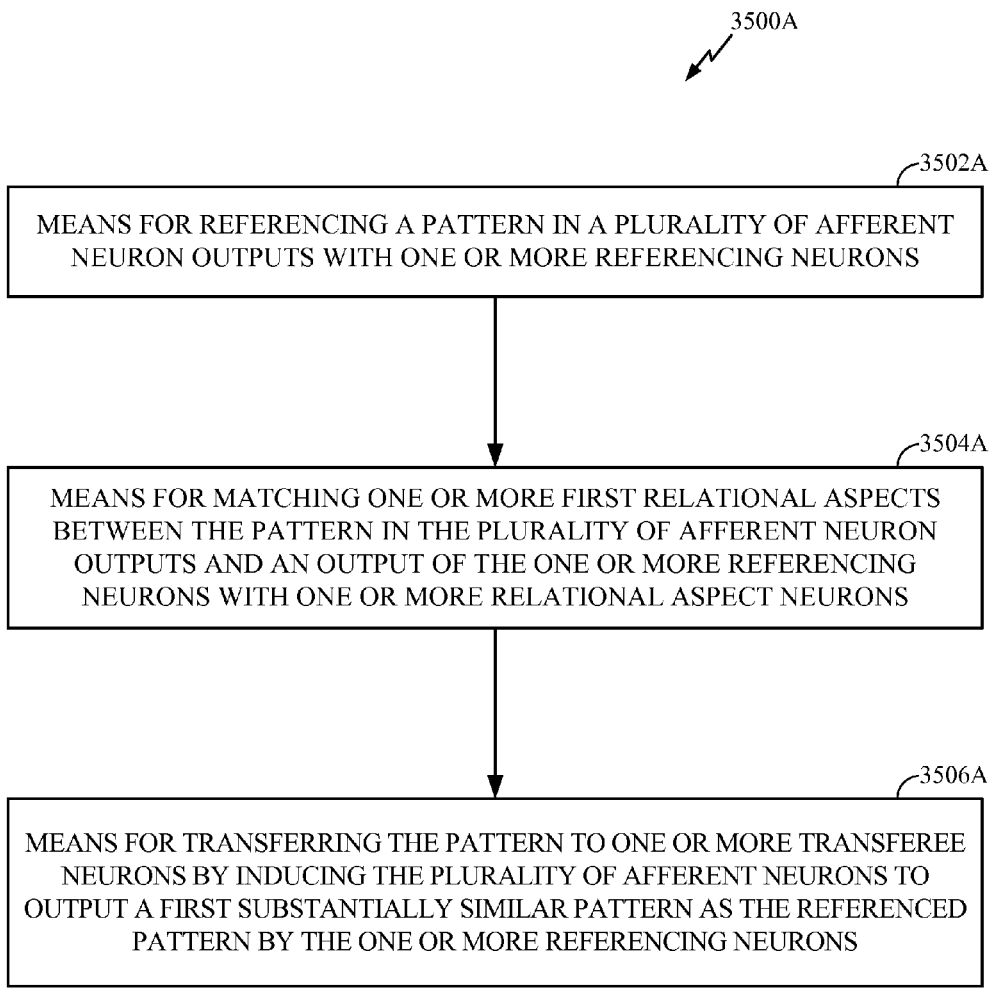
FIG. 35A illustrates example components capable of performing the operations illustrated in FIG. 35.

FIG. 35 illustrates example operations 3500 for neural component memory transfer in accordance with certain aspects of the present disclosure. At 3502, a pattern in a plurality of afferent neuron outputs may be referenced with one or more referencing neurons. At 3504, one or more first relational aspects between the pattern in the plurality of afferent neuron outputs and an output of the one or more referencing neurons may be matched with one or more first relational aspect neurons. At 3506, the pattern may be transferred to one or more transferee neurons by inducing the plurality of afferent neurons to output a first substantially similar pattern as the referenced pattern by the one or more referencing neurons.

Figure 36:
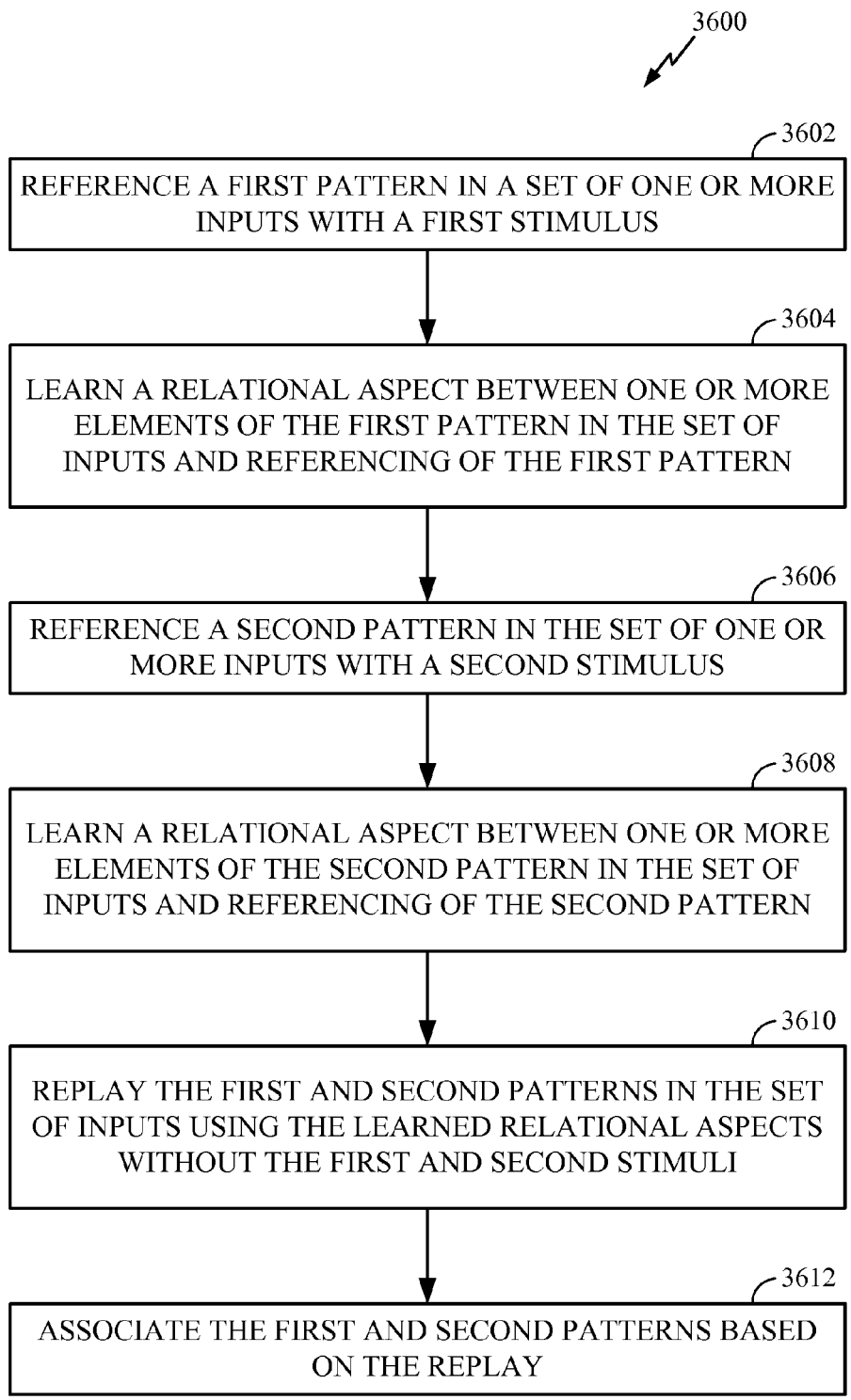
FIG. 36 illustrates example operations for neural associative learning in accordance with certain aspects of the present disclosure.
Figure 36A:
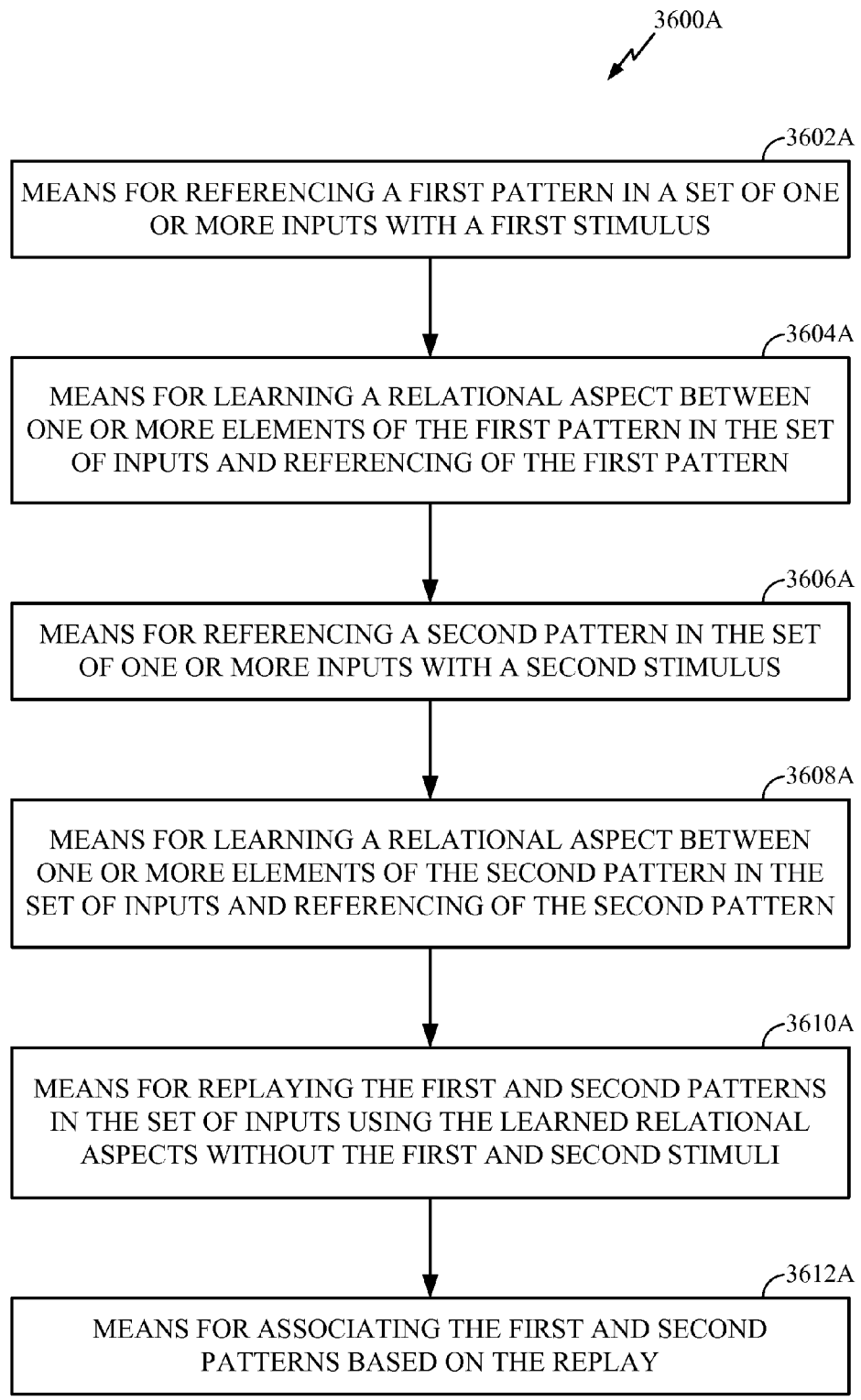
FIG. 36A illustrates example components capable of performing the operations illustrated in FIG. 36.

FIG. 36 illustrates example operations 3600 for neural associative learning in accordance with certain aspects of the present disclosure. At 3602, a first pattern in a set of one or more inputs may be referenced with a first stimulus. At 3604, a relational aspect between one or more elements of the first pattern in the set of inputs and referencing of the first pattern may be learned. At 3606, a second pattern in the set of one or more inputs may be referenced with a second stimulus. At 3608, a relational aspect between one or more elements of the second pattern in the set of inputs and referencing of the second pattern may be learned. At 3610, the first and second patterns in the set of inputs may be replayed using the learned relational aspects without the first and second stimuli. At 3612, the first and second patterns may be associated based on the replay.

Pattern Completion and Pattern Separation

Pattern completion is a process in which the system has previously been exposed to an original stimulus that evoked an original pattern in afferents and then later, the system may be exposed to a partial stimulus that would evoke only a part of the original pattern except that the replay method completes the pattern. In other words, the ability of pattern completion may represent the ability to respond to a degraded input with a complete response.

Figure 37:
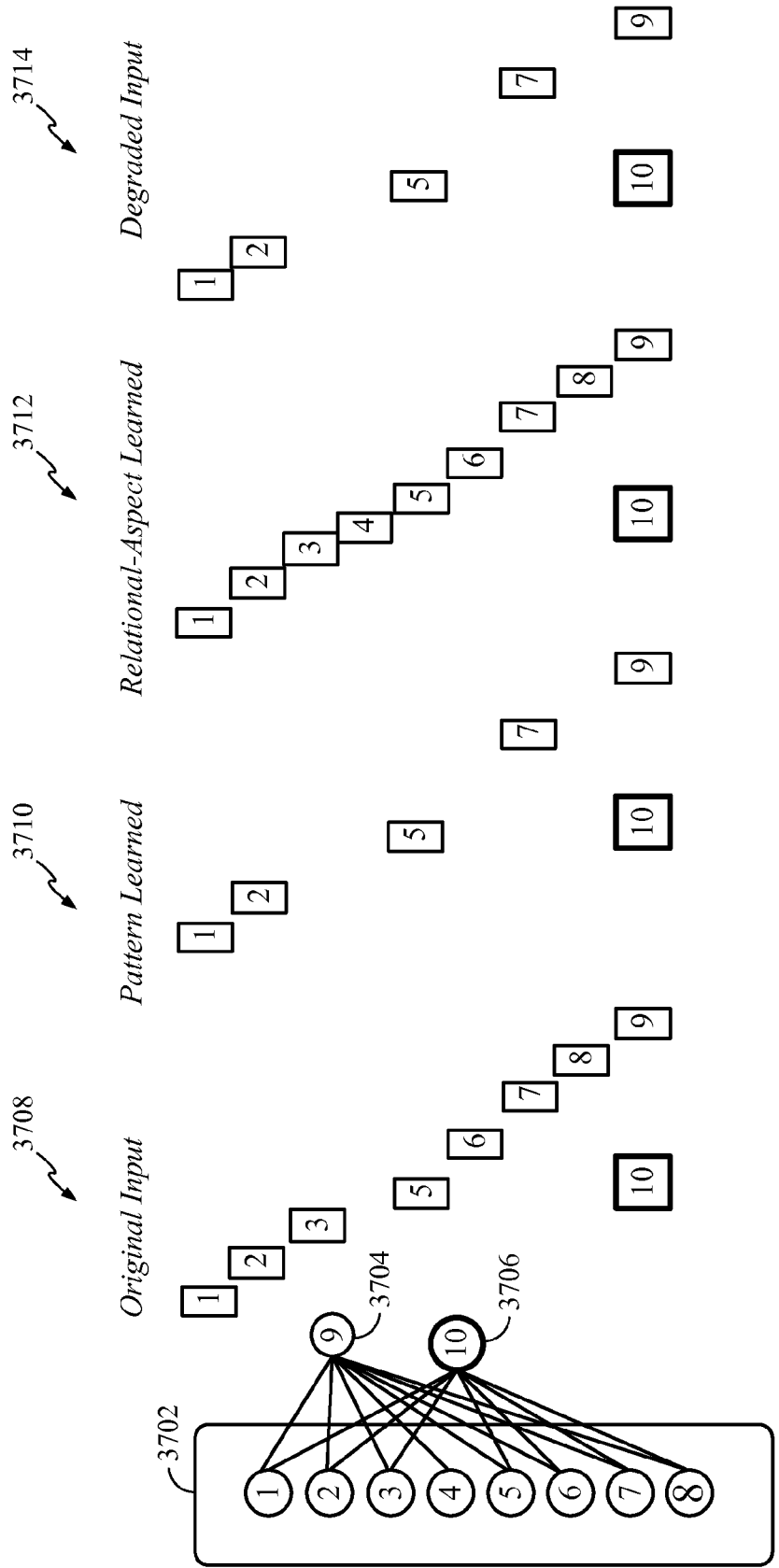
FIG. 37 illustrates an example of pattern completion in accordance with certain aspects of the present disclosure.

The present disclosure provides a method of pattern completion. In order to achieve pattern completion, a reference may be required (or pattern learner/matcher) that matches or references the degraded pattern as corresponding to the original pattern. FIG. 37 illustrates a network 3700 with several afferents 3702 and two references (or pattern-learning neurons) 3704, 3706. The original (full) pattern 3708 is also illustrated in FIG. 37. In an aspect, the neuron 3704 may reference this pattern (or has learned this pattern). Furthermore, the neuron 3704 may also reference (match) at least the degraded pattern 3710. In addition, all elements of the pattern may be learned by relational aspect neurons, as illustrated by the spikes 3712. The degraded input 3714 is also illustrated, and it may satisfy the minimum elements required for the reference, so the neuron 3704 may also fire on the degraded input 3714 (not merely on the complete input 3708).

Figure 38:
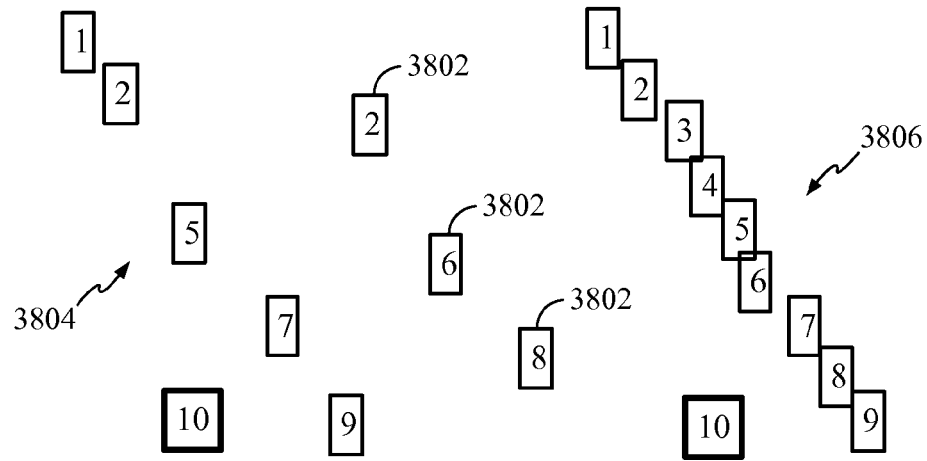
FIG. 38 illustrates an example of degraded input with lagging completion in accordance with certain aspects of the present disclosure.

As per the descriptions above, the reference (match) output (the neuron 3704 in FIG. 37) may be then input to the relational aspect layer which may cause the relational aspect neurons to fire. Due to the relational-neuron-to-afferent-neuron pre-synaptic inhibition connectivity described above, the elements of the original pattern that are already in the degraded pattern may be suppressed from replay by the inhibitory circuits. However, since missing elements are not in the degraded pattern, they may have no inhibitory feedback and thus may be replayed. Thus, the pattern may be completed by the replay circuit, as illustrated in FIG. 38. It should be noted that the completion part may be replayed at a delayed time (spikes 3802) relative to the degraded but existing part (spikes 3804). These parts may be aligned by inserting delay for the degraded but existing part so that they can be realigned (spikes 3806).

Figure 39:
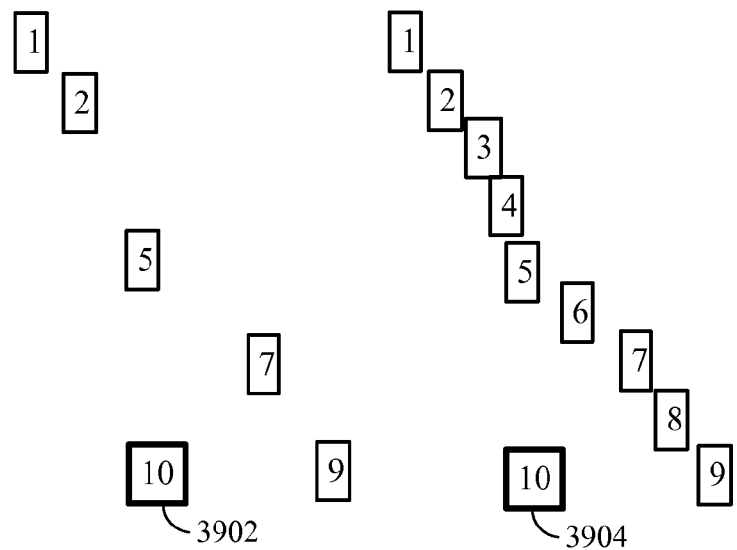
FIG. 39 illustrates an example of degraded input with replay completion in accordance with certain aspects of the present disclosure.

An alternative method of pattern completion can be to remove, suppress or overcome the pre-synaptic inhibitory circuits described above. As a result, the degraded pattern may occur first. Then, at a delayed time, the complete pattern may be replayed, as illustrated in FIG. 39.

Figure 40:
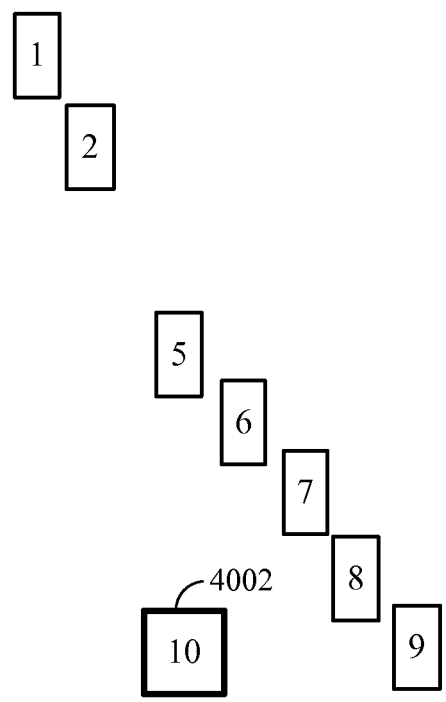
FIG. 40 illustrates an example of degraded input with late completion in accordance with certain aspects of the present disclosure.

Another alternative method of pattern completion can be if the reference (match) fires before the end of the pattern. This is the purpose of showing the neuron 3706 in FIG. 37. It can be noticed that the neuron 3706 fires mid-pattern (e.g., spikes 3902, 3904 in FIG. 39, and a spike 4002 in FIG. 40). This may be because it recognizes the early part of the degraded pattern. In this case, the missing part occurring after the reference (the spike 4002 in FIG. 40) may be replayed with the degraded part of the afferents, as illustrated in FIG. 40. This may be because the relational-aspect neurons can respond to the neuron 3706 and thus may induce the afferents to fire after the neuron 3706 fires (but not before).

Finally, larger and more general pattern completion may be also possible. What is meant by larger is that the pattern being produced can be longer in duration than the delay line range (e.g., of dendritic delay range), so the pattern may be learned/referenced by multiple reference neurons in a sequence. What is meant by more general is patterns with multiple spikes per afferent. An explanation is provided further below in the discussion of hierarchical replay.

A related but different process can be the process of pattern separation. This may represent the ability to modify similar stored/learned patterns to increase the difference between them and improve distinction in recognizing stimuli. The present disclosure is compatible with pattern separation because lateral inhibition at the reference layer may be used to separate reference layer neuron learning and thus separate stored patterns. Separation may occur during relational-aspect learning as well because this learning depends on a relation with the reference layer and the afferents. It should be noted that if similar patterns cause confusion in reference firing, this can thus negatively impact the relational aspect learning, which may thereby separate or suppress learning of similar aspects. A similar effect may occur if multiple references (corresponding to multiple patterns) fire for a single original pattern during relational-aspect learning.

Figure 41:
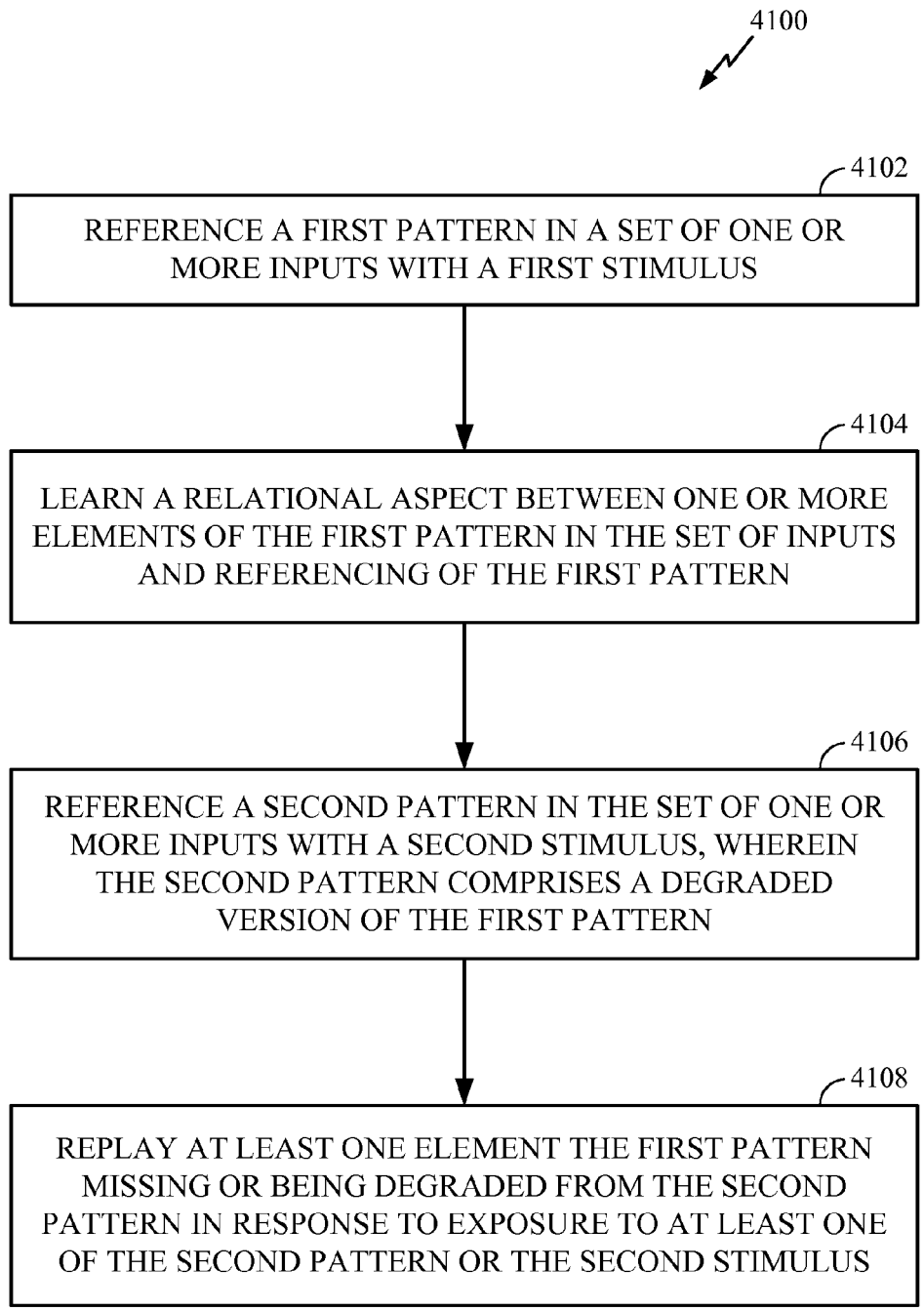
FIG. 41 illustrates example operations for neural pattern completion in accordance with certain aspects of the present disclosure.
Figure 41A:
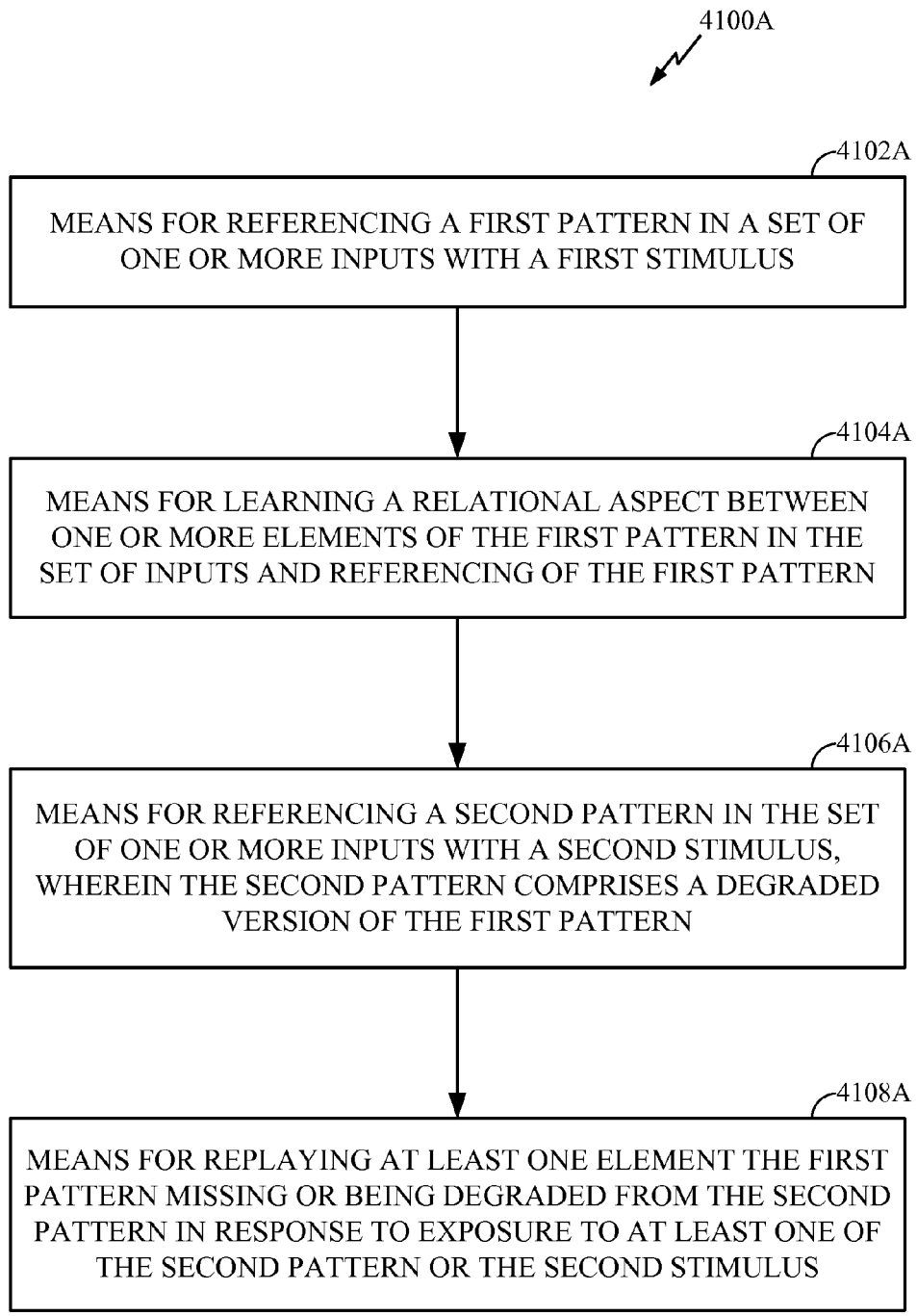
FIG. 41A illustrates example components capable of performing the operations illustrated in FIG. 41.

FIG. 41 illustrates example operations 4100 for neural pattern completion in accordance with certain aspects of the present disclosure. At 4102, a first pattern in a set of one or more inputs may be referenced with a first stimulus. At 4104, a relational aspect between one or more elements of the first pattern in the set of inputs and referencing of first pattern may be learned. At 4106, a second pattern in the set of one or more inputs may be referenced with a second stimulus, wherein the second pattern may comprise a degraded version of the first pattern. At 4108, at least one element of the first pattern missing or being degraded from the second pattern may be replayed in response to exposure to at least one of the second pattern or the second stimulus.

Figure 42:
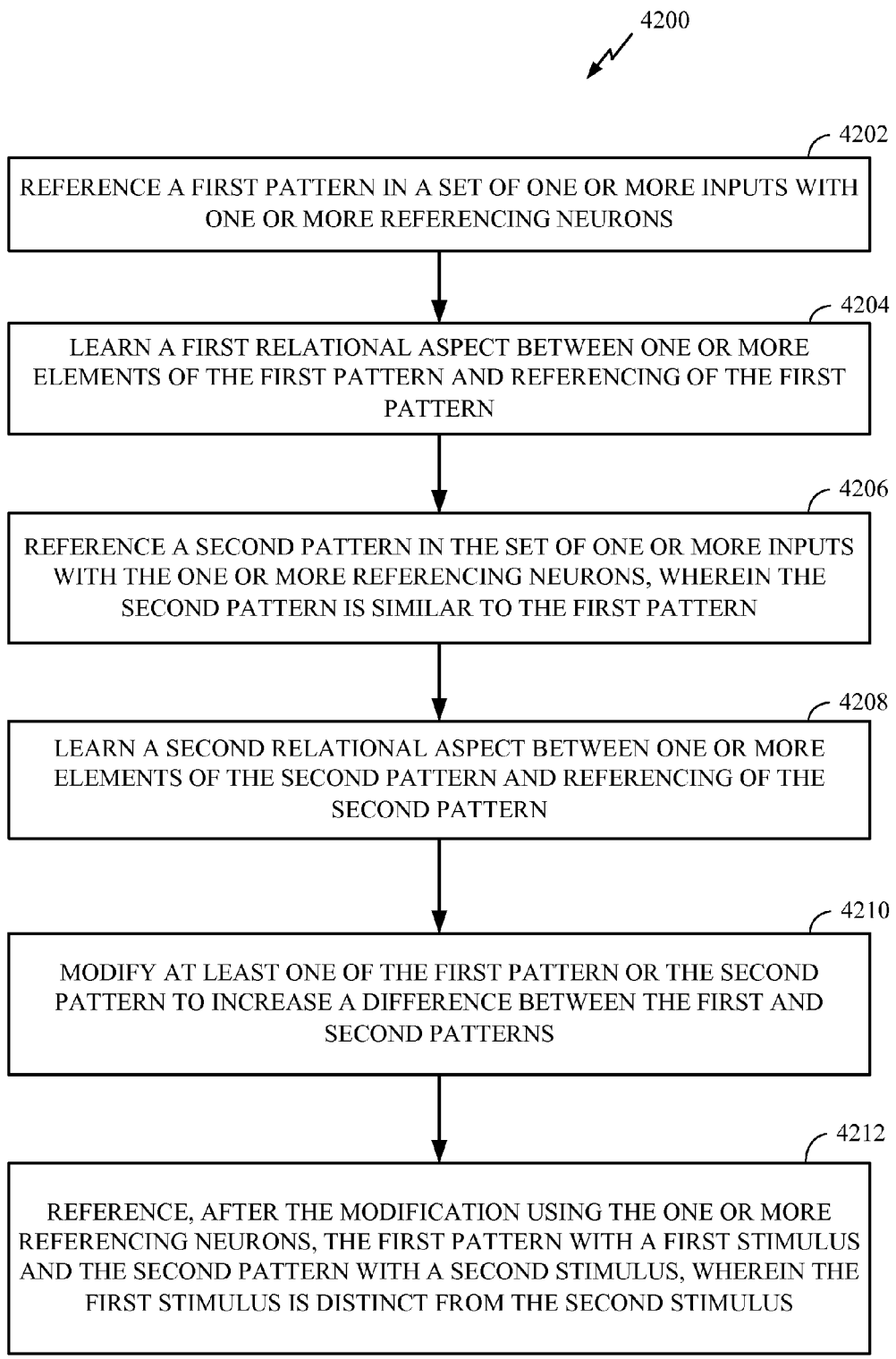
FIG. 42 illustrates example operations for neural pattern separation in accordance with certain aspects of the present disclosure.
Figure 42A:
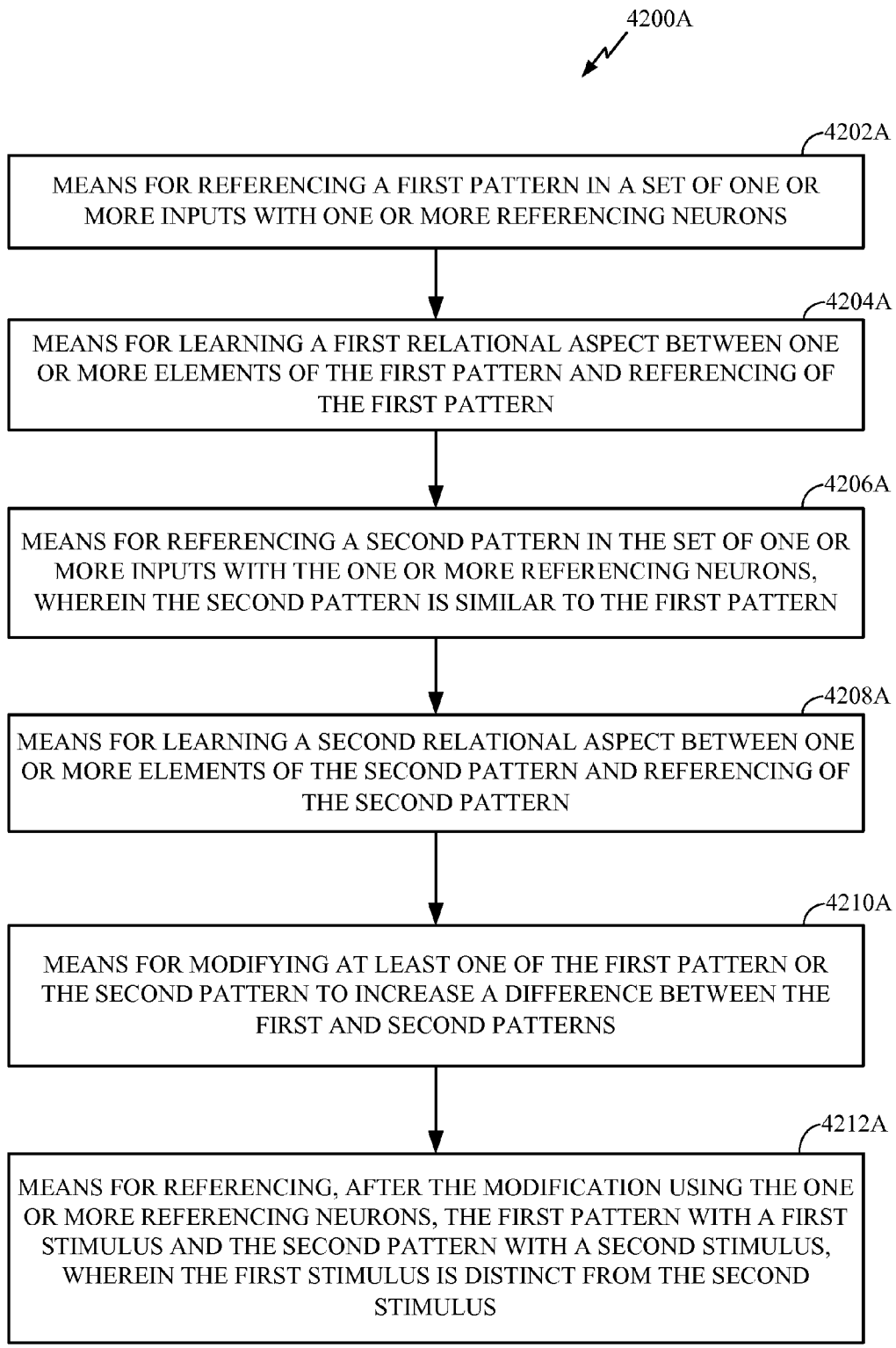
FIG. 42A illustrates example components capable of performing the operations illustrated in FIG. 42.

FIG. 42 illustrates example operations 4200 for neural pattern separation in accordance with certain aspects of the present disclosure. At 4202, a first pattern in a set of one or more inputs may be referenced with one or more referencing neurons. At 4204, a first relational aspect between one or more elements of the first pattern and referencing of the first pattern may be learned. At 4206, a second pattern in the set of one or more inputs may be referenced with the one or more referencing neurons, wherein the second pattern may be similar to the first pattern. At 4208, a second relational aspect between one or more elements of the second pattern and referencing of the second pattern may be learned. At 4210, at least one of the first pattern or the second pattern may be modified to increase a difference between the first and second patterns. At 4212, after the modification and using the one or more referencing neurons, the first pattern may be referenced with a first stimulus and the second pattern may be referenced with a second stimulus, wherein the first stimulus may be distinct from the second stimulus.

Pattern Comparison and Generalization

Certain aspects of the present disclosure support methods of pattern comparison. Pattern comparison represents the ability to compare two stored or learned patterns. A pattern may not need necessarily to be stored in one reference (pattern-learning) neuron, but it may be stored by the relational-aspect population of neurons or by multiple reference neurons or a combination thereof. For example, there may be two or more such stored patterns that are to be compared offline (i.e., without the original stimuli), or there may be one stored pattern and one that may be occurring currently due to stimulus. The present disclosure provides methods of comparing these.

Figure 43:
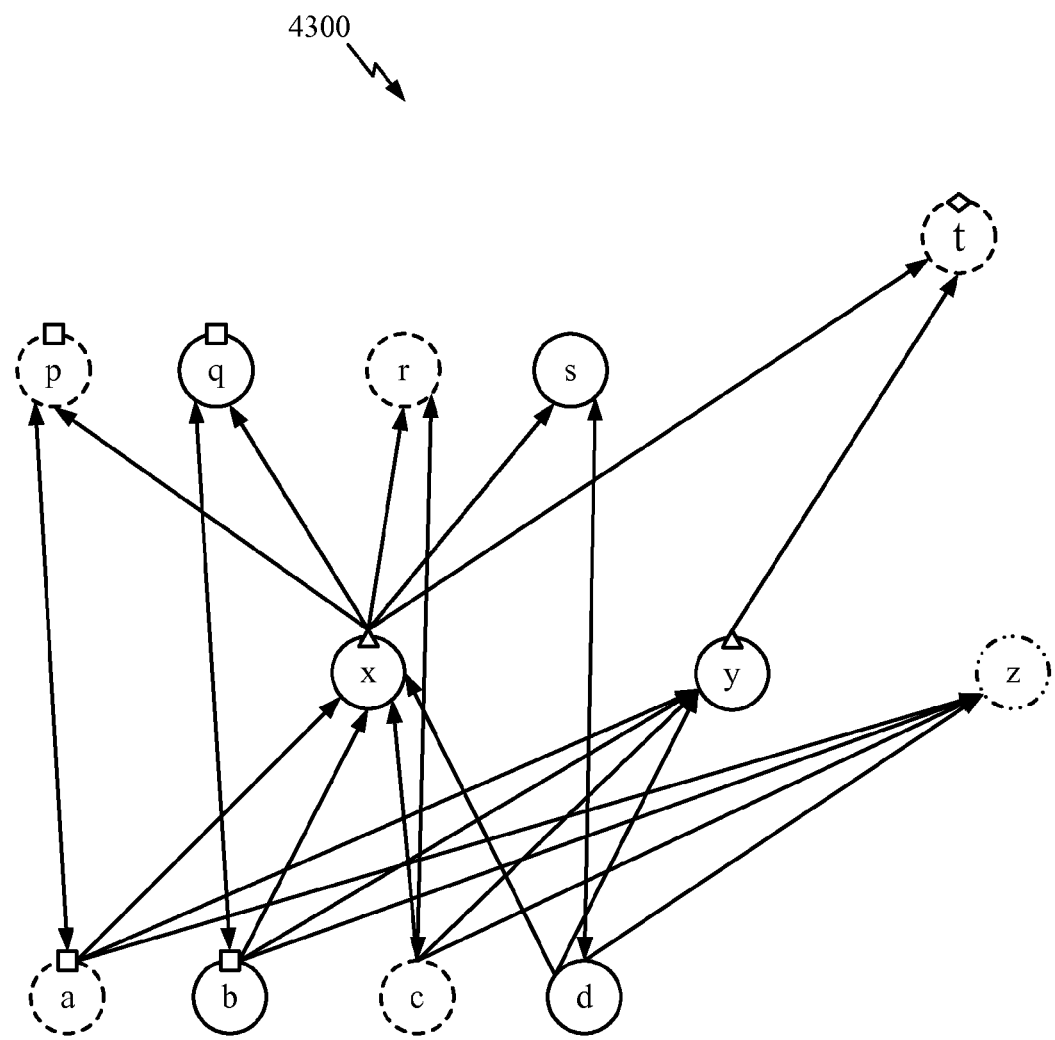
FIG. 43 illustrates an example of pattern comparison in accordance with certain aspects of the present disclosure.

FIG. 43 illustrates an example of neural connectivity diagram 4300 in accordance with certain aspects of the present disclosure. In an aspect, the neuron x may be a reference for a first pattern and neuron y may be a reference for a second pattern, while relational-aspect learning neurons p through s have learned replay of both patterns, as described above. In order to compare the two patterns, controls may be used to induce one or the other of neurons x and y to fire and invoke replay of the corresponding pattern. Further, it may be checked if that pattern in the afferents (a through d) will be matched by (i) the corresponding neuron or (ii) the neuron corresponding to the other pattern, (iii) both, or (iv) neither. Thus, stored patterns can be compared in an offline manner. Similarly, a stored pattern can be compared to a current pattern in afferents (currently occurring by stimulus to afferents).

Furthermore, pattern comparison can be facilitated by lateral inhibition. In an aspect, neurons x and y may laterally inhibit each other (not shown in FIG. 43). If a pattern similar to the patterns recognized/referenced by neurons x and y is played/replayed, and if the neuron x fires first, it will inhibit neuron y from firing. In a sense, the first/best match may prevent the other. In contrast, if no match occurs, there may be no suppression and the faintest match may be encouraged. The better the match, the less may be the delay until neuron x or y (as the case may be) fires.

If two patterns are not the same but similar, it may be desirable to generalize this issue. The generalization may occur at a higher layer or at the same layer. In the diagram 4300, the neuron t may be representative of a higher layer neuron while the neuron z may be representative of a neuron at the same layer (as the pattern learning neurons). It should be noted that in neither case (neither t nor z) are required to be connected to the relational aspect learning neurons (neurons p through s) that facilitate replay. In addition, in the case of higher-layer, the neuron t may not need to be directly connected to neurons x and y, but it may be at an even higher layer (more indirect).

A search may be performed by replaying a series of patterns. As a match for a target pattern gets closer, the reference neuron corresponding to the target pattern may become more and more likely to fire (or increase its firing rate, for example).

Generalization may occur online (during play) or offline (with replay). By playing or replaying the patterns, the generalizing neuron may learn to fire for both patterns. The key can be that firing is not made mutually exclusive, such as by inhibition. For example, in the case of neuron z, the firing of neuron x or y should not inhibit neuron z from firing if it is desired for neuron z to generalize the patterns already referenced by neurons x and y.

Figure 44:
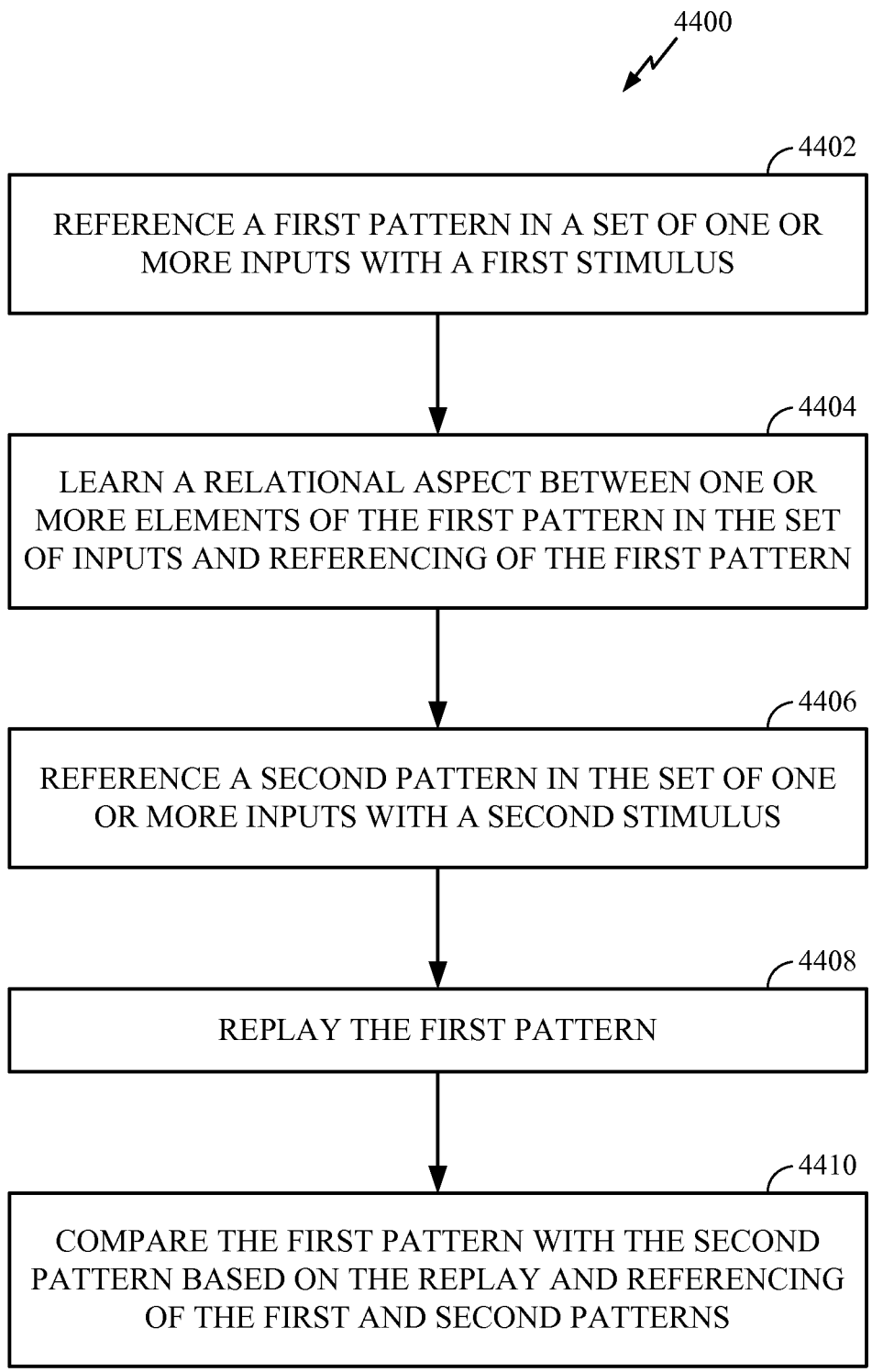
FIG. 44 illustrates example operations for neural comparison in accordance with certain aspects of the present disclosure.
Figure 44A:
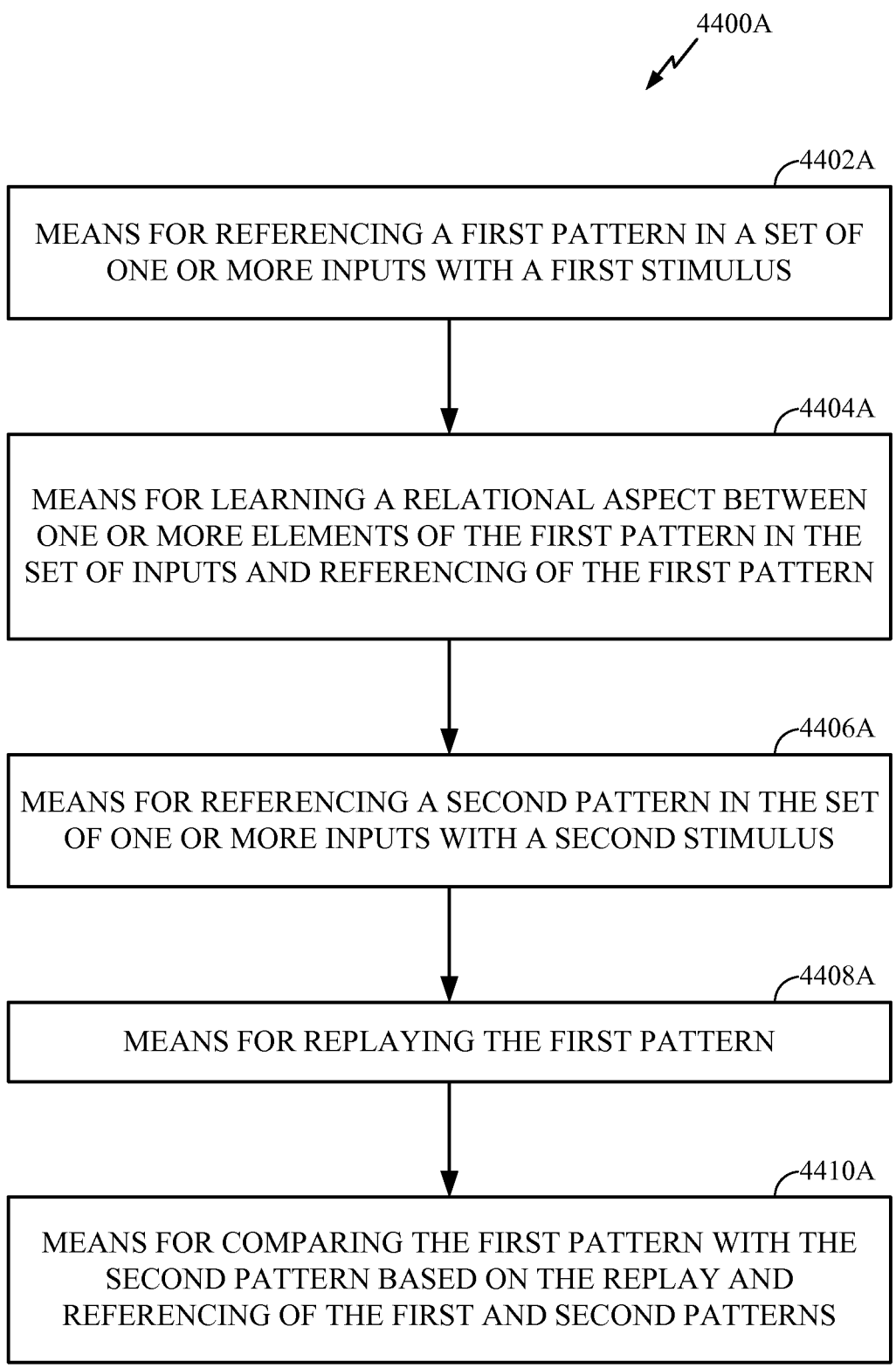
FIG. 44A illustrates example components capable of performing the operations illustrated in FIG. 44.

FIG. 44 illustrates example operations 4400 for neural comparison in accordance with certain aspects of the present disclosure. At 4402, a first pattern in a set of one or more inputs may be referenced with a first stimulus. At 4404, a relational aspect between one or more elements of the first pattern in the set of inputs and referencing of the first pattern may be learned. At 4406, a second pattern in the set of one or more inputs may be referenced with a second stimulus. At 4408, the first pattern may be replayed. At 4410, the first pattern may be compared with the second pattern based on the replay and referencing of the first and second patterns.

Figure 45:
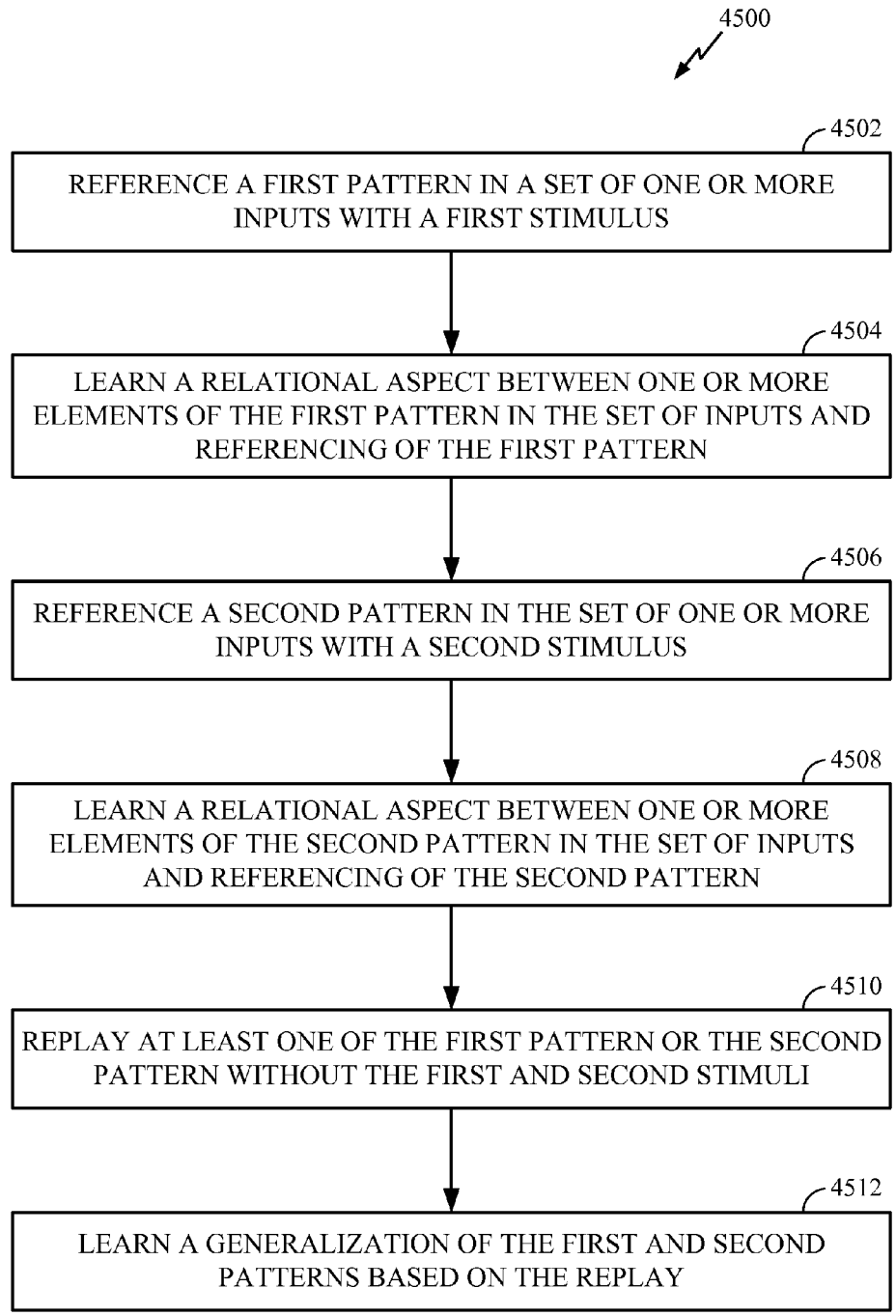
FIG. 45 illustrates example operations for neural pattern generalization in accordance with certain aspects of the present disclosure.
Figure 45A:
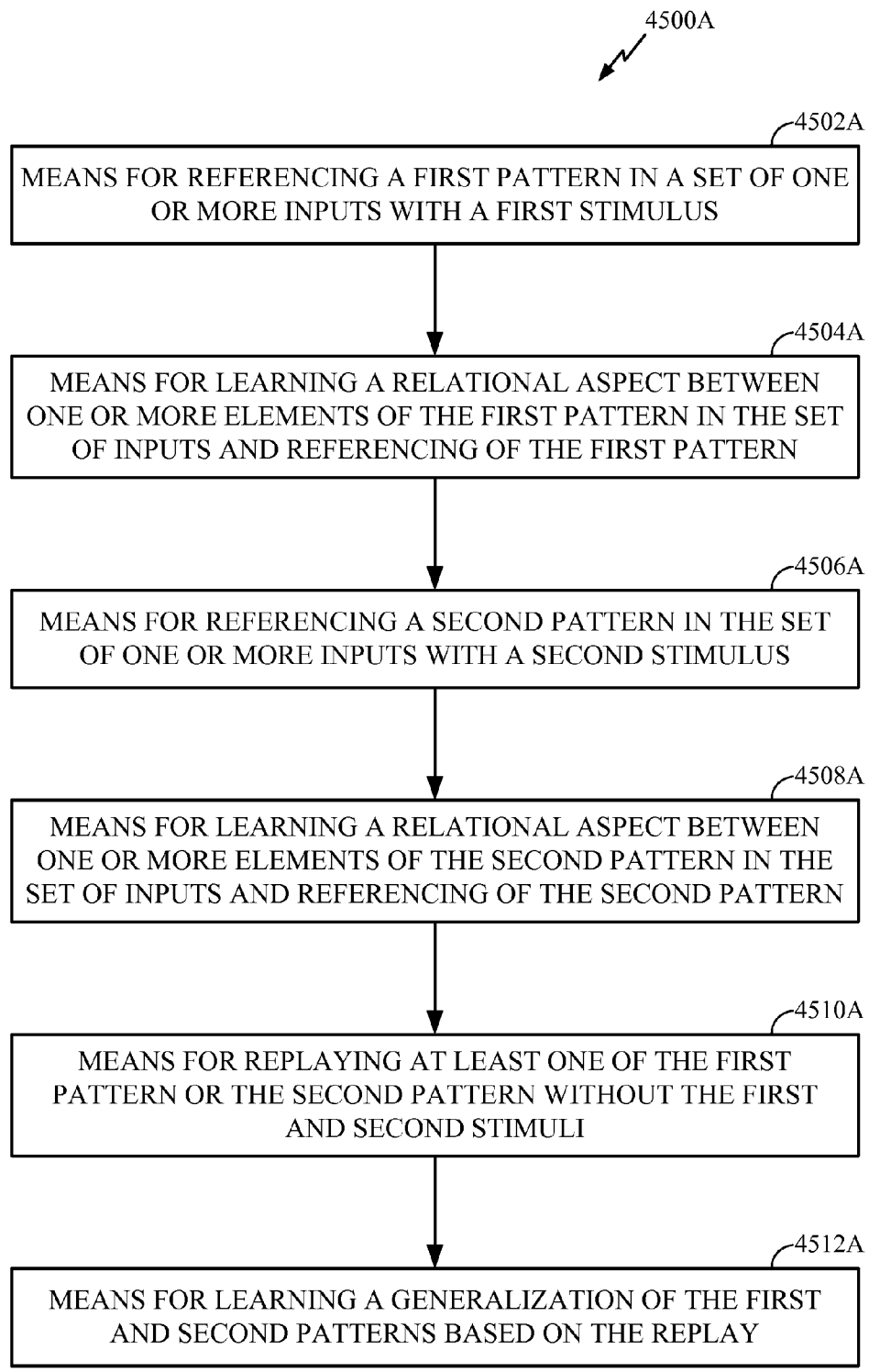
FIG. 45A illustrates example components capable of performing the operations illustrated in FIG. 45.

FIG. 45 illustrates example operations 4500 for neural pattern generalization in accordance with certain aspects of the present disclosure. At 4502, a first pattern in a set of one or more inputs may be referenced with a first stimulus. At 4504, a relational aspect between one or more elements of the first pattern in the set of inputs and referencing of the first pattern may be learned. At 4506, a second pattern in the set of one or more inputs may be referenced with a second stimulus. At 4508, a relational aspect between one or more elements of the second pattern in the set of inputs and referencing of the second pattern may be learned. At 4510, at least one of the first pattern or the second pattern may be replayed without the first and second stimuli. At 4512, a generalization of the first and second patterns may be learned based on the replay.

Horizontal (Auto) Association

Figure 46:
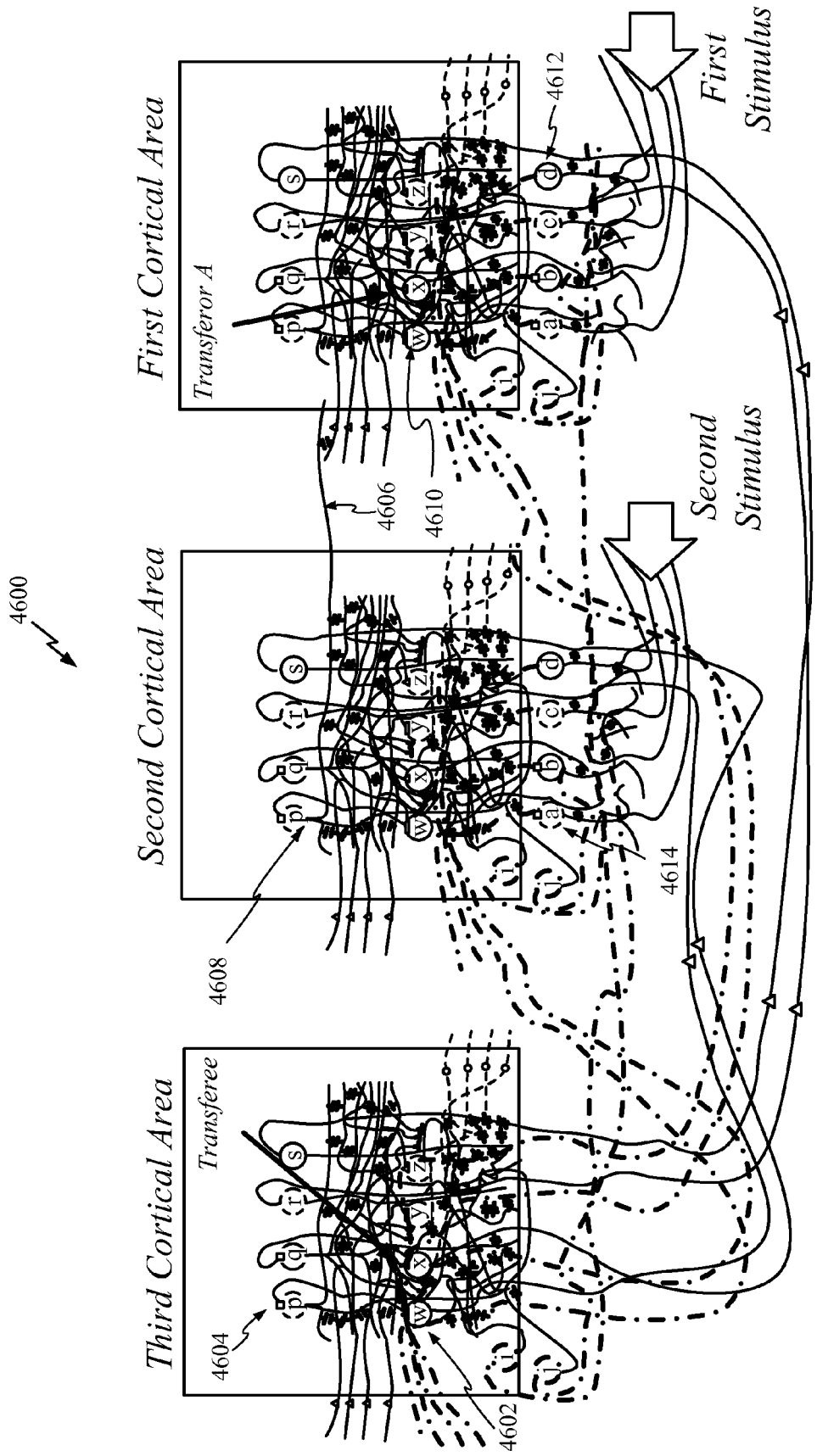
FIG. 46 illustrates an example of horizontal association of neurons in accordance with certain aspects of the present disclosure.

In an aspect, there may be a sensory stimulus, such as seeing a particular face, which may cause a particular afferent pattern. A first pattern-learning neuron (e.g., in a first cortical area: visual) may learn this pattern according to the above methods. However, there may be also a simultaneous (or even just close-in-time) stimulus in another modality, e.g., a loud sound pattern that may be learned by a second pattern-learning neuron (e.g., in a second cortical area: auditory). In an aspect, the first pattern-learning neuron may not be connected to this second (auditory) sensory modality input so it may not learn this sound as part of the pattern. This situation is illustrated in FIG. 46.

It should be noted that cortical area pattern learning neurons 4602 may not be connected to one another's afferents. According to the relational-aspect learning neurons of the present disclosure, the relational-aspect learning neurons 4604 may be paired with afferents from both modalities. Moreover, they may receive input from both the visual and auditory pattern-matching/learning neurons. Thus, the relational-aspect learning neurons may be connected across to efferents of other cortical areas, as represented in FIG. 46 by a dendritic process 4606 from second cortical area relational-aspect neurons 4608 to axons of first cortical area reference neurons 4610. Further, first cortical area afferents 4612 and second cortical area afferents 4614 may be connected to third cortical area afferents, as illustrated in FIG. 46. Although the neural connectivity diagram 4600 from FIG. 46 illustrates only one such horizontal connection and only in one direction, horizontal connections may be made by one or more (even each) of the relational-learning aspect neurons from either cortical area.

It should be noted that by triggering replay, even though the visual and auditory patterns were learned by different neurons, the replay may comprise both visual and auditory patterns. In an aspect, off-line learning or memory transfer may associate both and learn the combined pattern (e.g., a transferee pattern-learning neuron may match the combination of visual and auditory input).

Learning Speed and Referencing

Figure 47:
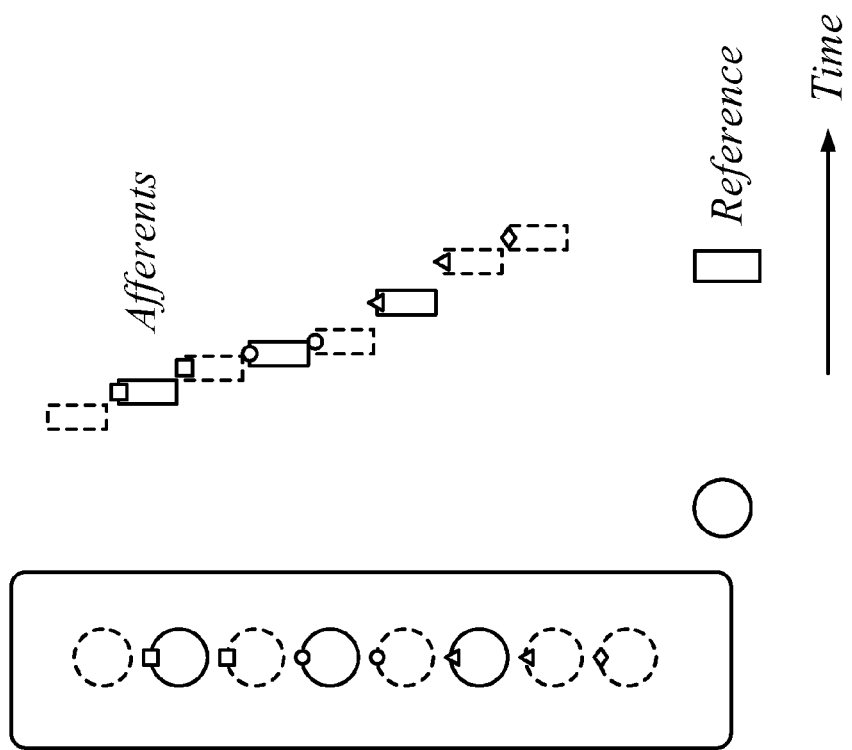
FIG. 47 illustrates an example of pattern learning with referencing in accordance with certain aspects of the present disclosure.
Figure 47:
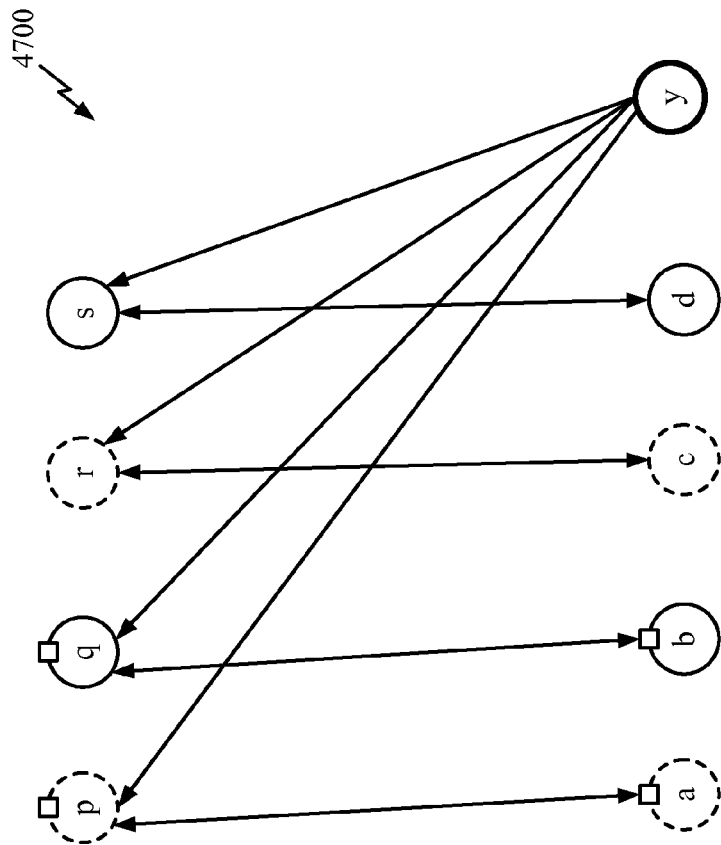

The advantage of being able to improve the learning of a pattern after a stimulus is no longer available was discussed above in relation to learning refinement. However, methods of the present disclosure may have even greater potential. In the general discussions above, a pattern learning (or at least matching) neuron was used in the second layer of the cortical fabric. Technically, this pattern learning neuron may be really a reference for relational aspect learning. What is happening can be that the relational aspect learning is using the output of the pattern learning neuron to relate the individual elements of the pattern from each afferent. Whether that reference is a pattern learning or matching neuron is not important for that purpose. In other words, the referencing neuron could be a neuron other than a pattern learning (or matching) neuron. In an aspect, this neuron may not even be connected to the afferents. Referencing is illustrated by the neuron y of a neural connectivity diagram 4700 in FIG. 47.

In one aspect of the present disclosure, a pattern learning neuron may be used as a reference, while stimulus may be available as generally discussed except to only learn for as long as is required to obtain a consistent firing of the pattern-learning neuron (and afferents, if there is a strong feedback) with the pattern but not necessarily long enough to develop learning to a point the neuron can distinguish that pattern from others (or just from other similar patterns). In other words, learning during stimulus may be very fast since there may be no need to really refine the pattern matching or distinguishing capability. This may be done offline (without the stimulus) using the same neuron (refining the learning) or transfer to another neuron with or without association to other concepts/inputs.

In another aspect, one of the afferents may be used as the reference. This may work well when that afferent is consistently associated with the particular pattern (and, for example, does not fire when other patterns are present). Indeed, if a particular afferent is already a good indicator of a pattern, there may be less motivation to learn the pattern. But, this may not necessarily be so. For example, a particular hat might be a particularly unique or distinguishing feature of a person. However, that doesn't obviate the importance of recognizing the person's face. If an afferent is used as the reference, there may be no need to connect other afferents to that afferent. The neuron y in FIG. 47 might represent such situation. It should be noted that a relational-aspect learning neuron could be also used as the reference.

In yet another aspect, it may be possible to use a separate neuron other than afferents or pattern matching/learning neurons such as a neuron from another part of a cortical array or neural network or a neuron that is periodically excited using oscillation or otherwise controlled to occur with the occurrence of a stimulus, such as an attention marker. It can be supposed, for example, that attention can be fixed on a face. A visual system may be receiving afferents with a pattern corresponding to the face. An attentional circuit may provide a reference to the visual system coincident with the attention on this face. The reference may be then used by the relational aspect learning neurons to store information to be able to replay once the stimulus (face) is gone from view. In order to replay, the attentional circuit may trigger the reference that, as described above, triggers the replay via the original afferents. This may be then used for learning of the face pattern, learning refinement, transfer of the learning or memory or information, or association.

Figure 48:
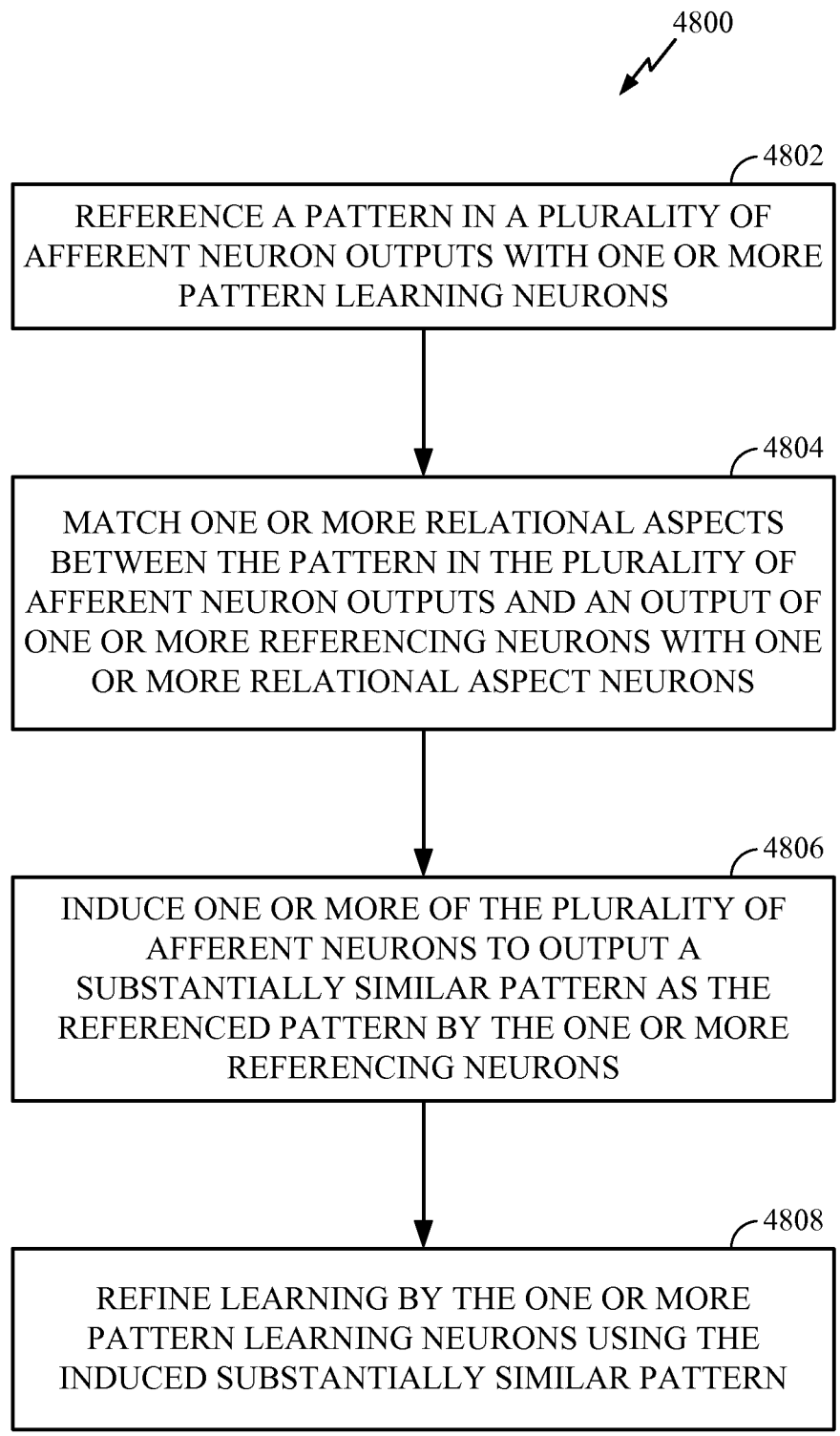
FIG. 48 illustrates example operations for neural component learning refinement and fast learning in accordance with certain aspects of the present disclosure.
Figure 48A:
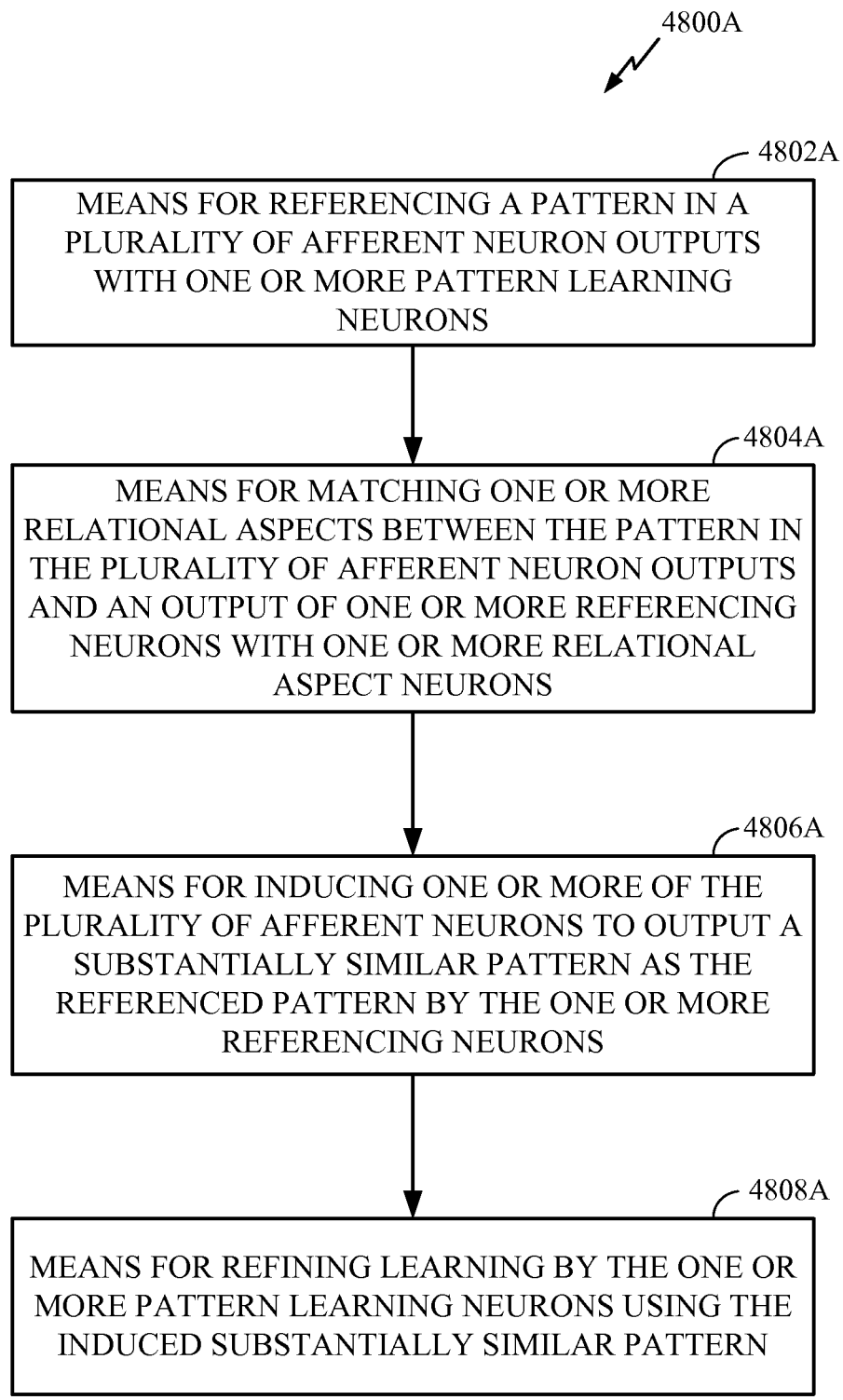
FIG. 48A illustrates example components capable of performing the operations illustrated in FIG. 48.

FIG. 48 illustrates example operations 4800 for neural component learning refinement and fast learning in accordance with certain aspects of the present disclosure. At 4802, a pattern in a plurality of afferent neuron outputs may be referenced with one or more pattern learning neurons. At 4804, one or more relational aspects between the pattern in the plurality of afferent neuron outputs and an output of one or more referencing neurons may be matched with one or more relational aspect neurons. At 4806, one or more of the plurality of afferent neurons may be induced to output a substantially similar pattern as the referenced pattern by the one or more referencing neurons. At 4808, learning by the one or more pattern learning neurons may be refined using the induced substantially similar pattern.

Procedural Flow, Repeating Replay and Directing Flow

Figure 49:
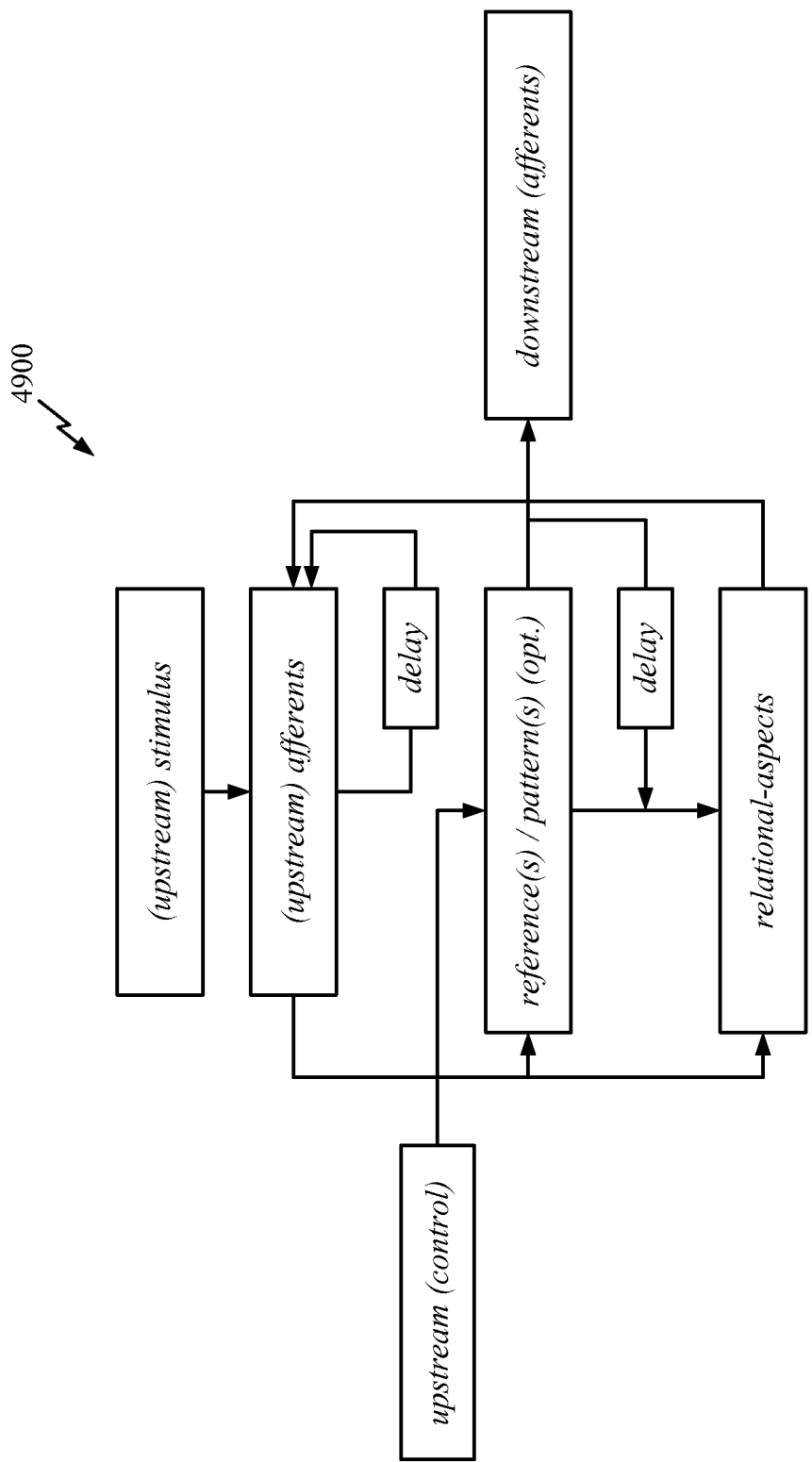
FIG. 49 illustrates an example of procedural flow, repeating replay and directing flow in accordance with certain aspects of the present disclosure.

In an aspect of the present disclosure, inhibition can be used to direct the course of a procedure. The term procedure can be used to refer to a process such as relational-aspect learning with an original stimulus, replay, memory transfer, or learning refinement, and so on. A procedure may be triggered by a particular control or input (e.g., stimulus) or may merely be one state in an oscillation of the network. Regardless, once triggered, the process may be controlled either by the internal operations (state transition based on prior activity of the network) or by external controls (outside of the local array or network area) or a combination thereof, as illustrated by a procedural flow 4900 in FIG. 49.

An example of the internal control can be an oscillation between afferent firing, pattern neuron firing, relational-aspect neuron firing, afferent firing again, and so on in a loop driven by the prior firing (afferent firing may drive pattern neuron firing, and so on). An example of external control can be inducing the pattern neuron to fire due to external control signals (other neurons outside the array). A combination may also be used so that initial activity may be triggered by a control, but the subsequent oscillation that occurs may be self-caused. Variations on this may comprise self-triggering but controlled oscillation. Regardless, in addition to excitation, inhibition may be used to effect procedural flow (determine which state occurs next). It should be noted that, in the above description, specific inhibition (pre-synaptic) was used to prevent relational-aspect neurons from triggering replay during exposure to the original stimulus (driven either directly by the stimulus or by afferent firing and affecting the connections from the relational-aspect learning neurons back to the afferents).

However, this general idea may be applied in a number of alternate ways and to other procedures. First, the memory transfer process can be considered as an example of the latter. During replay for memory transfer, the afferents may playback the pattern. The pattern may be matched by a pattern matching neuron (or reference) that may be connected to relational-aspect learning neurons. Thus, the replay may invoke replay again. Due to the specific inhibition mentioned above, repeated replay may be blocked. This block may be removed if repeated replay is desired, or another control may be added to invoke repetition (e.g., periodic stimulation of the reference or pattern neuron).

However, repeat may not be desired and further, even the re-firing of the relational-aspect neurons may be undesired. A reason for this is that learning refinement (of the relational-aspects) may not be desired (e.g., during memory transfer). To block this, a prior event (firing) in the procedure may be used as a driver for inhibiting the undesired event. Specifically, an inhibitory interneuron may be connected to receive input from the reference or pattern matching neuron and to output on the excitatory connection(s) between that same neuron and (to) relational-aspect neuron(s). By assigning a delay commensurate with the time between steps in the procedural flow, the interneuron may block the cause of the undesired events at the right time. Thus, internal connectivity may be designed to ensure the desired procedural flow for any particular procedure.

Hierarchical and Multi-Layer Replay and Multi-Part Pattern Completion

According to certain aspects of the present disclosure, the concept of hierarchical and multi-layer replay can represent that of applying the concept of the replay architecture described above at multiple layers of a network and potentially replaying at one or more layers, hierarchically. What is meant by multiple layers may comprise neurons at varying levels of generalization or abstraction in a network. What is meant by hierarchical replay is that inducing replay at a particular pattern learning or reference layer (neurons) may then in turn induce replay of the learned/referenced pattern(s) in the afferents of those pattern learning or reference layer neurons. Thus, replay may be induced from a top-down order in a layered network.

Figure 50:
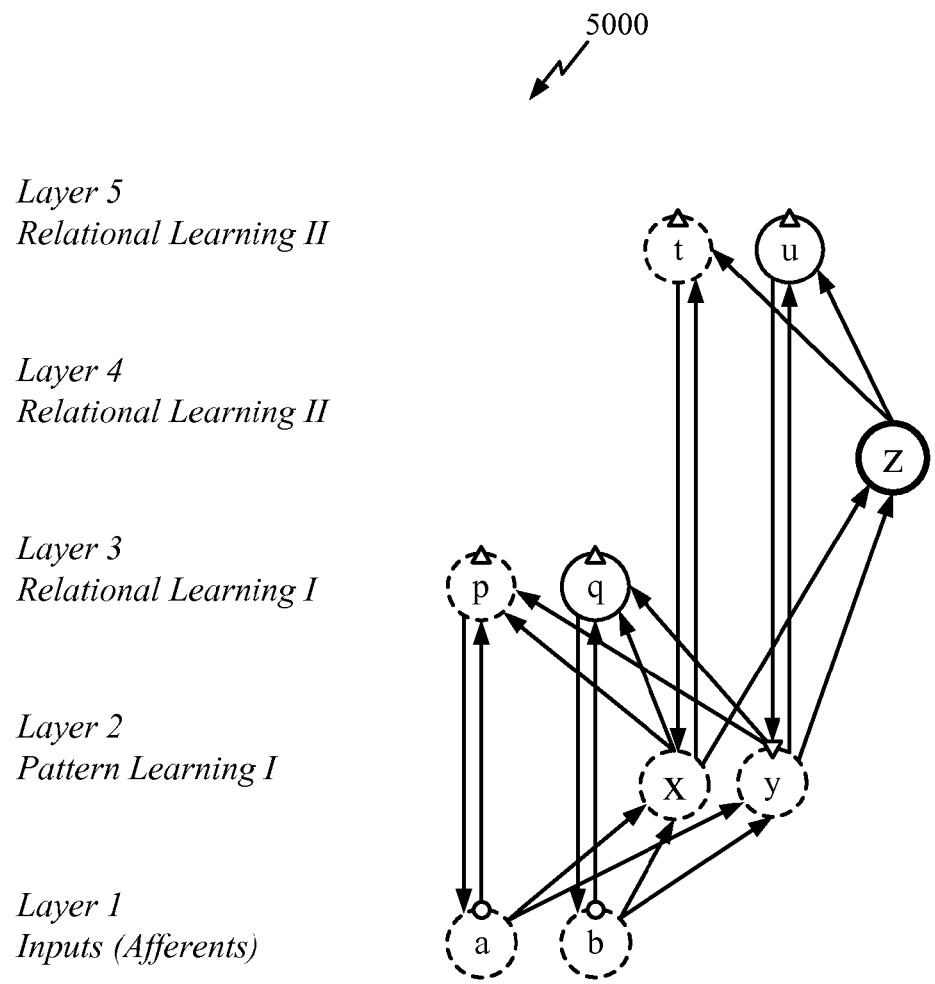
FIG. 50 illustrates an example of hierarchical pattern replay in accordance with certain aspects of the present disclosure.

The hierarchical replay is described by way of example 5000 illustrated in FIG. 50. Neurons x, y, and z in FIG. 50 may be pattern learning neurons (or references). However, while neurons x and y may learn or reference patterns in afferents a and b, the neuron z may learn or references a pattern in neurons x and y. Similarly, neurons p and q may be relational aspect neurons for the lower part of the network, while neurons t and u may be relational aspect neurons for the upper part. It should be noted that replay of patterns at the lower layer may be invoked by replay at the upper layer. In an aspect, replay at the upper layer may be invoked by the firing of neuron z. For example, the firing sequence may proceed as follows: z→t, u→x,y→p, q→a,b, and so on.

Figure 51:
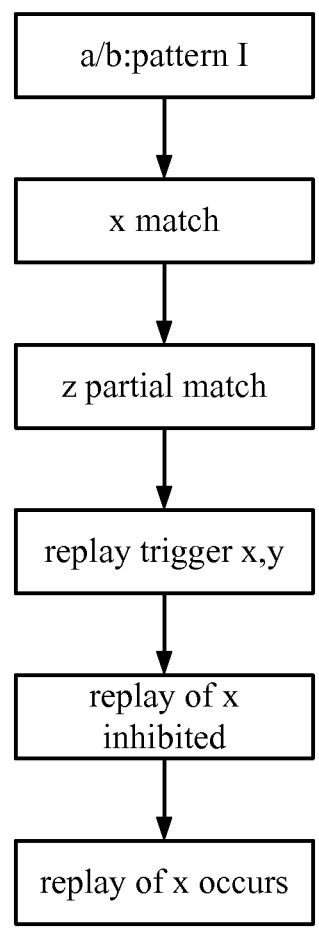
FIG. 51 illustrates an example block diagram of pattern completion in accordance with certain aspects of the present disclosure.

With strategic inhibitory connectivity or excitatory boost, it may be possible to achieve further processing goals such as larger pattern completion. For pattern completion, the pattern matched by neuron x may occur due to external stimulus, and it may be desired that the pattern matched by neuron y to be replayed as a result. Since the pattern matched by neuron x occurs, neuron x may fire. By boosting the sensitivity or lowering the threshold of neuron z, this neuron may be induced to fire as a result. Now, this may induce hierarchical replay described above, with some important exceptions. First, the original pattern of neuron x has already occurred. This may be used to inhibit replay of pattern referenced by neuron x by inhibiting neuron x from further firing (at least in the short-term). Second, since the pattern of neuron y did not occur yet, the neuron y may not be inhibited from firing. Thus, neurons p and q may fire to invoke only replay of the pattern matched/referenced by neuron y. The example process can be summarized in an example flow chart 5100 in FIG. 51.

The hierarchical replay may provide a means for additional further processing, including a process that may be called "associative completion". For example, a machine may be learning a sequence of patterns (e.g., a birdsong or speech) abstractly denoted by the ordered list of parts: A, B, C. In an aspect, the part B may follow part A, and part C may follow part B. Without loss of generality, the focus may be on one step in the association, for example on step A→B. In an aspect, the network illustrated in FIG. 50 may learn the patterns A and B at neurons x and y. Moreover, the order of A→B may be learned by neuron z since it may learn the temporal aspects of the firing of neurons x and y (which reference A and B). If the machine begins by replaying pattern A alone, this may be used to trigger replay of the associated B exactly as described above for pattern completion (except that the first part was also a replay). By adding elements to the network, replay of C may be invoked based on the replay of B, and so on. In effect, replay of a sequence may be invoked step by step.

Now, an observant reader might ask: "won't B then cause replay of A instead of C or in addition to C". That can be indeed possible unless modifications are made to avoid this, i.e., to maintain the forward flow of the sequence. One way to do this may be to inhibit the re-firing of each layer 2 neuron for a period after it has already fired. This period may correspond to duration between parts that are two-parts away from one another (i.e., having one part in-between).

Now, the observant reader might ask: "won't that prevent replay of a sequence such as A→A→B or A→B→A→C". The answer is not necessarily. If there is only one neuron to match part A, then this may be a problem. However, if multiple layer 2 neurons are allowed to learn pattern A, with lateral inhibition so that different neurons learn pattern A at different points in the sequence, then this problem may be overcome.

Finally, control inputs may also be provided to limit replay to certain levels of a network. For example, replay may be controlled to be restricted to upper layers (higher-layers of conceptual abstraction or pattern recognition) by inhibiting firing of lower layer reference neurons.

Figure 52:
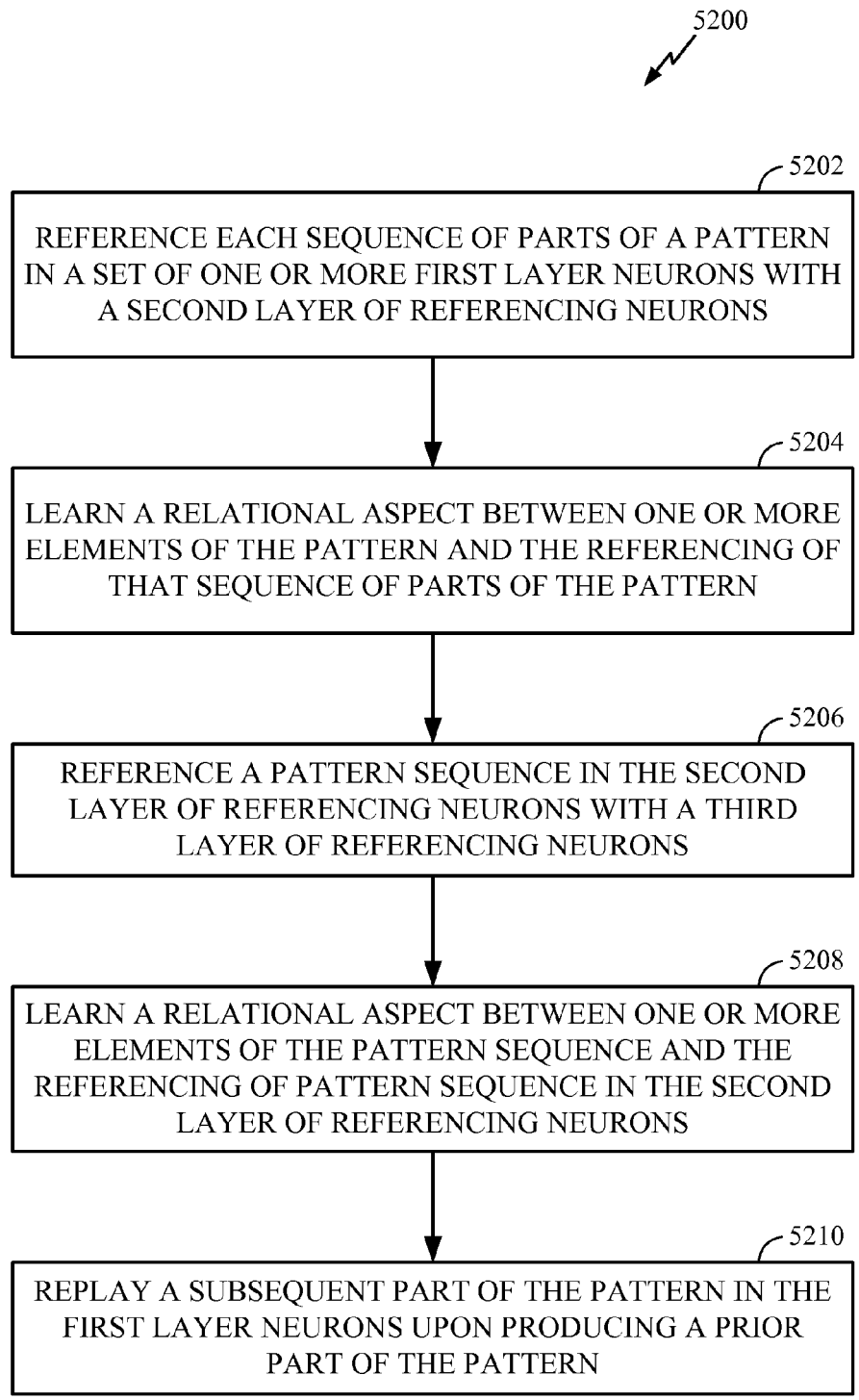
FIG. 52 illustrates example operations for neural pattern sequence completion in accordance with certain aspects of the present disclosure.
Figure 52A:
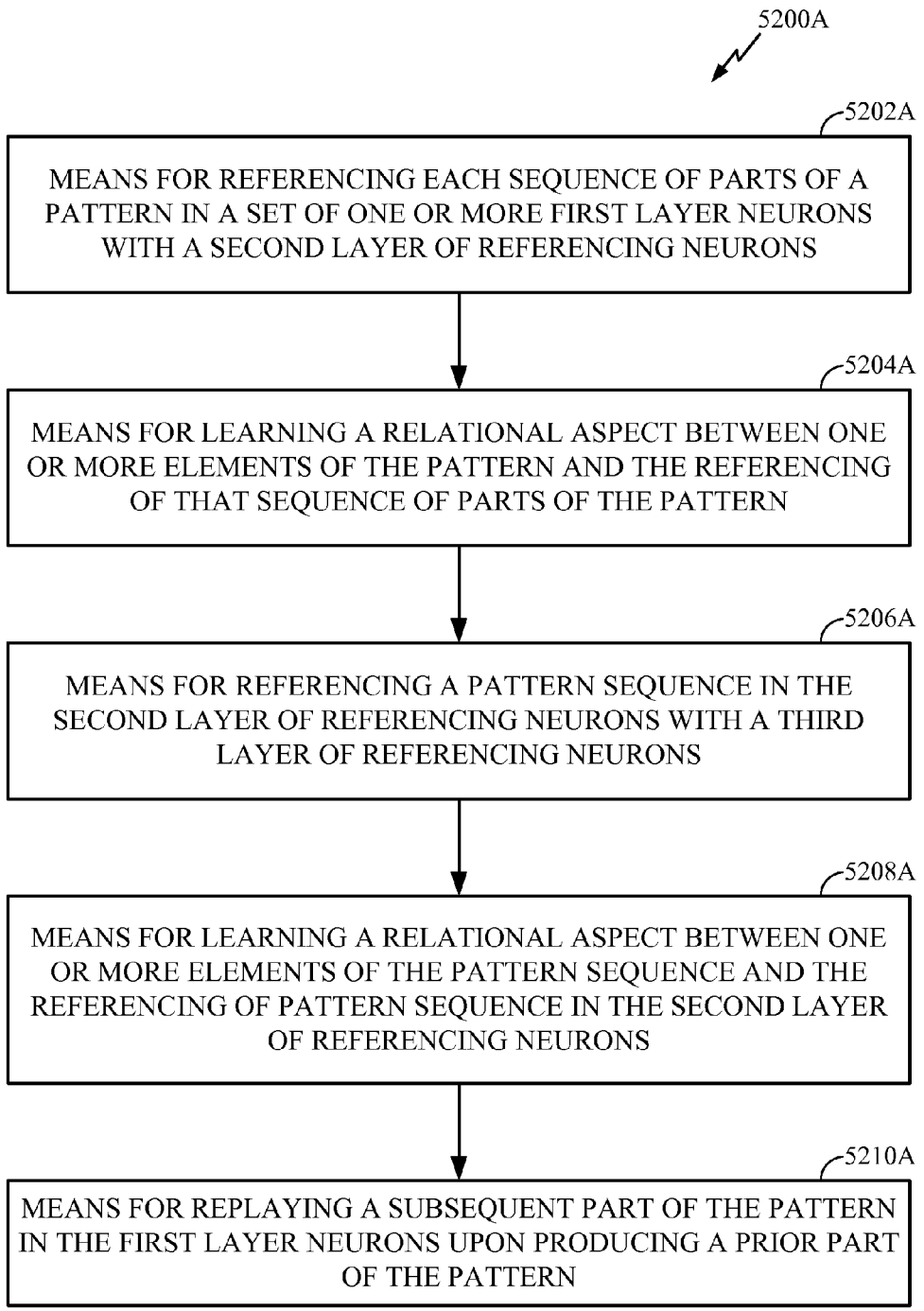
FIG. 52A illustrates example components capable of performing the operations illustrated in FIG. 52.

FIG. 52 illustrates example operations 5200 for neural pattern sequence completion in accordance with certain aspects of the present disclosure. At 5202, each sequence of parts of a pattern in a set of one or more first layer neurons may be referenced with a second layer of referencing neurons. At 5204, a relational aspect between one or more elements of the pattern and the referencing of that sequence of parts of the pattern may be learned. At 5206, a pattern sequence in the second layer of referencing neurons may be referenced with a third layer of referencing neurons. At 5208, a relational aspect between one or more elements of the pattern sequence and the referencing of pattern sequence in the second layer of referencing neurons may be learned. At 5210, a subsequent part of the pattern in the first layer neurons may be replayed upon producing a prior part of the pattern.

Figure 53:
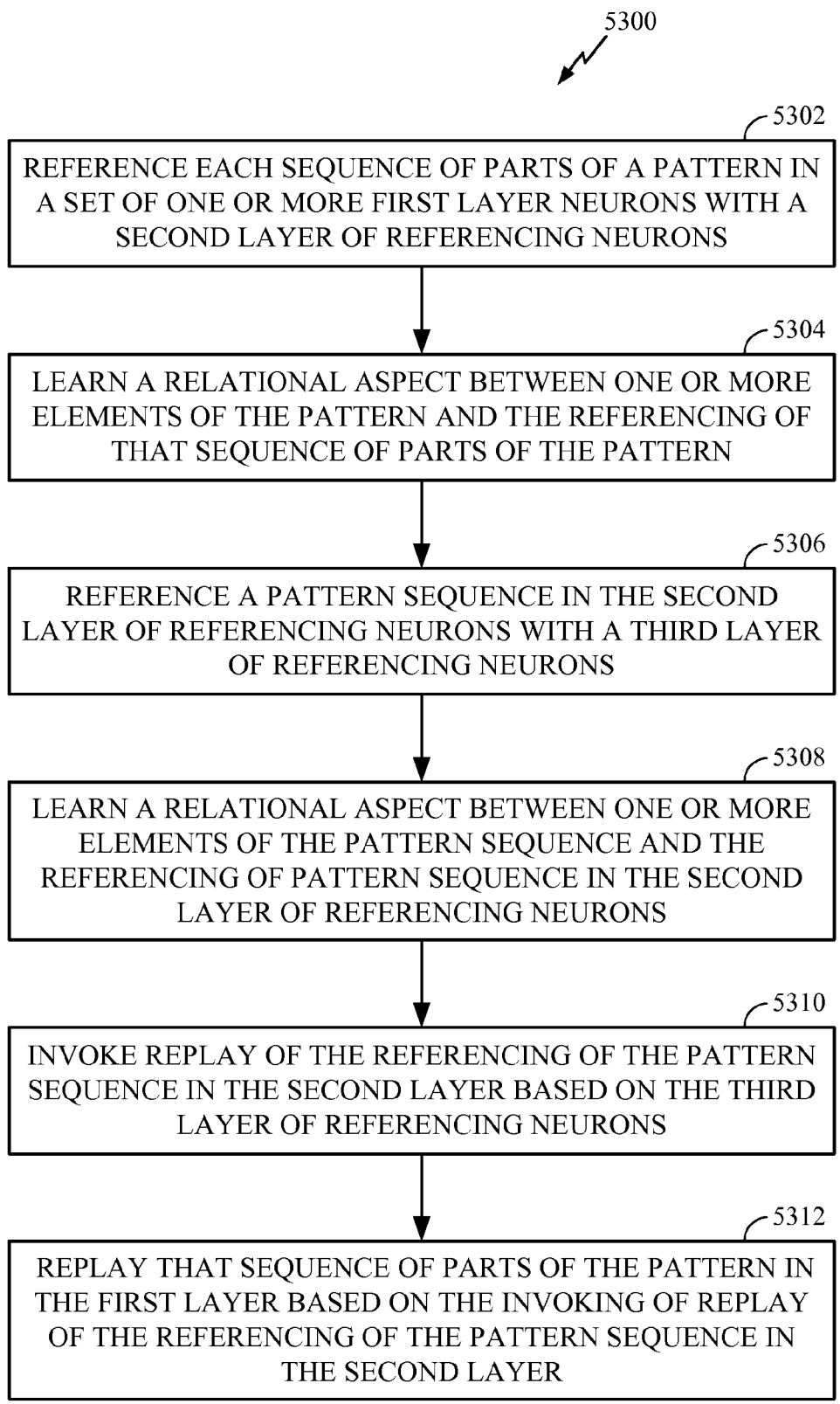
FIG. 53 illustrates example operations for neural pattern hierarchical replay in accordance with certain aspects of the present disclosure.
Figure 53A:
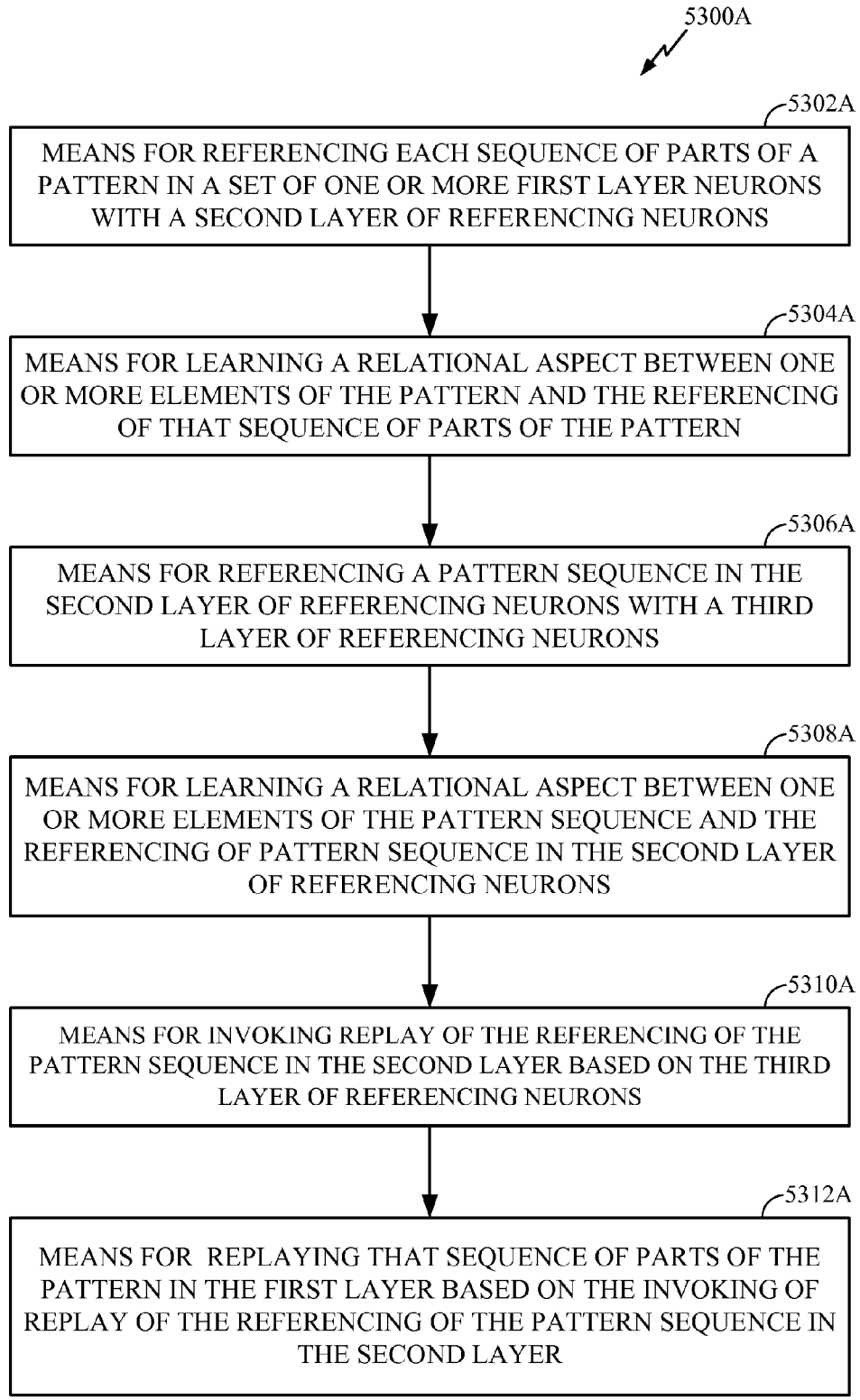
FIG. 53A illustrates example components capable of performing the operations illustrated in FIG. 53.

FIG. 53 illustrates example operations 5300 for neural pattern hierarchical replay in accordance with certain aspects of the present disclosure. At 5302, each sequence of parts of a pattern in a set of one or more first layer neurons may be referenced with a second layer of referencing neurons. At 5304, a relational aspect between one or more elements of each pattern and the referencing of that sequence of parts of the pattern may be learned. At 5306, a pattern sequence in the second layer of referencing neurons may be referenced with a third layer of referencing neurons. At 5308, a relational aspect between one or more elements of the pattern sequence and the referencing of the pattern sequence in the second layer of referencing neurons may be learned. At 5310, replay of the referencing of the pattern sequence in the second layer may be invoked based on the third layer of referencing neurons. At 5312, that sequence of parts of the pattern in the first layer may be replayed based on the invoking of replay of the referencing of the pattern sequence in the second layer.

Figure 54:
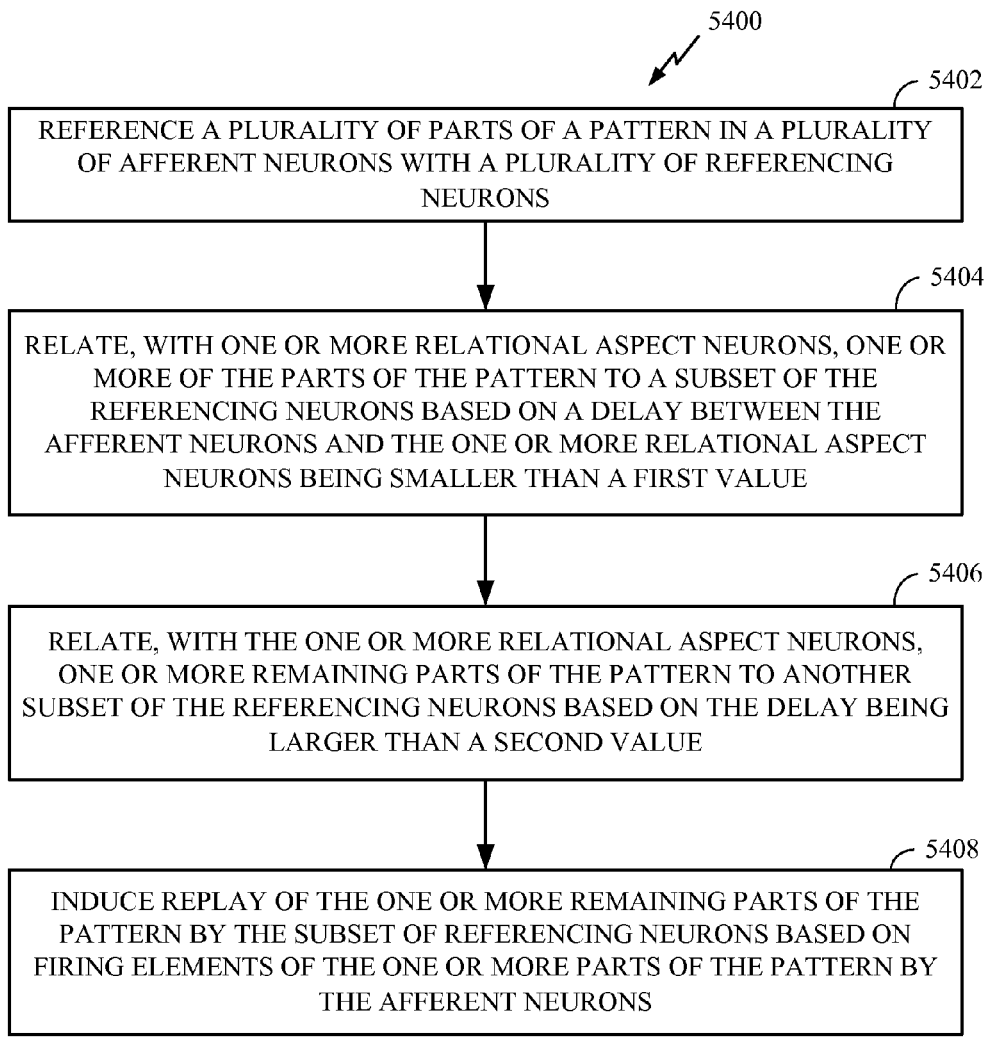
FIG. 54 illustrates example operations for neural pattern sequence completion that may be performed without a hierarchy in accordance with certain aspects of the present disclosure.
Figure 54A:
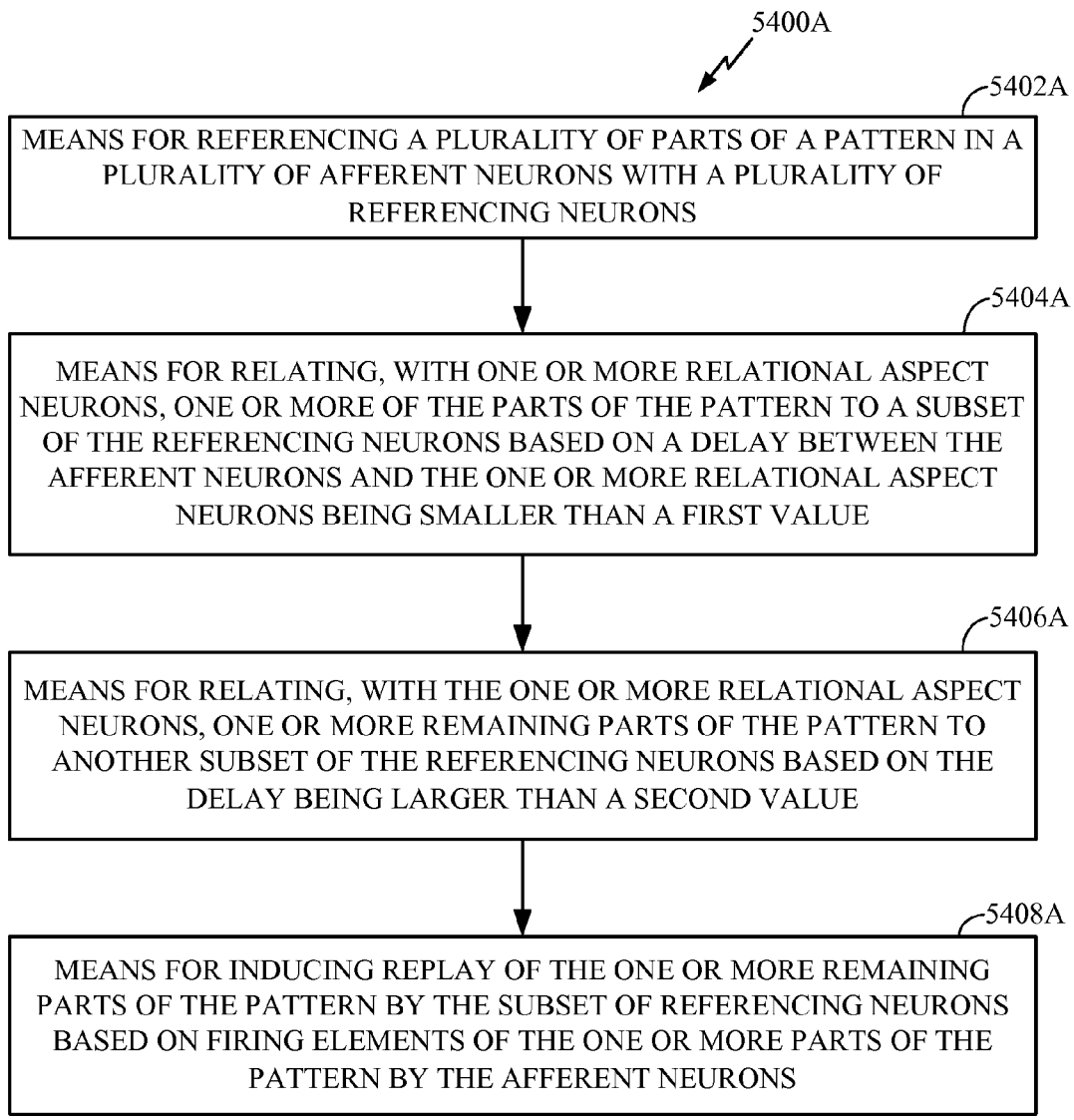
FIG. 54A illustrates example components capable of performing the operations illustrated in FIG. 54.

FIG. 54 illustrates example operations 5400 for neural pattern sequence completion that may be performed without a hierarchy in accordance with certain aspects of the present disclosure. At 5402, a plurality of parts of a pattern in a plurality of afferent neurons may be referenced with a plurality of referencing neurons. At 5404, one or more of the parts of the pattern may be related, with one or more relational aspect neurons, to a subset of the referencing neurons based on a delay between the afferent neurons and the one or more relational aspect neurons being smaller than a first value. At 5406, one or more remaining parts of the pattern may be related, with the one or more relational aspect neurons, to the subset of referencing neurons based on the delay being larger than a second value. At 5408, replay of the one or more remaining parts of the pattern may be induced by the subset of referencing neurons based on firing elements of the one or more parts of the pattern by the afferent neurons.

Figure 55:
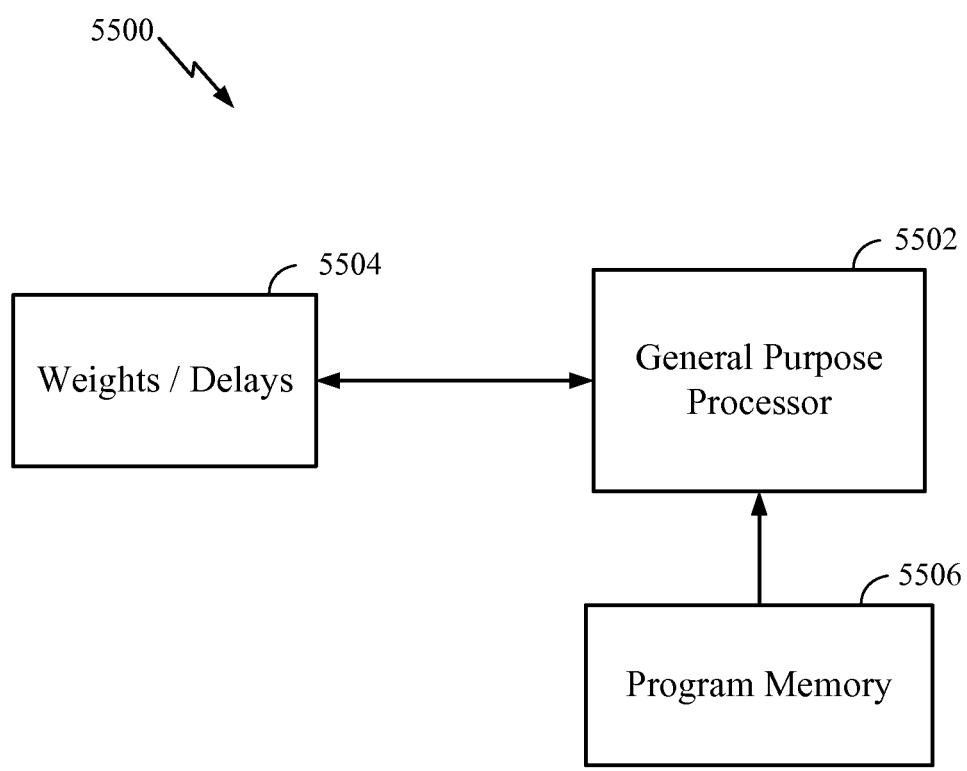
FIG. 55 illustrates an example software implementation of neural component replay, learning refinement, memory transfer, associative learning, pattern comparison, pattern completion, pattern separation, pattern generalization, pattern sequence completion with a hierarchy, and pattern hierarchical replay using a general-purpose processor in accordance with certain aspects of the present disclosure.

FIG. 55 illustrates an example software implementation 5500 of the aforementioned methods for neural component replay, learning refinement, memory transfer, associative learning, pattern comparison, pattern completion, pattern separation, pattern generalization, pattern sequence completion with a hierarchy, and pattern hierarchical replay using a general-purpose processor 5502 in accordance with certain aspects of the present disclosure. Weights and delays associated with each connection (synapse) of a computational network (neural network) may be stored in a memory block 5504, while instructions related to the aforementioned methods being executed at the general-purpose processor 5502 may be loaded from a program memory 5506.

In one aspect of the present disclosure, the instructions loaded into the general-purpose processor 5502 may comprise code for referencing a pattern in a plurality of afferent neuron outputs with one or more pattern learning neurons, code for matching one or more relational aspects between the pattern in the plurality of afferent neuron outputs and an output of one or more referencing neurons with one or more relational aspect neurons, code for inducing one or more of the plurality of afferent neurons to output a substantially similar pattern as the referenced pattern by the one or more referencing neurons, code for refining learning by the one or more pattern learning neurons using the induced substantially similar pattern, code for transferring the pattern to one or more transferee neurons by inducing the plurality of afferent neurons to output a first substantially similar pattern as the referenced pattern by the one or more referencing neurons, and code for learning one or more relational aspects between the pattern in the plurality of afferent neuron outputs and an output of the one or more referencing neurons with one or more relational aspect neurons using structural plasticity. In another aspect, the instructions loaded into the general-purpose processor 5502 may comprise code for learning a subset of a pattern in a set of inputs with a stimulus, code for learning a relational aspect between elements of the pattern and the subset of the pattern, code for replaying the pattern in the set of inputs using the learned relational aspect without the stimulus, and code for refining learning of the pattern in the set of inputs without the stimulus.

In yet another aspect, the instructions loaded into the general-purpose processor 5502 may comprise code for referencing a first pattern in a set of one or more inputs with a first stimulus, code for learning a relational aspect between one or more elements of the first pattern in the set of inputs and referencing of the first pattern, code for referencing a second pattern in the set of one or more inputs with a second stimulus, code for learning a relational aspect between one or more elements of the second pattern in the set of inputs and referencing of the second pattern, code for replaying the first and second patterns in the set of inputs using the learned relational aspects without the first and second stimuli, code for associating the first and second patterns based on the replay, code for comparing the first pattern with the second pattern, code for replaying at least one element of the first pattern missing or being degraded from the second pattern in response to exposure to at least one of the second pattern or the second stimulus, code for modifying at least one of the first pattern or the second pattern to increase a difference between the first and second patterns, code for referencing, after the modification using the one or more referencing neurons, the first pattern with a first stimulus and the second pattern with a second stimulus, wherein the first stimulus may be distinct from the second stimulus, and code for learning a generalization of the first and second patterns.

In yet another aspect, the instructions loaded into the general-purpose processor 5502 may comprise code for referencing each sequence of parts of a pattern in a set of one or more first layer neurons with a second layer of referencing neurons, code for learning a relational aspect between one or more elements of each pattern and the referencing of that sequence of parts of the pattern, code for referencing a pattern sequence in the second layer of referencing neurons with a third layer of referencing neurons, code for learning a relational aspect between one or more elements of the pattern sequence and the referencing of the pattern sequence in the second layer of referencing neurons, code for invoking replay of the referencing of the pattern sequence in the second layer based on the third layer of referencing neurons, code for replaying that sequence of parts of the pattern in the first layer based on the invoking of replay of the referencing of the pattern sequence in the second layer, and code for replaying a subsequent part of the pattern in the first layer neurons upon producing a prior part of the pattern.

In yet another aspect, the instructions loaded into the general-purpose processor 5502 may comprise code for referencing a plurality of parts of a pattern in a plurality of afferent neurons with a plurality of referencing neurons, code for relating, with one or more relational aspect neurons, one or more of the parts of the pattern to a subset of the referencing neurons based on a delay between the afferent neurons and the one or more relational aspect neurons being smaller than a first value, code for relating, with the one or more relational aspect neurons, one or more remaining parts of the pattern to the subset of referencing neurons based on the delay being larger than a second value, and code for inducing replay of the one or more remaining parts of the pattern by the subset of referencing neurons based on firing elements of the one or more parts of the pattern by the afferent neurons.

Figure 56:
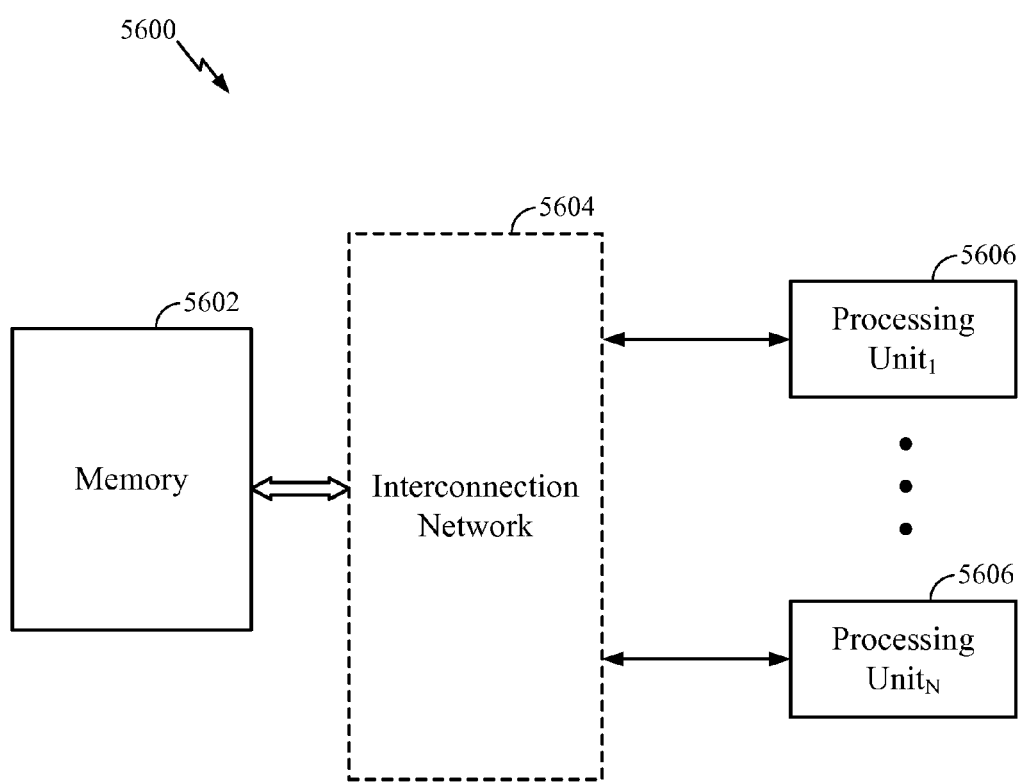
FIG. 56 illustrates an example implementation of neural component replay, learning refinement, memory transfer, associative learning, pattern comparison, pattern completion, pattern separation, pattern generalization, pattern sequence completion with a hierarchy, and pattern hierarchical replay where a memory may be interfaced with individual distributed processing units in accordance with certain aspects of the present disclosure.

FIG. 56 illustrates an example implementation 5600 of the aforementioned methods for neural component replay, learning refinement, memory transfer, associative learning, pattern comparison, pattern completion, pattern separation, pattern generalization, pattern sequence completion with a hierarchy, and pattern hierarchical replay, where a memory 5602 can be interfaced via an interconnection network 5604 with individual (distributed) processing units (neural processors) 5606 of a computational network (neural network) in accordance with certain aspects of the present disclosure. One or more weights and delays associated with one or more connections (synapses) of the computational network (neural network) may be loaded from the memory 5602 via connection(s) of the interconnection network 5604 into each processing unit (neural processor) 5606.

In one aspect of the present disclosure, the processing unit 5606 may be configured to reference a pattern in a plurality of afferent neuron outputs with one or more pattern learning neurons, match one or more relational aspects between the pattern in the plurality of afferent neuron outputs and an output of one or more referencing neurons with one or more relational aspect neurons, induce one or more of the plurality of afferent neurons to output a substantially similar pattern as the referenced pattern by the one or more referencing neurons, refine learning by the one or more pattern learning neurons using the induced substantially similar pattern, transfer the pattern to one or more transferee neurons by inducing the plurality of afferent neurons to output a first substantially similar pattern as the referenced pattern by the one or more referencing neurons, and learn one or more relational aspects between the pattern in the plurality of afferent neuron outputs and an output of the one or more referencing neurons with one or more relational aspect neurons using structural plasticity. In another aspect, the processing unit 5606 may be configured to learn a subset of a pattern in a set of inputs with a stimulus, learn a relational aspect between elements of the pattern and the subset of the pattern, replay the pattern in the set of inputs using the learned relational aspect without the stimulus, and refine learning of the pattern in the set of inputs without the stimulus.

In yet another aspect, the processing unit 5606 may be configured to reference a first pattern in a set of one or more inputs with a first stimulus, learn a relational aspect between one or more elements of the first pattern in the set of inputs and referencing of the first pattern, reference a second pattern in the set of one or more inputs with a second stimulus, learn a relational aspect between one or more elements of the second pattern in the set of inputs and referencing of the second pattern, replay the first and second patterns in the set of inputs using the learned relational aspects without the first and second stimuli, associate the first and second patterns based on the replay, compare the first pattern with the second pattern, replay at least one element of the first pattern missing or being degraded from the second pattern in response to exposure to at least one of the second pattern or the second stimulus, modify at least one of the first pattern or the second pattern to increase a difference between the first and second patterns, reference, after the modification using the one or more referencing neurons, the first pattern with a first stimulus and the second pattern with a second stimulus, wherein the first stimulus may be distinct from the second stimulus, and learn a generalization of the first and second patterns.

In yet another aspect, the processing unit 5606 may be configured to reference each sequence of parts of a pattern in a set of one or more first layer neurons with a second layer of referencing neurons, learn a relational aspect between one or more elements of each pattern and the referencing of that sequence of parts of the pattern, reference a pattern sequence in the second layer of referencing neurons with a third layer of referencing neurons, learn a relational aspect between one or more elements of the pattern sequence and the referencing of the pattern sequence in the second layer of referencing neurons, invoke replay of the referencing of the pattern sequence in the second layer based on the third layer of referencing neurons, replay that sequence of parts of the pattern in the first layer based on the invoking of replay of the referencing of the pattern sequence in the second layer, and replay a subsequent part of the pattern in the first layer neurons upon producing a prior part of the pattern.

In yet another aspect, the processing unit 5606 may be configured to reference a plurality of parts of a pattern in a plurality of afferent neurons with a plurality of referencing neurons, relate, with one or more relational aspect neurons, one or more of the parts of the pattern to a subset of the referencing neurons based on a delay between the afferent neurons and the one or more relational aspect neurons being smaller than a first value, relate, with the one or more relational aspect neurons, one or more remaining parts of the pattern to the subset of referencing neurons based on the delay being larger than a second value, and induce replay of the one or more remaining parts of the pattern by the subset of referencing neurons based on firing elements of the one or more parts of the pattern by the afferent neurons.

Figure 57:
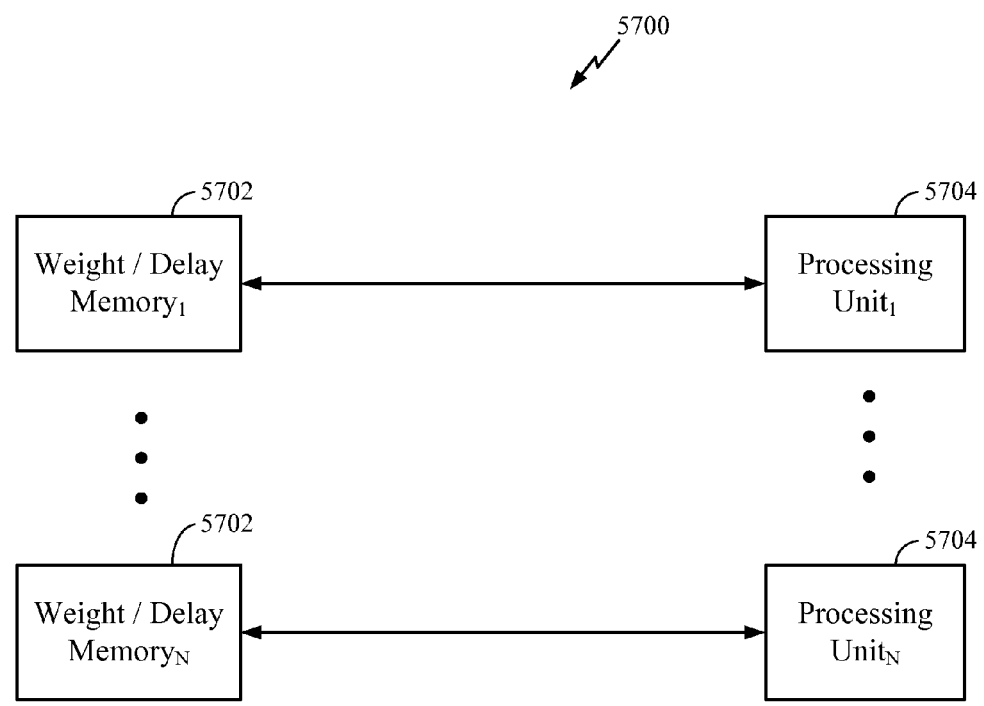
FIG. 57 illustrates an example implementation of neural component replay, learning refinement, memory transfer, associative learning, pattern comparison, pattern completion, pattern separation, pattern generalization, pattern sequence completion with a hierarchy, and pattern hierarchical replay based on distributed memories and distributed processing units in accordance with certain aspects of the present disclosure.

FIG. 57 illustrates an example implementation 5700 of the aforementioned methods for neural temporal coding based on distributed weight/delay memories 5702 and distributed processing units (neural processors) 5704 in accordance with certain aspects of the present disclosure. As illustrated in FIG. 57, one memory bank 5702 may be directly interfaced with one processing unit 5704 of a computational network (neural network), wherein that memory bank 5702 may store one or more weights and delays of one or more connections (synapses) associated with that processing unit (neural processor) 5704.

In one aspect of the present disclosure, the processing unit 5704 may be configured to reference a pattern in a plurality of afferent neuron outputs with one or more pattern learning neurons, match one or more relational aspects between the pattern in the plurality of afferent neuron outputs and an output of one or more referencing neurons with one or more relational aspect neurons, induce one or more of the plurality of afferent neurons to output a substantially similar pattern as the referenced pattern by the one or more referencing neurons, refine learning by the one or more pattern learning neurons using the induced substantially similar pattern, transfer the pattern to one or more transferee neurons by inducing the plurality of afferent neurons to output a first substantially similar pattern as the referenced pattern by the one or more referencing neurons, and learn one or more relational aspects between the pattern in the plurality of afferent neuron outputs and an output of the one or more referencing neurons with one or more relational aspect neurons using structural plasticity. In another aspect, the processing unit 5704 may be configured to learn a subset of a pattern in a set of inputs with a stimulus, learn a relational aspect between elements of the pattern and the subset of the pattern, replay the pattern in the set of inputs using the learned relational aspect without the stimulus, and refine learning of the pattern in the set of inputs without the stimulus.

In yet another aspect, the processing unit 5704 may be configured to reference a first pattern in a set of one or more inputs with a first stimulus, learn a relational aspect between one or more elements of the first pattern in the set of inputs and referencing of the first pattern, reference a second pattern in the set of one or more inputs with a second stimulus, learn a relational aspect between one or more elements of the second pattern in the set of inputs and referencing of the second pattern, replay the first and second patterns in the set of inputs using the learned relational aspects without the first and second stimuli, associate the first and second patterns based on the replay, compare the first pattern with the second pattern, replay at least one element of the first pattern missing or being degraded from the second pattern in response to exposure to at least one of the second pattern or the second stimulus, modify at least one of the first pattern or the second pattern to increase a difference between the first and second patterns, reference, after the modification using the one or more referencing neurons, the first pattern with a first stimulus and the second pattern with a second stimulus, wherein the first stimulus may be distinct from the second stimulus, and learn a generalization of the first and second patterns.

In yet another aspect, the processing unit 5704 may be configured to reference each sequence of parts of a pattern in a set of one or more first layer neurons with a second layer of referencing neurons, learn a relational aspect between one or more elements of each pattern and the referencing of that sequence of parts of the pattern, reference a pattern sequence in the second layer of referencing neurons with a third layer of referencing neurons, learn a relational aspect between one or more elements of the pattern sequence and the referencing of the pattern sequence in the second layer of referencing neurons, invoke replay of the referencing of the pattern sequence in the second layer based on the third layer of referencing neurons, replay that sequence of parts of the pattern in the first layer based on the invoking of replay of the referencing of the pattern sequence in the second layer, and replay a subsequent part of the pattern in the first layer neurons upon producing a prior part of the pattern.

In yet another aspect, the processing unit 5704 may be configured to reference a plurality of parts of a pattern in a plurality of afferent neurons with a plurality of referencing neurons, relate, with one or more relational aspect neurons, one or more of the parts of the pattern to a subset of the referencing neurons based on a delay between the afferent neurons and the one or more relational aspect neurons being smaller than a first value, relate, with the one or more relational aspect neurons, one or more remaining parts of the pattern to the subset of referencing neurons based on the delay being larger than a second value, and induce replay of the one or more remaining parts of the pattern by the subset of referencing neurons based on firing elements of the one or more parts of the pattern by the afferent neurons.

It should be understood that while particular terms are used to describe components in the present disclosure, such as neuron or synapse, the concepts of the disclosure can be implemented in equivalent alternate forms with equivalent units or elements.

Although the embodiments herein are shown for spiking neural networks, the use of these concepts to other neural network types including but not limited to rate-based neural networks is also within the scope of the present disclosure.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 800, 1600, 2300, 2400, 2900, 3500, 3600, 4100, 4200, 4400, 4500, 4800, 5200, 5300 and 5400 illustrated in FIGS. 8, 16, 23, 24, 29, 35, 36, 41, 42, 44, 45, 48, 52, 53 and 54 correspond to components 800A, 1600A, 2300A, 2400A, 2900A, 3500A, 3600A, 4100A, 4200, 4400A, 4500A, 4800A, 5200A, 5300A and 5400A illustrated in FIGS. 8A, 16A, 23A, 24A, 29A, 35A, 36A, 41A, 42A, 44A, 45A, 48A, 52A, 53A and 54A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Bluray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method of neural component memory transfer, comprising:
    referencing a pattern in a plurality of afferent neuron outputs with one or more referencing neurons;
    matching one or more first relational aspects between the pattern in the plurality of afferent neuron outputs and an output of the one or more referencing neurons with one or more first relational aspect neurons; and
    transferring the pattern to one or more transferee neurons by inducing the plurality of afferent neurons to output a first pattern recognizable as the referenced pattern by the one or more referencing neurons.

2. The method of claim 1, further comprising:
    controlling the inducing of the first pattern based on the one or more referencing neurons.

3. The method of claim 1, wherein:
    matching the one or more first relational aspects between the pattern and the output is achieved using a stimulus, and
    transferring the pattern is achieved without the stimulus.

4. The method of claim 1, further comprising:
    matching one or more second relational aspects between the first pattern in the plurality of afferent neuron outputs and an output of the one or more transferee neurons with one or more second relational aspect neurons; and
    inducing one or more of the plurality of afferent neurons to output a second pattern recognizable as the referenced pattern by the one or more referencing neurons.

5. The method of claim 4, further comprising:
    controlling the inducing of the second pattern based on the one or more transferee neurons.

6. The method of claim 4, further comprising:
    learning at least one of learning the second relational aspects or learning the second pattern.

7. The method of claim 4, wherein:
matching the one or more first relational aspects between the pattern and the output of the one or more referencing neurons is achieved using a stimulus,
matching the one or more second relational aspects between the pattern and the output of the one or more referencing neurons is achieved without the stimulus, and
transferring the pattern is achieved without the stimulus.

8. The method of claim 4, further comprising at least one of:
erasing at least one of the one or more referencing neurons, or the first relational aspect neurons after transferring the pattern, or
reusing at least one of the one or more referencing neurons, or the first relational aspect neurons after transferring the pattern.

9. The method of claim 4, further comprising:
associating the pattern with another input by learning with the one or more transferee neurons the other input in addition to the first pattern, wherein the second pattern comprises the other input.

10. The method of claim 4, further comprising:
transferring two or more patterns to the transferee neurons and the second relational aspect neurons, wherein the second pattern comprises an aggregate of the two or more patterns.

11. The method of claim 4, further comprising:
comparing the first pattern and the second pattern; and
continuing transfer of the pattern or performing learning refinement associated with the pattern depending on the comparison.

12. An apparatus for neural component memory transfer, comprising:
a first circuit configured to reference a pattern in a plurality of afferent neuron outputs with one or more referencing neurons;
a second circuit configured to match one or more first relational aspects between the pattern in the plurality of afferent neuron outputs and an output of the one or more referencing neurons with one or more first relational aspect neurons; and
a third circuit configured to transfer the pattern to one or more transferee neurons by inducing the plurality of afferent neurons to output a first pattern recognizable as the referenced pattern by the one or more referencing neurons.

13. The apparatus of claim 12, further comprising:
a fourth circuit configured to control the inducing of the first pattern based on the one or more referencing neurons.

14. The apparatus of claim 12, wherein:
matching the one or more first relational aspects between the pattern and the output is achieved using a stimulus, and
transferring the pattern is achieved without the stimulus.

15. The apparatus of claim 12, further comprising:
a fourth circuit configured to match one or more second relational aspects between the first pattern in the plurality of afferent neuron outputs and an output of the one or more transferee neurons with one or more second relational aspect neurons; and
a fifth circuit configured to induce one or more of the plurality of afferent neurons to output a second pattern recognizable as the referenced pattern by the one or more referencing neurons.

16. The apparatus of claim 15, further comprising:
a sixth circuit configured to control the inducing of the second pattern based on the one or more transferee neurons.

17. The apparatus of claim 15, further comprising:
a sixth circuit configured to learn at least one of learning the second relational aspects or learning the second pattern.

18. The apparatus of claim 15, wherein:
matching the one or more first relational aspects between the pattern and the output of the one or more referencing neurons is achieved using a stimulus,
matching the one or more second relational aspects between the pattern and the output of the one or more referencing neurons is achieved without the stimulus, and
transferring the pattern is achieved without the stimulus.

19. The apparatus of claim 15, further comprising at least one of:
a sixth circuit configured to erase at least one of the one or more referencing neurons, or the first relational aspect neurons after transferring the pattern, or
a seventh circuit configured to reuse at least one of the one or more referencing neurons, or the first relational aspect neurons after transferring the pattern.

20. The apparatus of claim 15, further comprising:
a sixth circuit configured to associate the pattern with another input by learning with the one or more transferee neurons the other input in addition to the first pattern, wherein the second pattern comprises the other input.

21. The apparatus of claim 15, further comprising:
a sixth circuit configured to transfer two or more patterns to the transferee neurons and the second relational aspect neurons, wherein the second pattern comprises an aggregate of the two or more patterns.

22. The apparatus of claim 15, further comprising:
a sixth circuit configured to compare the first pattern and the second pattern; and
a seventh circuit configured to continue transfer of the pattern or performing learning refinement associated with the pattern depending on the comparison.

23. An apparatus for neural component memory transfer, comprising:
means for referencing a pattern in a plurality of afferent neuron outputs with one or more referencing neurons;
means for matching one or more first relational aspects between the pattern in the plurality of afferent neuron outputs and an output of the one or more referencing neurons with one or more first relational aspect neurons; and
means for transferring the pattern to one or more transferee neurons by inducing the plurality of afferent neurons to output a first pattern recognizable as the referenced pattern by the one or more referencing neurons.

24. The apparatus of claim 23, further comprising:
means for controlling the inducing of the first pattern based on the one or more referencing neurons.

25. The apparatus of claim 23, wherein:
means for matching the one or more first relational aspects between the pattern and the output is achieved using a stimulus, and
means for transferring the pattern is achieved without the stimulus.

26. The apparatus of claim 23, further comprising:
means for matching one or more second relational aspects between the first pattern in the plurality of afferent neuron outputs and an output of the one or more transferee neurons with one or more second relational aspect neurons; and means for inducing one or more of the plurality of afferent neurons to output a second pattern recognizable as the referenced pattern by the one or more referencing neurons.

27. The apparatus of claim 26, further comprising:
means for controlling the inducing of the second pattern based on the one or more transferee neurons.

28. The apparatus of claim 26, further comprising:
means for learning at least one of learning the second relational aspects or learning the second pattern.

29. The apparatus of claim 26, wherein:
matching the one or more first relational aspects between the pattern and the output of the one or more referencing neurons is achieved using a stimulus,
matching the one or more second relational aspects between the pattern and the output of the one or more referencing neurons is achieved without the stimulus, and
transferring the pattern is achieved without the stimulus.

30. The apparatus of claim 26, further comprising at least one of:
means for erasing at least one of the one or more referencing neurons, or the first relational aspect neurons after transferring the pattern, or
means for reusing at least one of the one or more referencing neurons, or the first relational aspect neurons after transferring the pattern.

31. The apparatus of claim 26, further comprising:
means for associating the pattern with another input by learning with the one or more transferee neurons the other input in addition to the first pattern, wherein the second pattern comprises the other input.

32. The apparatus of claim 26, further comprising:
means for transferring two or more patterns to the transferee neurons and the second relational aspect neurons, wherein the second pattern comprises an aggregate of the two or more patterns.

33. The apparatus of claim 26, further comprising:
means for comparing the first pattern and the second pattern; and
means for continuing transfer of the pattern or performing learning refinement associated with the pattern depending on the comparison.

34. A computer program product for neural component memory transfer, comprising a non-transitory computer-readable medium comprising code for:
referencing a pattern in a plurality of afferent neuron outputs with one or more referencing neurons;
matching one or more first relational aspects between the pattern in the plurality of afferent neuron outputs and an output of the one or more referencing neurons with one or more first relational aspect neurons; and
transferring the pattern to one or more transferee neurons by inducing the plurality of afferent neurons to output a first pattern recognizable as the referenced pattern by the one or more referencing neurons.

\* \* \* \* \*